(12) United States Patent
Lippmann et al.

(10) Patent No.: US 7,194,769 B2
(45) Date of Patent: Mar. 20, 2007

(54) NETWORK SECURITY PLANNING ARCHITECTURE

(75) Inventors: Richard Lippmann, Wayland, MA (US); Chris Scott, Newton, MA (US); Kendra Kratkiewicz, Shirley, MA (US); Michael Artz, Catonsville, MD (US); Kyle W. Ingols, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 49 days.

(21) Appl. No.: 10/734,083

(22) Filed: Dec. 11, 2003

(65) Prior Publication Data

US 2005/0138413 A1   Jun. 23, 2005

(51) Int. Cl.
*G06F 11/30* (2006.01)
(52) U.S. Cl. ............................. 726/25; 726/1
(58) Field of Classification Search ............... 713/201; 726/25, 1
See application file for complete search history.

(56) References Cited

U.S. PATENT DOCUMENTS

| | | | | |
|---|---|---|---|---|
| 5,313,616 A * | 5/1994 | Cline et al. | ................ | 717/127 |
| 5,850,516 A | 12/1998 | Schneier | | |
| 6,836,888 B1 * | 12/2004 | Basu et al. | ................ | 718/104 |
| 6,952,779 B1 | 10/2005 | Cohen et al. | | |
| 7,013,395 B1 * | 3/2006 | Swiler et al. | ............... | 713/151 |
| 2002/0184504 A1 * | 12/2002 | Hughes | ..................... | 713/177 |
| 2003/0110288 A1 * | 6/2003 | Ramanujan et al. | ........ | 709/238 |
| 2003/0149777 A1 * | 8/2003 | Adler | ........................ | 709/228 |
| 2004/0199576 A1 * | 10/2004 | Tan | ............................ | 709/203 |
| 2006/0015943 A1 * | 1/2006 | Mahieu | ..................... | 726/25 |

FOREIGN PATENT DOCUMENTS

WO    WO 2004/031953    4/2004

OTHER PUBLICATIONS

Steffan, Jab et al "Collaborative Attack Modeling," 2002, pp. 1-10.*
Tidewell et al., "Modeling Internet Attacks," Jun. 5-6, 2001, pp. 54-59.*
IT Guru: Intelligent Network Management for Enterprises (website: www.opnet.com/products/itguru/home.html), 2003 OPNET Technologies, Inc.
IT Guru: Intelligent Network Management for Enterprises, OPNET Technologies, Inc. (website: www.opnet.com).

(Continued)

*Primary Examiner*—Emmanuel L. Moise
*Assistant Examiner*—Michael Pyzocha
(74) *Attorney, Agent, or Firm*—Daly, Crowley, Mofford & Durkee, LLP

(57) ABSTRACT

Described are techniques used for assessing the security of a network. Pruned attack trees are generated using a forward chaining, breadth-first technique representing the attack paths of a possible attacker in the network. A vulnerability score is determined for each network and attacker starting point using attack loss values assigned to each host and information extracted from the attack tree(s) concerning compromised hosts. Different hypothetical alternatives may be evaluated to improve security of the network and each alternative may be evaluated by recomputing the network vulnerability score and comparing the recomputed score to the original network vulnerability score. Also disclosed is a method for determining end-to-end connectivity of a network. The resulting end-to-end connectivity information is used in generating the pruned attack tree.

53 Claims, 37 Drawing Sheets

OTHER PUBLICATIONS

Scalable, Graph-Based Network Vulnerability Analysis, by Paul Ammann, Duminda Wijesekera and Saket Kaushik, CCS'02, Nov. 18-22, 2002, Washington, DC.

Attack Trees, Dr. Dobb's Journal Dec. 1999—Modeling Security Threats by Bruce Schneier.

Compter Attack Graph Generation Tool by Laura P. Swiler Cynthia Phillips. David Ellis and Stefan Chakerian, Sandia National Laboratories, Albuquerque, NM.

Automated Generation and Analysis of Attack Graphs by Oleg Sheyner, Joshua Haines, Somesh JHA, Richard Lippmann and Jeannette M. Wing, Proceedings of the 2002 IEEE Symposium on Security and Privacy (S&P'02).

NetSPA: A Network Security Planning Architecture by Michael Lyle Artz, S.B., Computer Science and Engineering, Massachusetts Institute of Technology (2001).

Computer-Attack Graph Generation Tool, Laura P. Swiler et al., Sandia National Laboratories, 2001 IEEE, pp. 307-321.

Scalable, Graph-Based Network Vulnerability Analysis, Paul Ammann et al., ACM Nov. 2002, pp. 217-224.

* cited by examiner

|   | A | B | C |
|---|---|---|---|
| 1 | host97 | file server | 5000 |
| 2 | host43 | backup server | 5000 |
| 3 | host01 | DNS server | 2000 |
| 4 | host56 | domain controller | 1000 |
| 5 | switch01 | switch | 400 |

FIGURE 9B

Process: Formulate New Paths

End-to-End Connectivity Map - Logical Structures

2220

| Firewall rule no. | Src | Destination | Service | | Action | Times in Effect |
|---|---|---|---|---|---|---|
| | | | protocol | port # | | |
| | : | | | : | | : |
| | | | | | | |

NETWORK SECURITY PLANNING ARCHITECTURE

STATEMENT OF GOVERNMENT INTEREST

The invention was made with Government support under contract No. F19628-00-C-0002 by the Department of the Air Force. The Government has certain rights in the invention.

BACKGROUND

1. Technical Field

This application generally relates to networks, and more particularly to network security.

2. Description of Related Art

Assessing the security of a computer network is a complex problem that depends on one or more factors that may vary with each network. Such factors include, for example, network topology, services and vulnerabilities of each host, a firewall policy, and the like. Vulnerabilities may be characterized as weaknesses within a network. Vulnerabilities in a host may be due to weaknesses in its associated hardware, software, and/or configuration by which an attacker may improperly access, perform an unauthorized operation upon, or otherwise compromise, a network.

Gathering and analyzing information for assessing the security of a network manually may be a daunting task as well as error prone. Additionally, this may be a costly option since a manual reassessment may need to be performed each time there is a change, such as, for example, a change in network topology or system software, the discovery of a new vulnerability, and the like.

Another technique for assessing network security is to use vulnerability scanners. However, existing vulnerability scanners provide information about services and vulnerabilities present on individual hosts and have a drawback of failing to take into account the impact of a network configuration. Additionally, the vulnerability scanners may not provide additional functionality that may be desirable in assessing network security, such as, for example, taking into account the removal or other variation of a vulnerability in order to assess the impact of the vulnerability removal. Such scanners may also fail to consider particular factors such as, for example, network topology and firewall rule sets.

It may be desirable to have an automated technique that efficiently identifies attack paths in a network by which an attacker may compromise a network. It may be desirable that this technique take into account the impact of a vulnerability from one host or node on the entire network providing a more global assessment. The technique may desirably consider possible attack paths of an attacker from within a network as well as external to the network. It may also be desirable to perform a risk assessment and accordingly provide a prioritized list of security improvements in an automated fashion.

SUMMARY OF THE INVENTION

In accordance with one aspect of the invention is a method for representing at least one computer attack path in a network comprising: receiving a starting point of a computer attack with respect to said network; and generating a pruned augmented attack tree representing at least one attack path possible from said starting point, wherein, said starting point is a root of said pruned augmented attack tree, for a current node being evaluated as part of said generating, a resulting node and an edge connecting said current node to said resulting node are added to said pruned augmented attack tree if said edge and said resulting node are not already included in said pruned augmented attack tree with said edge connecting an ancestor of the current node to an instance of the resulting node. The pruned augmented attack tree may be a tree including n levels in which the starting point is a root of said tree at level 0, n being at least 0. A node in said pruned augmented attack tree may represent information about at least one of: an attacker state including a host and an attacker access level on said host, and a network state. An edge from a first node at level x to a second node at level x+1 may represent an action while in a first state including a first attacker state corresponding to said first node resulting in a second state including a second attacker state. The action may exploit a vulnerability on a host in said network. The first attacker state may represent a first host and a first attacker access level on said first host, and said second attacker state may represent at least one of: a second host and a second attacker access level on said second host, and said first host and a second attacker access level on said first host wherein said second attacker access level represents at least one of: an increase in attacker privilege, an increase in attacker access, and an increase in attacker knowledge. The current node may be at a level n, and said ancestors of said current node may be located at levels in said pruned augmented attack tree at a level less than n. The pruned augmented attack tree may be generated using a breadth first search technique in which nodes are added to said pruned augmented attack tree at an nth level prior to adding any node from level n+1 to said pruned augmented attack tree. A plurality of computer attack paths for said network may be represented using a plurality of pruned augmented attack trees, each of said pruned augmented attack trees representing computer attack paths originating from a unique starting point. The starting point may be one of: from within said network and external to said network. The method may also include: evaluating each action that exploits a vulnerability of a host in accordance with connectivity data. The connectivity data, each action, and the vulnerability may be stored in a database and determined prior to performing said generating. The pruned augmented attack tree may have a property that a resulting node at a level "n+1" and an edge connecting a current node at level "n" to said resulting node are included in said pruned augmented attack tree if said edge and said resulting node are not already included in said pruned augmented attack tree with said edge connecting an ancestor of the current node to an instance of the resulting node, said ancestor being a node at a level "x"<"n", and said instance of the resulting node being at level "x+1". The method may also include: determining which hosts in said network are equivalent forming a group; and representing said group with a single host. A first host may be equivalent to a second host if said first and second hosts have a same set of one or more vulnerabilities on a same set of one or more endpoints, said first and second hosts are not administrative hosts, said first and second hosts are not gateways, said first and second hosts have equivalent attack loss values, and said first and second hosts have equivalent connectivity. The generating step may use connectivity information, said connectivity information including a connection between two endpoints representing elements of a configuration of said network. The connectivity information may include physical connectivity between network interfaces and logical connectivity through network communications protocols. The connection may be associated with a path including one or more hops. Each of the one or more hops may be associated with at least one of: a filtering rule, a translation rule, and an interface of a host in said network. At least one of the endpoints may be associated with a vulnerability on said at least one endpoint. The vulnerability may have an associated action resulting in exploitation of said vulnerability. The associated action may be related to an entity representing at least one of: an attacker access level, attacker knowledge level, a change to a network state. The pruned augmented attack tree may be used to determine an effect of preventing at least one action. The method may also include: modifying said pruned augmented attack tree in accordance with eliminating at least one action in connection with a vulnerability associated with said host producing a modified augmented attack tree; and evaluating said modified augmented attack tree. The connectivity data may represent connectivity between pairs of endpoints in said network and may be used in said generating, and the method further include: automatically generating said connectivity data in accordance with at least one translation rule, at least one filtering rule, and network configuration information. The at least one translation rule may include at least one of: an address translation rule and a port translation rule. The method may also include: selecting at least one address of a starting point of a computer attack using at least one rule; and determining a portion of said connectivity data using said at least one address. The at least one rule may include at least one of a filtering rule and a translation rule. The at least one address may be used in said generating to represent an alternate connectivity of a host. The address may be one of an address in accordance with a communications protocol and an address associated with said network. The method may also include: using vulnerability data to determine at least one of: requirements for an action, an attacker state resulting from an action, and a network state resulting from an action, where said requirements include a locality describing whether a vulnerability can be exploited remotely over a network or locally on a host, said resulting attacker state includes an effect describing an access level or privilege or knowledge after an exploit of a vulnerability, and said resulting network state includes a denial of service describing a loss of service on a host after an exploit of a vulnerability.

In accordance with another aspect of the invention is a method for assessing security of a network comprising: determining a network vulnerability score in accordance with first attack loss values for all hosts within said network that are compromised and second attack loss values associated with all hosts in said network. The method may also include determining attack loss values for all hosts compromised in all attack trees of said network, each attack tree representing at least one computer attack path originating from a unique starting point. The method may also include determining attack loss values for all hosts in said network. The method may further include: adding said attack loss values for all hosts compromised in all attack trees of said network producing a first sum; adding said attack loss values for all hosts in said network producing a second sum; and determining a ratio of said first sum to said second sum. The method may include: receiving input for a proposed change to said network; and assessing said proposed change to said network, said assessing including determining a revised value for said network vulnerability score. The attack loss values may be assigned to each host in said network in accordance with a value if said host is compromised. The attack loss value for said each host may be determined using at least one criteria selected from: criticality of data on said each host, criticality of data available through said each host, criticality of a service available at said each host, and criticality of a service available through said each host. The network vulnerability score may be represented using a ratio of a first sum of attack loss values for all hosts compromised in one or more pruned attack trees to a second sum of attack loss values for all hosts in said network. An attack tree vulnerability score may be determined for each attack tree of said network and each attack tree vulnerability score may be represented as a ratio of a first sum of attack loss values of all hosts compromised in said each attack tree to a second sum of attack loss values of all hosts in said network. The method may also include: determining a first network vulnerability score for said network without said proposed change; determining a second network vulnerability score for said network with said proposed change; and using said first and second network vulnerability scores in evaluating said proposed change with another proposed change. The method may also include: providing a prioritized set of one or more proposed changes to said network in accordance with a network vulnerability score associated with each of said one or more proposed changes. The method may include using one or more pruned attack trees in evaluating each of said one or more proposed changes. One of said proposed changes may include eliminating at least one vulnerability at a host in said network. All attack trees of said network may be pruned augmented attack trees, each of said pruned augmented attack tree having a property that a resulting node at a level "n+1" and an edge connecting a current node at level "n" to said resulting node are included in said each pruned augmented attack tree if said edge and said resulting node are not already included in said each pruned augmented attack tree with said edge connecting an ancestor of the current node to an instance of the resulting node, said ancestor being a node at a level "x"<"n", and said instance of the resulting node being at level "x+1".

In accordance with another aspect of the invention is a method of determining connectivity for a network using connectivity data comprising: receiving at least one of: a rule set of one or more rules and information obtained from a network scanner; determining at least one address of a host in said network using at least one of said rule set and said information obtained from a network scanner, said connectivity data including said at least one address of said host; and determining connectivity between pairs of endpoints in said network using said connectivity data. The method may also include determining whether connectivity is permitted in accordance with said rule set for a path between a pair of endpoints, said path including said host. The rule set may include at least one of a filtering rule, a port translation rule, and an address translation rule. The method may also include: using said at least one address in modeling a change of a network address of a host after said host is compromised. The connectivity data may be used in generating an attack tree. The at least one address may be used in said generating to represent an alternate connectivity of a host. The address may be one of an address in accordance with a communications protocol and an address associated with said network. The determining at least one address of a host further may also include: examining at least one of: a filtering rule and an address translation rule; determining an initial list of addresses; sorting said initial list in accordance with address specificity wherein a first address in said initial list is more specific than a second address in said initial list if said first address specifies a smaller address range than said second address; and forming a final list of addresses associated with said host, wherein, addresses in said initial list are examined in order from most to least specific, for each address in said initial list, said address is added to said final list if said each address is a specific address, for each address in said initial list that specifies a range an address is selected from the range for inclusion in the final list if the selected address is not already in the final list or included in a range of a more specific address in said initial list. The determining connectivity may also include: evaluating connectivity between a source endpoint and each target endpoint within a same subnet in said network; and evaluating connectivity between a source endpoint and each target endpoint within other subnets in said network. The method may also include evaluating connectivity between each pair of possible endpoints wherein all connectivity between a source and all possible target endpoints are explored prior to advancing to the next possible source endpoint.

In accordance with another aspect of the invention is a method for representing at least one computer attack path in a network comprising: receiving a starting point of a computer attack with respect to said network; and generating a data structure representing at least one attack path possible from said starting point, wherein, said starting point is a node in said data structure, and for a current node being evaluated as part of said generating, a resulting node and an edge connecting said current node to said resulting node are added to said data structure if said edge and said resulting node are not already included in said data structure with said edge connecting a predecessor of the current node to an instance of the resulting node, wherein said predecessor is a node along a path from the starting node to a node immediately preceding the current node. The data structure may be a representation of at least one of: an augmented rooted tree, a non augmented rooted tree, a free tree, a directed acyclic graph, an undirected graph, a graph and a tree. The data structure may include at least one of: an array, a linked list, a hash table, an adjacency list, and an adjacency matrix.

In accordance with another aspect of the invention is a computer program product for representing at least one computer attack path in a network comprising executable code that: receives a starting point of a computer attack with respect to said network; and generates a pruned augmented attack tree representing at least one attack path possible from said starting point, wherein, said starting point is a root of said pruned augmented attack tree, and for a current node being evaluated, a resulting node and an edge connecting said current node to said resulting node are added to said pruned augmented attack tree if said edge and said resulting node are not already included in said pruned augmented attack tree with said edge connecting an ancestor of the current node to an instance of the resulting node. The pruned augmented attack tree may be a tree including n levels, said starting point being a root of said tree at level 0, n being at least 0. A node in said pruned augmented attack tree may represent information about at least one of: an attacker state including a host and an attacker access level on said host, and a network state. An edge from a first node at level x to a second node at level x+1 may represent an action while in a first state including a first attacker state corresponding to said first node resulting in a second state including a second attacker state. The action may exploit a vulnerability on a host in said network. The first attacker state may represent a first host and a first attacker access level on said first host, and said second attacker state may represent at least one of: a second host and a second attacker access level on said second host, and said first host and a second attacker access level on said first host wherein said second attacker access level represents at least one of: an increase in attacker privilege, an increase in attacker access, and an increase in attacker knowledge. The current node may be at a level n, and said ancestors of said current node may be located at levels in said pruned augmented attack tree at a level less than n. The computer program product may also include executable code that generates said pruned augmented attack tree using a breadth first search technique in which nodes are added to said pruned augmented attack tree at an nth level prior to adding any node from level n+1 to said pruned augmented attack tree. A plurality of computer attack paths for said network may be represented using a plurality of pruned augmented attack trees, each of said pruned augmented attack trees representing computer attack paths originating from a unique starting point. The starting point may be one of: from within said network and external to said network. The computer program product may also include executable code that evaluates each action that exploits a vulnerability of a host in accordance with connectivity data. The computer program product may include executable code that stores said connectivity data, said each action, and said vulnerability in a database prior to generating said pruned augmented attack tree. The pruned augmented attack tree may have a property that a resulting node at a level "n+1" and an edge connecting a current node at level "n" to said resulting node are included in said pruned augmented attack tree if said edge and said resulting node are not already included in said pruned augmented attack tree with said edge connecting an ancestor of the current node to an instance of the resulting node, said ancestor being a node at a level "x"<"n", and said instance of the resulting node being at level "x+1". The computer program product may also include executable code that: determines which hosts in said network are equivalent forming a group; and represents said group with a single host. A first host may be equivalent to a second host if said first and second hosts have a same set of one or more vulnerabilities on a same set of one or more endpoints, said first and second hosts are not administrative hosts, said first and second hosts are not gateways, said first and second hosts have equivalent attack loss values; and said first and second hosts have equivalent connectivity. The executable code that generates said pruned augmented attack tree may use connectivity information, said connectivity information including a connection between two endpoints representing elements of a configuration of said network. The connectivity information may include physical connectivity between network interfaces and logical connectivity through network communications protocols. The connection may be associated with a path including one or more hops. Each of said one or more hops may be associated with at least one of: a filtering rule, a translation rule, and an interface of a host in said network. At least one of said endpoints may be associated with a vulnerability on said at least one endpoint. The vulnerability may have an associated action resulting in exploitation of said vulnerability. The associated action may be related to an entity representing at least one of: an attacker access level, attacker knowledge level, a change to a network state. The computer program product may also include executable code that uses said pruned augmented attack tree to determine an effect of preventing at least one action. The computer program product may also include executable code that: modifies said pruned augmented attack tree in accordance with eliminating at least one action in connection with a vulnerability associated with said host producing a modified augmented attack tree; and evaluates said modified augmented attack tree. Connectivity data representing connectivity between pairs of endpoints in said network may be used by said executable code that generates, and the computer program product may also include executable code that automatically generates said connectivity data in accordance with at least one translation rule, at least one filtering rule, and network configuration information. The at least one translation rule may include at least one of: an address translation rule and a port translation rule. The computer program product may also include executable code that: selects at least one address of a starting point of a computer attack using at least one rule; and determines a portion of said connectivity data using said at least one address. The at least one rule may include at least one of a filtering rule and a translation rule. The at least one address may be used in said generating to represent an alternate connectivity of a host. The address may be one of an address in accordance with a communications protocol and an address associated with said network. The computer program product may also include executable code that uses vulnerability data to determine at least one of: requirements for an action, an attacker state resulting from an action, and a network state resulting from an action, where said requirements include a locality describing whether a vulnerability can be exploited remotely over a network or locally on a host, said resulting attacker state includes an effect describing an access level or privilege or knowledge after an exploit of a vulnerability, and said resulting network state includes a denial of service describing a loss of service on a host after an exploit of a vulnerability.

In accordance with another aspect of the invention is a computer program product that assesses security of a network comprising executable code that: determines a network vulnerability score in accordance with first attack loss values for all hosts within said network that are compromised and second attack loss values associated with all hosts in said network. The computer program product may also include executable code that determines attack loss values for all hosts compromised in all attack trees of said network, each attack tree representing at least one computer attack path originating from a unique starting point. The computer program product may also include executable code that determines attack loss values for all hosts in said network. The computer program product may also include executable code that: adds said attack loss values for all hosts compromised in all attack trees of said network producing a first sum; adds said attack loss values for all hosts in said network producing a second sum; and determines a ratio of said first sum to said second sum. The computer program product may also include executable code that: receives input for a proposed change to said network; and assesses said proposed change to said network, said executable code that assesses including executable code that determines a revised value for said network vulnerability score. The attack loss values may be assigned to each host in said network in accordance with a value if said host is compromised. The attack loss value for said each host may be determined using at least one criteria selected from: criticality of data on said each host, criticality of data available through said each host, criticality of a service available at said each host, and criticality of a service available through said each host. The network vulnerability score may be represented using a ratio of a first sum of attack loss values for all hosts compromised in one or more pruned attack trees to a second sum of attack loss values for all hosts in said network. An attack tree vulnerability score may be determined for each attack tree of said network and each attack tree vulnerability score may be represented as a ratio of a first sum of attack loss values of all hosts compromised in said each attack tree to a second sum of attack loss values of all hosts in said network. The computer program product may include executable code that: determines a first network vulnerability score for said network without said proposed change; determines a second network vulnerability score for said network with said proposed change; and uses said first and second network vulnerability scores in evaluating said proposed change with another proposed change. The computer program product may also include executable code that provides a prioritized set of one or more proposed changes to said network in accordance with a network vulnerability score associated with each of said one or more proposed changes. The computer program product may include executable code that uses one or more pruned attack trees in evaluating each of said one or more proposed changes. One of said proposed changes may include eliminating at least one vulnerability at a host in said network. All attack trees of said network may be pruned augmented attack trees, each of said pruned augmented attack tree having a property that a resulting node at a level "n+1" and an edge connecting a current node at level "n" to said resulting node are included in said each pruned augmented attack tree if said edge and said resulting node are not already included in said each pruned augmented attack tree with said edge connecting an ancestor of the current node to an instance of the resulting node, said ancestor being a node at a level "x"<"n", and said instance of the resulting node being at level "x+1".

In accordance with another aspect of the invention is a computer program product that determines connectivity for a network using connectivity data comprising executable code that: receives at least one of: a rule set of one or more rules and information obtained from a network scanner; determines at least one address of a host in said network using at least one of said rule set and said information obtained from a network scanner, said connectivity data including said at least one address of said host; and determines connectivity between pairs of endpoints in said network using said connectivity data. The computer program product may also include executable code that determines whether connectivity is permitted in accordance with said rule set for a path between a pair of endpoints, said path including said host. The rule set may include at least one of a filtering rule, a port translation rule, and an address translation rule. The computer program may also include executable code that uses said at least one address in modeling a change of a network address of a host after said host is compromised. The connectivity data may be used by executable code that generates an attack tree. The at least one address may be used in said generating to represent an alternate connectivity of a host. The address may be one of an address in accordance with a communications protocol and an address associated with said network. The executable code that determines at least one address of a host may further comprise executable code that: examines at least one of: a filtering rule and an address translation rule; determines an initial list of addresses; sorts said initial list in accordance with address specificity wherein a first address in said initial list is more specific than a second address in said initial list if said first address specifies a smaller address range than said second address; and forms a final list of addresses associated with said host, wherein, addresses in said initial list are examined in order from most to least specific, for each address in said initial list, said address is added to said final list if said each address is a specific address, for each address in said initial list that specifies a range an address is selected from the range for inclusion in the final list if the selected address is not already in the final list or included in a range of a more specific address in said initial list.

The executable code that determines connectivity may comprise executable code that: evaluates connectivity between a source endpoint and each target endpoint within a same subnet in said network; and evaluates connectivity between a source endpoint and each target endpoint within other subnets in said network. The computer program product may also include executable code that evaluates connectivity between each pair of possible endpoints wherein all connectivity between a source and all possible target endpoints are explored prior to advancing to the next possible source endpoint.

In accordance with another aspect of the invention is a computer program product that represents at least one computer attack path in a network comprising executable code that: receives a starting point of a computer attack with respect to said network; and generates a data structure representing at least one attack path possible from said starting point, wherein, said starting point is a node in said data structure, and for a current node being evaluated as part of said generating, a resulting node and an edge connecting said current node to said resulting node are added to said data structure if said edge and said resulting node are not already included in said data structure with said edge connecting a predecessor of the current node to an instance of the resulting node, wherein said predecessor is a node along a path from the starting node to a node immediately preceding the current node. The data structure may be a representation of at least one of: an augmented rooted tree, a non augmented rooted tree, a free tree, a directed acyclic graph, an undirected graph, a graph and a tree. The data structure may include at least one of: an array, a linked list, a hash table, an adjacency list, and an adjacency matrix.

BRIEF DESCRIPTION OF THE DRAWINGS

Features and advantages of the present invention will become more apparent from the following detailed description of exemplary embodiments thereof taken in conjunction with the accompanying drawings in which:

FIG. 9B is an example of an embodiment of a table of attack loss values;

FIG. 29D is an example of a logical representation of a firewall rule set; and

DETAILED DESCRIPTION OF
EMBODIMENT(S)

Figure 1:
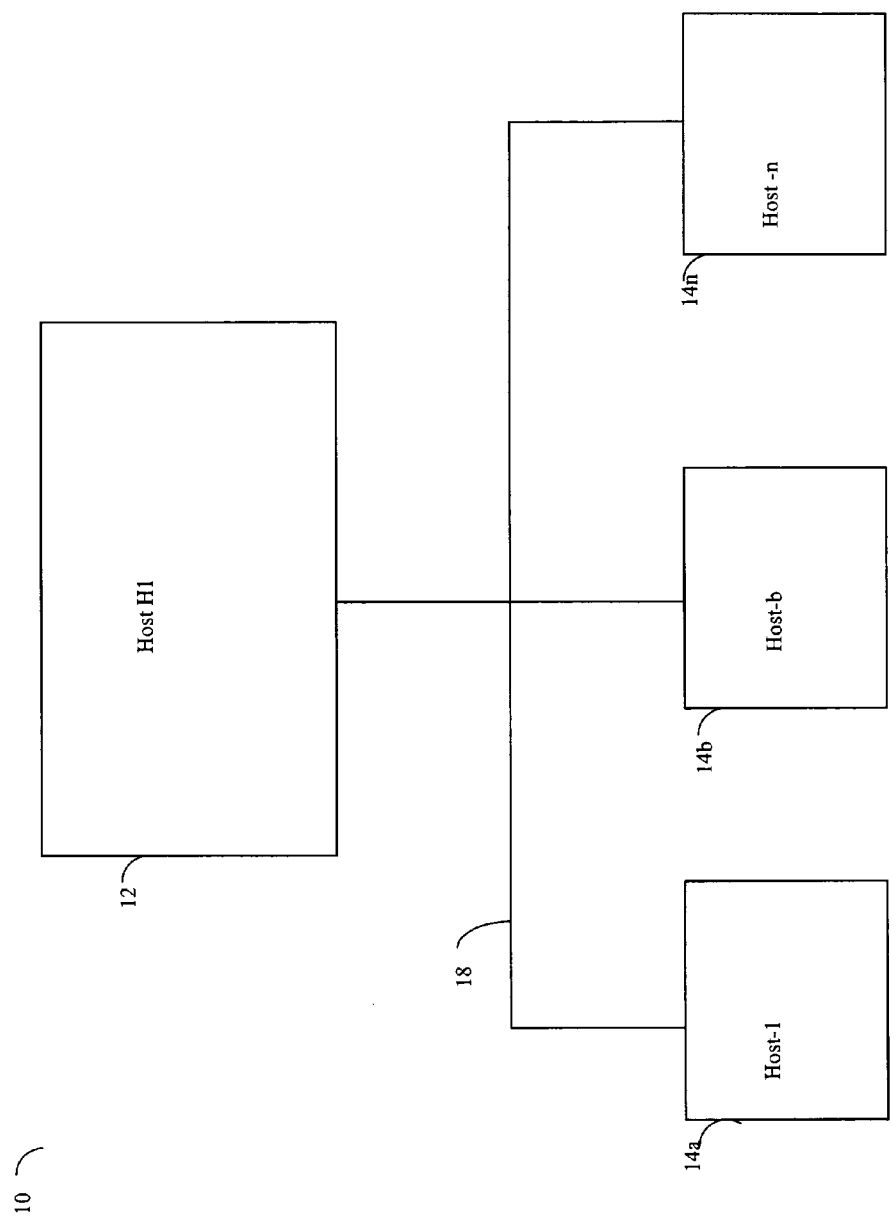
FIG. 1 is an example of an embodiment of a network according to the present invention.

Referring now to FIG. 1, shown is an example of an embodiment of a network according to the present invention. The network 10 includes a host 12 connected to other hosts 14a–14n through communication medium or interconnection 18. In this embodiment of the network 10, the hosts 14a–14n may access the host 12 in performing requests such as, for example, data requests. The communication medium 18 may be any one of a variety of networks or other type of communication connections as known to those skilled in the art. The communication medium 18 may be a network connection, bus, and/or other type of data link, such as a hardwire, wireless, or other connection known in the art. For example, the communication medium 18 may be the Internet, an intranet, network or other connection(s) by which the hosts 14a–14n may access and communicate with the host 12, and may also communicate with others included in the network 10.

Each of the hosts 14a–14n and the host 12 included in the network 10 may be connected to the communication medium 18 by any one of a variety of connections as may be provided and supported in accordance with the type of communication medium 18.

It should be noted that the particulars of the hardware and software included in each of the hosts 14a–14n, as well as those components that may be included in the host 12, are described herein in more detail, and may vary with each particular embodiment. Each of the hosts 14a–14n and the host 12 may all be located at the same physical site, or, alternatively, may also be located in different physical locations. Examples of the communication medium that may be used to provide the different types of connections between the hosts 14a–14n and the host 12 of the network 10 may use a variety of different communication protocols such as SCSI, Fibre Channel, or GIGE (Gigabit Ethernet), and the like. Some or all of the connections by which the hosts 12, and 14a–14n may be connected to the communication medium 18 may pass through other communication devices, such as switching equipment that may exist such as a phone line, a repeater, a multiplexer or even a satellite. The network 10 may be any one of well-known types of networks including, for example, a local area network (LAN), a wide area network (WAN), and the like.

Each of the hosts 14a–14n and 12 may perform different types of operations in accordance with different types of tasks. In the embodiment of FIG. 1, any one of the hosts 14a–14n may issue a request to the host 12 to perform an operation, such as, for example, to retrieve a Web page for display by one of the hosts 14a–14n, to perform a search, to access one of the host 12's data storage devices, and the like. It should be noted that a network may contain one or more other networks.

Figure 2:
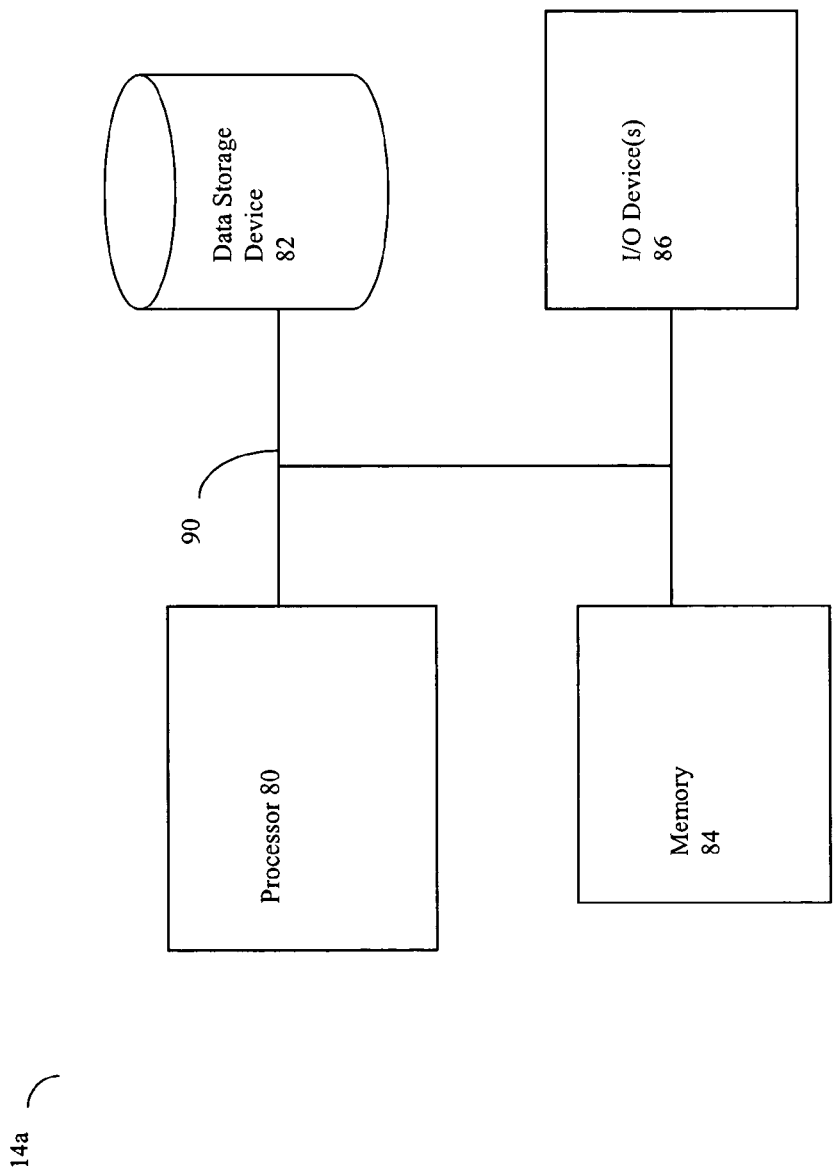
FIG. 2 is an example of an embodiment of a host that may be included in the network of FIG. 1.

Referring now to FIG. 2, shown is an example of an embodiment of a host 14a. It should be noted that although a particular configuration of a host is described herein, other hosts 12, and 14b–14n may also be similarly configured. Additionally, it should be noted that each of the hosts 12, and 14a–14n may have any one of a variety of different configurations including different hardware and/or software components. Included in this embodiment of the host 14a is a processor 80, a memory, 84, one or more I/O devices 86 and one or more data storage devices 82 that may be accessed locally within the particular host. Each of the foregoing may communicate using a bus or other communication medium 90. Each of the foregoing components may be any one or more of a variety of different types in accordance with the particular host 14a.

Each of the processors included in the hosts 12, and 14a–14n may be any one of a variety of commercially available single or multi-processor system, such as an Intel-compatible x86 processor, an IBM mainframe or other type of commercially available or proprietary processor, able to support incoming traffic in accordance with each particular embodiment and application. It should be noted that a host in an embodiment may include one or more other hosts.

Computer instructions may be executed by each of the processors to perform a variety of different operations. As known in the art, executable code may be produced, for example, using a linker, a language processor, and other tools that may vary in accordance with each embodiment. Computer instructions and data may also be stored on a data storage device, ROM, or other form of media or storage. The instructions may be loaded into a memory and executed by a processor to perform a particular task.

In one embodiment, an operating system, such as the Windows operating system by Microsoft Corporation, may reside and be executed on one or more of the hosts included in the network 10 of FIG. 1.

It should be noted that each of the hosts 14a–14n may include any number and type of data storage devices. For example, each of the foregoing hosts may include a single device, such as a disk drive, as well as a plurality of devices in a more complex configuration, such as with a storage area network, and the like. Data may be stored, for example, on magnetic, optical, or silicon-based media. The particular arrangement and configuration of a data storage devices in each of the hosts may vary in accordance with the parameters and requirements associated with each embodiment. Additionally, the devices may be available locally only for use by that particular host, or available for use by one or more external hosts that may vary in accordance with each embodiment.

A host may be susceptible to computer attacks by a malicious user or attacker. An attacker of a host may come from within the host. An attacker may also be external with respect to the host and may, for example, attempt to attack the host from another host through a network.

What will now be described are techniques that may be used in connection with assessing and evaluating the security of a network. The techniques described herein may be used in performing such assessment and evaluation in an automated fashion. The techniques described herein may also be used in connection with providing a prioritized list of possible security improvements. The evaluation and assessment of the security provide a global analysis taking into account, for example, the impact of a single vulnerability on the entire network. Additionally, the techniques described herein utilize an attack tree generation technique that may be characterized as scaleable for use with large networks as well as small networks. The generated attack trees may be used to reveal what can be compromised in a given network by hypothetical attackers at various starting points, and additionally the techniques described herein may be used to produce prioritized recommendations for improving the overall security of a network while also minimizing the amount of manual data entry. The techniques described herein may be used in connection with existing tools and outputs thereof. For example, the output of a vulnerability scanner may be imported into the system described in following paragraphs as a data input. The techniques described herein may be used in connection with experimenting and evaluating hypothetical modifications to assess the impact of a change on the overall security of a network.

Networks may include numerous known vulnerabilities. It may be infeasible to eliminate all known vulnerabilities in the network due to time and cost constraints as well as the need to provide essential operational functionality. Therefore, a tool may be used to analyze a given network and determine the most cost effective way to provide network protection within the network as a whole as well as for identifying the most critical components of the network such as those most vulnerable to attack.

Attack trees are one way of representing how a malicious user or attacker may exploit vulnerabilities in a computer network to compromise hosts on the network. As will be described in following paragraphs, an attack tree may include nodes as well as edges between nodes. Nodes in the tree may represent attack states and edges between the nodes may represent transitions from one state to another. An attacker may transition from a source state to a destination state by exploiting a vulnerability provided that the exploit is possible from the source state.

Figure 3:
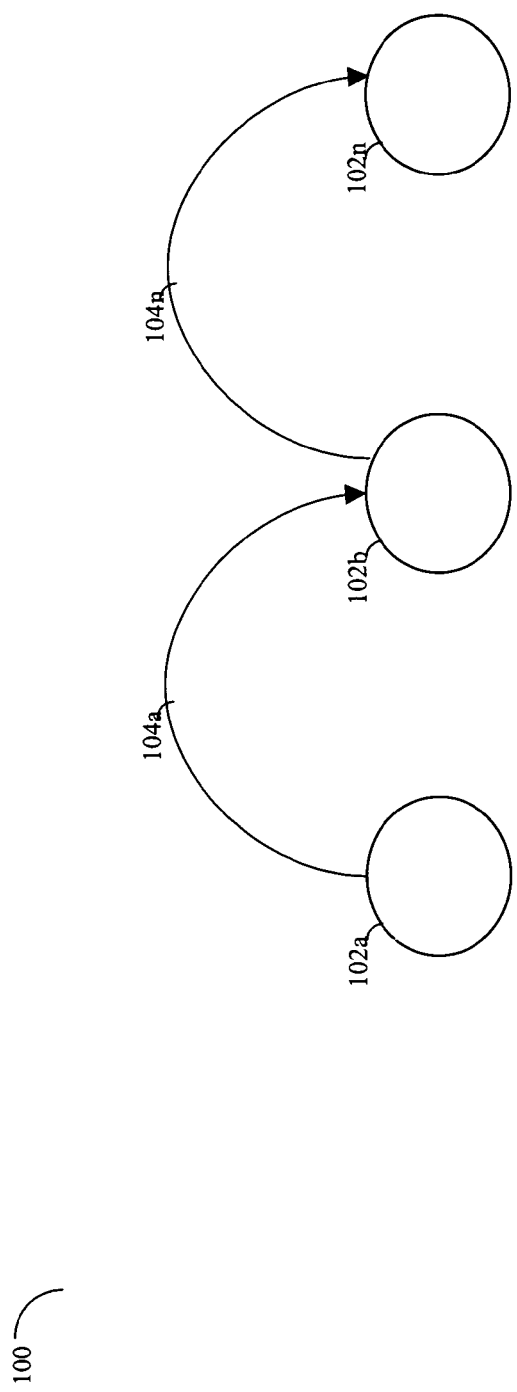
FIG. 3 is an example of a representation of a path that may be included in an attack tree.

Referring now to FIG. 3, shown is a representation 100 of a path that may be included within an attack tree. A path within an attack tree may be defined as a traversal from a start state to a destination or end state. The representation 100 includes nodes 102a, 102b, and 102n as well as edges 104a and 104n corresponding to transitions. In this representation 100, the node 102a may be a start node, for example, representing a start state of an attacker. Node 102n may represent a destination state that may be achieved by an attacker. Edges 104a and 104n represent vulnerabilities or other actions allowing a transition from one state to another. For example, a vulnerability corresponding to edge 104a causes an attacker's state to transition from 102a to 102b. In this embodiment described herein, a node may represent a particular attacker's access level or privilege on a particular host, knowledge gained, or network state. The arc or edge representing a transition between states may represent a particular vulnerability on a host causing a transition between states. It should be noted that a vulnerability that is exploited by an attacker performing an action on a particular host may be characterized as causing a transition from one state to another. As used herein, an attacker may transition between states by transitioning from one host to another, increasing attacker privileges or accesses on a same host, gaining knowledge or changing network state. In other words, transitioning between states in an attack graph does not always mean that an attacker advances between hosts. A vulnerability may be local and/or or remote. If a vulnerability is local, the vulnerability may be exploited locally on a host offering the vulnerable service, for example. If a vulnerability is remote, an attack may occur through a remote connection from a location other than from the host offering the service. It should be noted that how an embodiment may represent states of a node and edge are described elsewhere herein in more detail.

Figure 4:
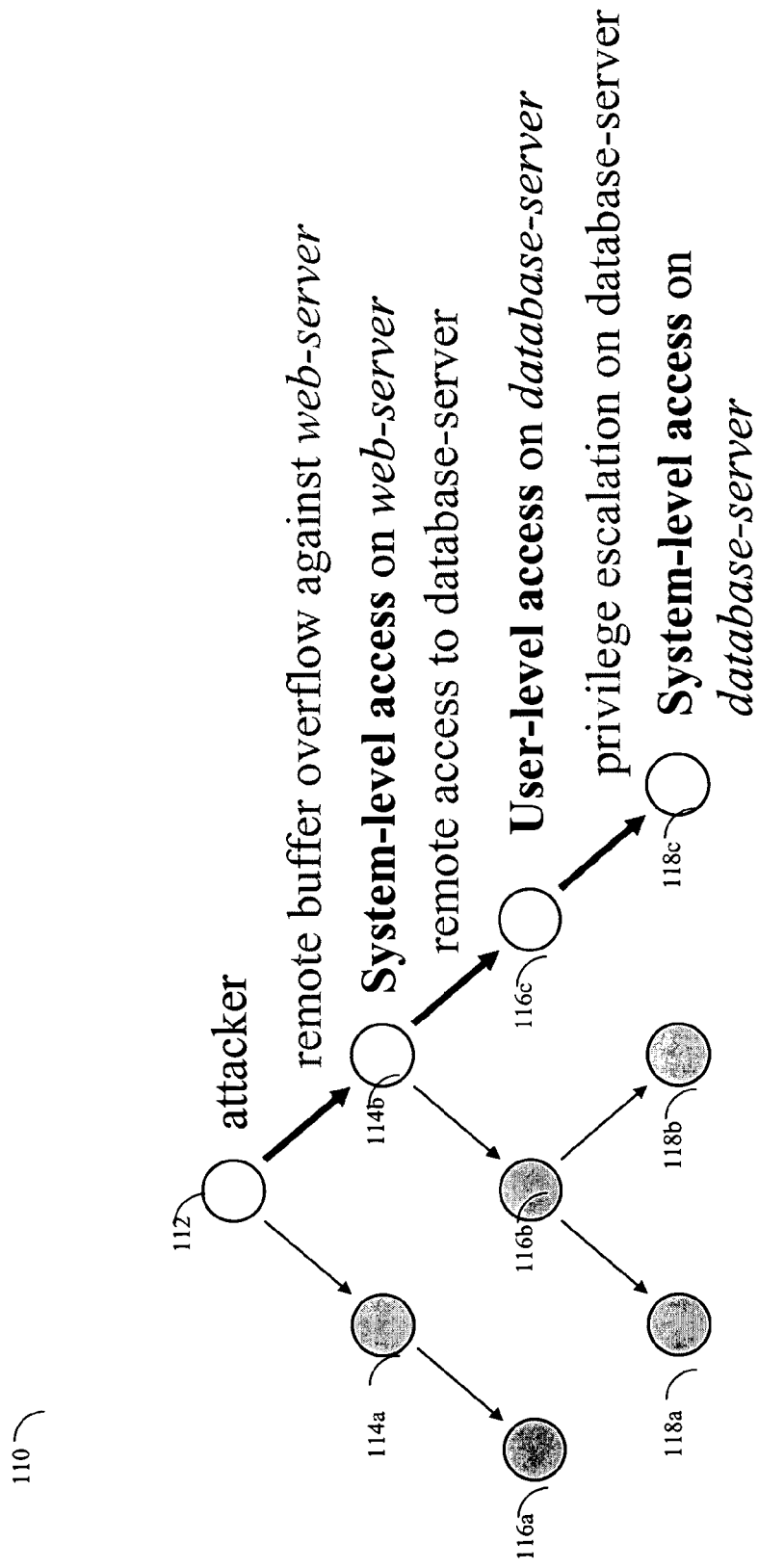
FIG. 4 is an example of a representation of an attack tree illustrating how an attacker may use multiple vulnerabilities to progress through a network.

Referring now to FIG. 4, shown is a representation 110 of an attack tree that may be included in one embodiment to illustrate how an attacker may use multiple vulnerabilities to progress through a network. The representation 110 in this example includes the attacker at the root of the tree representing a start state of the attacker, for example, on his or her own machine. The attacker at the root node 112 progresses through each level of the attack tree to a terminal node within the tree. For example, the attacker at node 112 may be accessing a web server at the system level through a vulnerability in the web server causing a transition to node 114b. Through a subsequent action, the attacker may transition to node 116c as the database server may be remotely connected to the web server. At the database server with user level access at node 116c, the attacker may transition within the same machine to a higher state of system level access on the same database server. This last transition on the same machine to an elevated state is represented by the transition from node 116c to node 118c. The series of nodes and edges from 112 to 118c may be characterized as a path within the attack tree as previously represented by 100 of FIG. 3.

Attack trees as described herein may be used in connection with several different tasks. For example, attack trees may be used in designing new networks or identifying changes to be made to existing networks. Secondly, attack trees may be used in analyzing the vulnerability of existing networks using known and hypothesized vulnerabilities. Additionally, the attack tree may be used in forensic analysis during an attack, or after an attack has occurred. The attack tree may be used in identifying where a network may benefit most from positioning a firewall, an intrusion detection system, and the like. Additionally, the attack tree may be used in performing a vulnerability analysis or assessment of an existing network. The attack tree may also be used in "what-if" analysis if a particular change is made within the network. The attack tree may also be used in connection with identifying what an attacker may do next once an attack has occurred. For example, referring back to FIG. 4, once an attacker has progressed from the start node 112 to 114b, the attack tree may be used to determine what other possibilities or vulnerabilities an attacker may take advantage of to compromise a host. This may be represented in the attack tree by the edges transitioning to nodes 116b and 116c from node 114b.

It should be noted that the attack tree and generation technique described herein may be used for other applications besides as described herein. The particular examples and uses cited herein should not be construed as a limitation of the techniques described herein.

Figure 5:
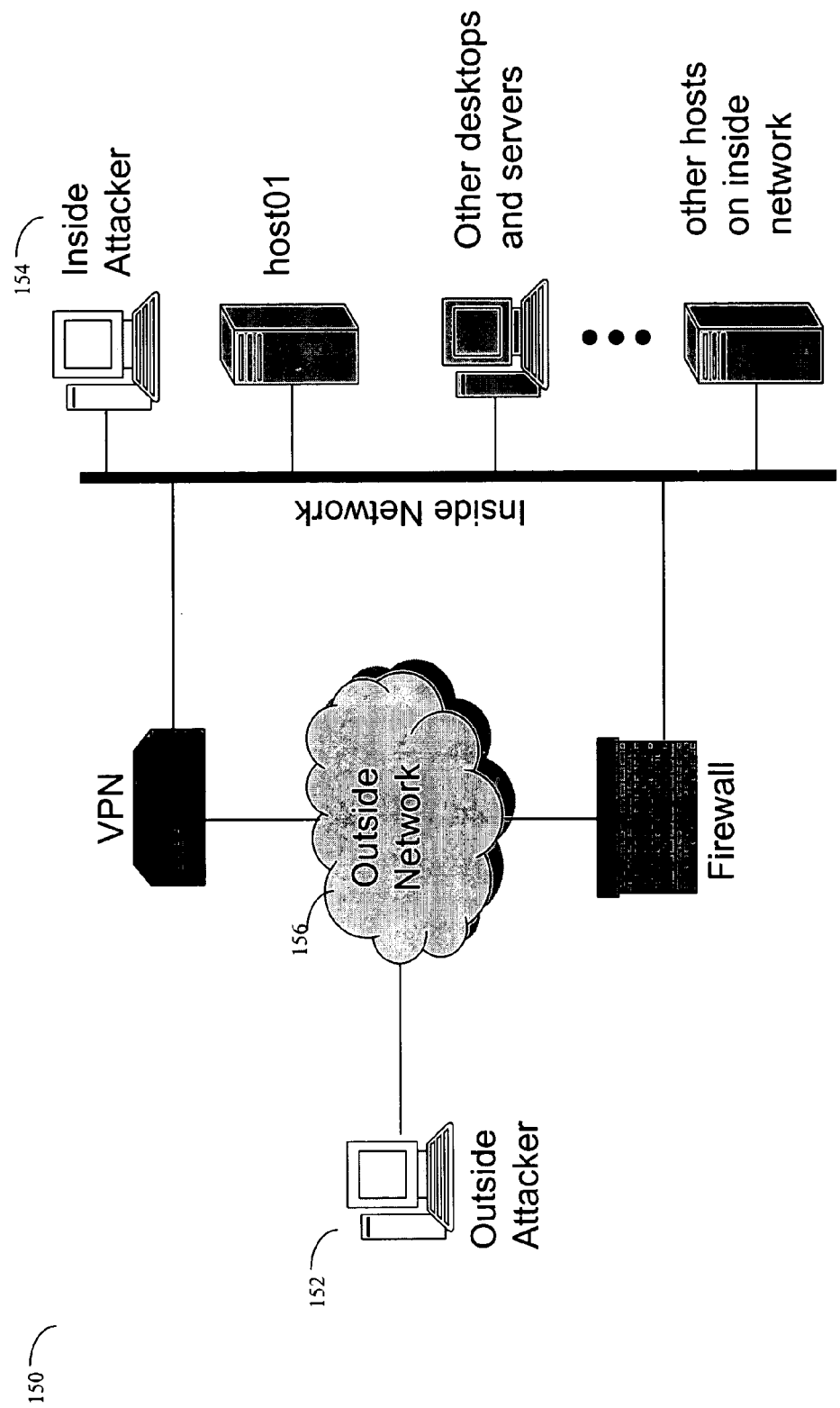
FIG. 5 is another example of a representation of a network.

Referring now to FIG. 5, shown is the representation 150 of a network. It should be noted that the representation 150 may be an instance of FIG. 1 with additional details shown therein. The outside attacker 152 may be on one of the hosts, such as 14a. The outside network 156 may be the Internet connecting the host 14a, upon which the outside attacker resides, to another second host. The second host may be within an inside network shown in the representation 150. The inside network may include other hosts protected from an outside network by a firewall and a VPN or virtual private network concentrator. Also noted within the representation 150 is an inside attacker 154. The inside attacker 154 represents a hypothesized attacker located from within the inside network.

It should be noted that in connection with the foregoing attack tree, one attack tree may be used to represent the possible attack paths from the single outside attacker position 152. A second or different attack tree may be used to represent the attack paths associated with the inside attacker 154. It should be noted that other techniques will be described herein in connection with combining various attack trees representing all of the possible trees associated with individual attack sites or origins. In other words, in order to assess a network having multiple starting points for attackers, multiple attack trees may be combined using the techniques described herein.

Figure 6:
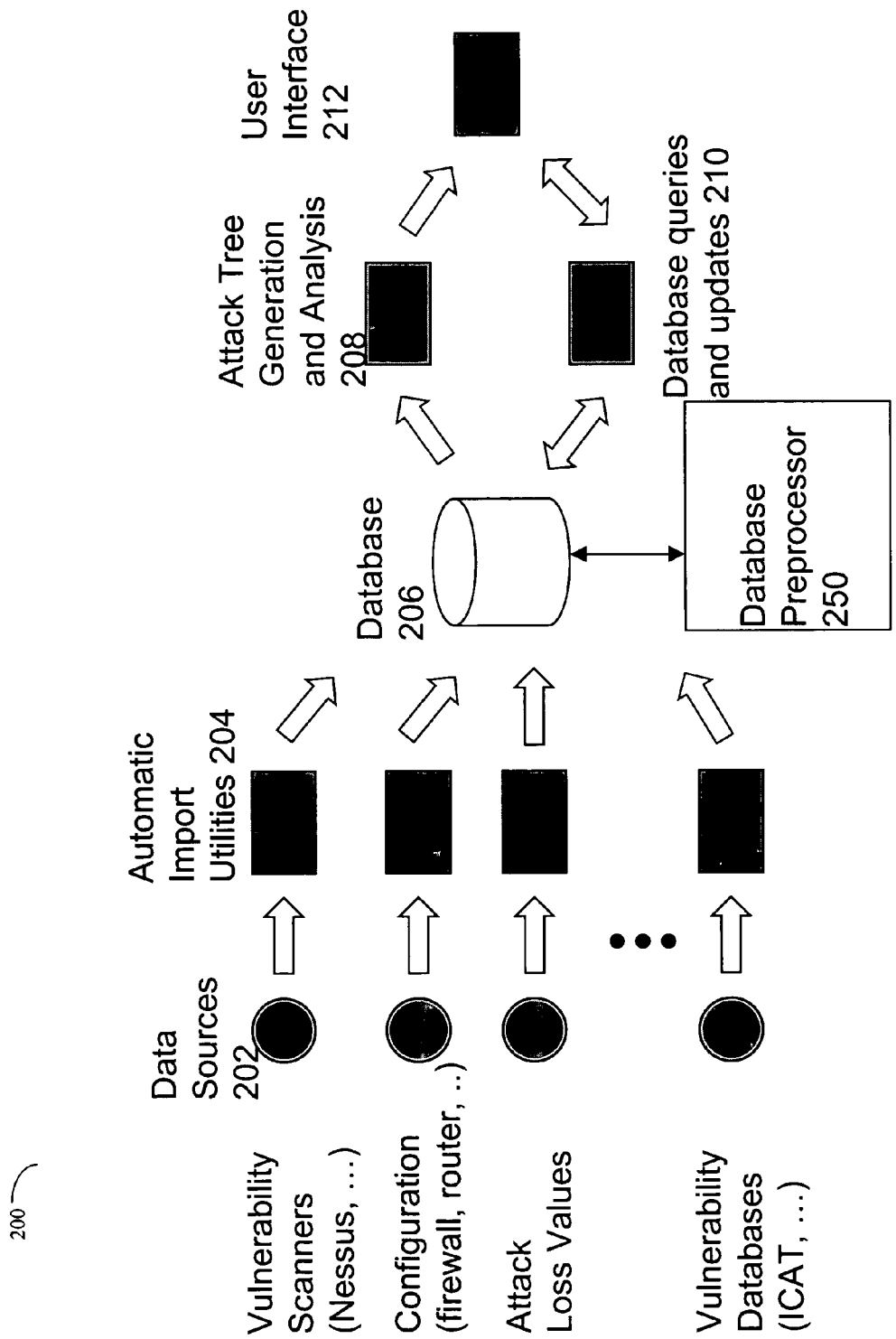
FIG. 6 is an example of an embodiment of an architecture of a system used in attack tree generation and assessing the security of a network.

Referring now to FIG. 6, shown is an example of one embodiment of an architecture 200 of a system that may be used in connection with attack tree generation and assessing the security of a network. One embodiment of this system 200 includes multiple data sources 202. In one embodiment, the data sources may include vulnerability scanner output data, configuration data such as from firewalls and routers, spreadsheets containing host attack loss values, vulnerability database information, and the like. It should be noted that an embodiment may preferably use automatic import utilities 204 to read one or more existing data files that include such information, or may alternatively provide for conversion of the existing data into a format for use in connection with the system 200. An embodiment may use a manual approach, an automated approach, or a combination thereof to obtain data in a format in accordance with that of the database 206.

It should be noted that an embodiment may use any one or more other or additional data sources other than as shown in the representation 200. Each of the different data sources that may be used in an embodiment are also described herein in more detail. Generally, all of the data that is input to the system 200 includes those data sources that allow for an accurate representation of the vulnerabilities in accordance with the topology as well as existing software and hardware configurations of a system. The configuration data may include, for example, the location of firewalls, routers and the like. Attack loss values may be used in connection with performing an assessment of the system and providing recommendations and prioritizing recommendations. Some the information regarding particular vulnerabilities may be stored in one or more databases, such as the ICAT Metabase described elsewhere herein. One or more tools, including, for example, vulnerability scanners such as the Nessus vulnerability scanner, may provide a data output used in connection with an import utility to import data into the system 200 in an automated fashion. The data used in the generation of the attack tree and its analysis may be stored in the database 206 from the one or more data sources 202.

The database 206 may be in any one or more of a variety of different representations. In one embodiment as will be described in more detail also herein, the database 206 may be a relational database storing the data in accordance with an entity relationship or ER model as known to those of ordinary skill in the art. The database 206 may be used by the attack tree generation and analysis module 208 to generate an attack tree and perform the necessary analysis to generate loss metrics and associated recommendations. The metrics that will be described herein may be used in connection with prioritizing the recommendations as well as other techniques.

In connection with producing information for the database 206, an embodiment may include a database preprocessor 250. Database preprocessor 250 in this embodiment performs processing steps in connection with populating the database with information for use in later steps in attack tree generation and analysis. Functionality and various processing steps that may be performed in an embodiment of 250 are described in more detail in following paragraphs.

An embodiment may also include a database query and updates module 210 which provides a user interface, for example, for querying the database 206 as well as for updating the database 206 rather than providing an update to one of the data sources 202. Additionally, the database query and updates module 210 may provide an interface by which the user may make selections causing data in the database to be modified. A new attack tree may be generated with this update or modification to the data to evaluate a change to the security of a network. The modification may include, for example, elimination or addition of new vulnerabilities, and the like.

The attack tree generation and analysis 208 uses the data included in the database 206 and produces one or more attack trees. The attack tree analysis 208 takes as input the generated attack trees and produces as output the analysis data and recommendations for improving the security of the network just analyzed. An embodiment may also include user interface 212, for example, that may be used in connection with performing operations for the system.

Each of the components of FIG. 6 is described in more detail in following paragraphs. It should be noted that an embodiment may use other systems with different architectures, components, and the like, having a different dataflow than as described herein utilizing the techniques described herein. The particular details included herein are provided by way of example and should not be construed as a limitation of the possible configurations and alternatives that may be used in connection with the techniques described herein.

Figure 7A:
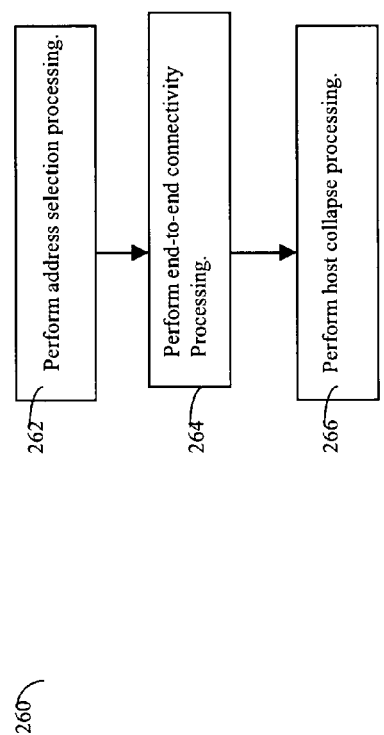
FIG. 7A is a flowchart of steps of one embodiment that may be performed by a database preprocessor for determining connectivity information.

Referring now to FIG. 7A, shown is a flowchart 260 of processing steps that may be performed in an embodiment in connection with populating the database with connectivity information. In this embodiment, the database preprocessor 250 may perform three tasks as included in flowchart 260 in connection with populating the database with connectivity information for the network under analysis. At step 262, address selection processing is performed which selects network addresses for attacker hosts. At step 264, end-to-end connectivity mapping determination is performed which formulates possible paths and determines if they are valid. At step 266, host collapse processing is performed in which equivalent hosts are determined.

In connection with step 262 for address selection processing, network addresses for attacker hosts are selected. Since firewall and router filtering policies rely on network addresses to identify the endpoints of a connection, the addresses used in an embodiment may be selected to yield maximum connectivity for the attacker hosts. In connection with the modeling of a network herein, attacker hosts are given network addresses before connectivity for these hosts can be computed. More than one address may be needed. If only one address is selected, connectivity may be missed since that address may be blocked by the local gateway or any intervening system or endpoint while other addresses are permitted to pass through. Therefore, the address selection processing in an embodiment may examine all the filtering and/or translation rules in the network under analysis to assemble a set of addresses that uncover all connectivity from the attacker host.

It should be noted the addresses selected for the attacker hosts can also be used for compromised hosts to model situations in which the attacker changes the network address of a host after compromising it. More detailed processing steps of one embodiment for performing address selection processing are described in connection with FIG. 7B.

An embodiment may determine the end-to-end connectivity of a network under analysis at step 264 using the connectivity processing described elsewhere herein, for example, as described in connection with FIGS. 22–29C. Using this technique, a full mapping of end-to-end connectivity within a network is prepared. End-to-end connectivity may be used in generating the attack trees. Given an attacker's current location in the network, the connectivity map may be consulted to immediately determine all hosts and network services the attacker can target from the attacker's current location.

In connection with step 266, hosts are collapsed in an embodiment in order to identify hosts that may be characterized as "equivalent". This may be used in reducing the number of unique hosts. In one embodiment, hosts are determined as equivalent when the following criteria are met for a set of host candidates:

the host candidates have the same vulnerabilities;
all vulnerabilities are on the same port numbers;
the host candidates are not administrative hosts or gateways;
the host candidates have equivalent attack loss values; and
the host candidates have equivalent connectivity.

When a group of multiple host candidates is collapsed, a single host is selected as being a representative host for the entire group. The representative host's attack loss value is the sum of the group's attack loss value.

It should be noted that host collapse processing may be an optional step in an embodiment for attack tree generation using the techniques described herein. In other words, the attack tree generation techniques may be performed using the full set of hosts or using representative hosts. If host collapse processing is performed in an embodiment, it may be performed after determining end-to-end connectivity so that connectivity equivalence may be determined. An embodiment may record any host collapse groupings in the database. In one embodiment, when the attack trees are generated using representative hosts, the generated attack tree may show the representative hosts. Recommendations generated may indicate a host as representative of a group. The ranking of the recommendation may be determined in accordance with the group's attack loss value and group members may be listed.

Figure 7B:
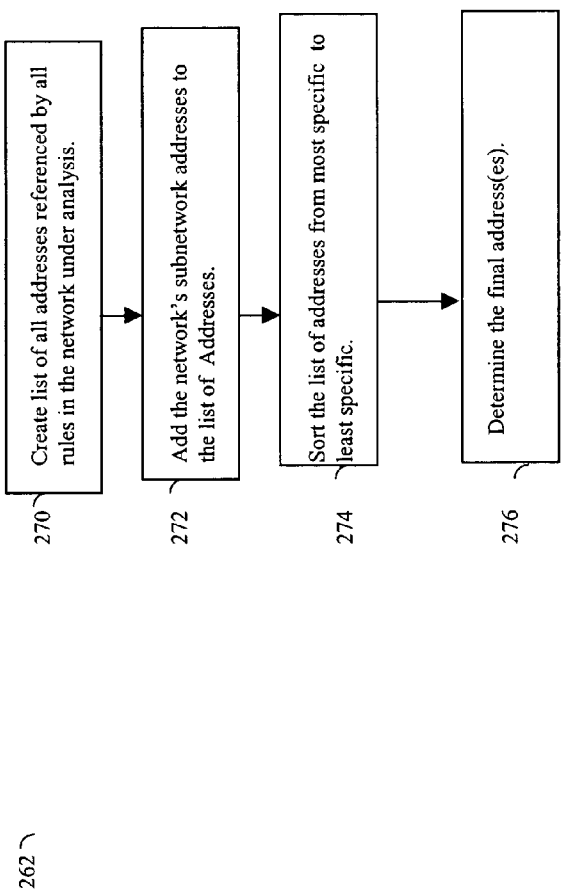
FIG. 7B is a flowchart of steps of one embodiment for performing address selection processing of FIG. 7A.

Referring now to FIG. 7B, shown is a flowchart of processing steps of one embodiment for performing address selection. Other embodiments may use different methods than as described herein and this example should not be construed as a limitation. At step 270, a list of all addresses referenced by all rules in the network is created. An address used in one embodiment may be a specific address (e.g., 192.168.1.1), a range of addresses expressed by an address and prefix length (e.g., 192.168.1.128/25), or a range of addresses expressed by a beginning address and an end address (e.g., 192.168.1.1–192.168.1.10). At step 272, the network's subnetwork addresses are added to the list of addresses. The subnetwork addresses may include those for the inside subnetworks and those for the outside subnetworks. The subnetwork addresses may be expressed in prefix length notation (e.g., 192.168.0.0/24). At step 274, the list of addresses is sorted from most specific to least specific, and duplicates are eliminated. An address X in one embodiment is characterized as "more specific" than an address Y if the range of X is smaller than the range of Y. At step 276, the final addresses are determined. For each address in the list resulting from step 274, if the address to consider is a specific address, select that address and place this address into a final list of selected addresses. If the address to consider is a range, then choose an address from that range. If the chosen address is already in the final list, or within the range of a more specific address, try again, until a usable address is selected, or a retry limit is reached.

The list of addresses resulting from step 276 is assigned to all attacker hosts. Each attacker host is assigned the same list of network addresses. As will be seen in connection with determining the end-to-end connectivity processing steps described elsewhere herein, such as in connection with FIGS. 22–29C, these addresses may be blocked by egress filtering on the gateways or gateways connected to the attacker host's local subnetwork. In other words, these addresses will therefore yield no additional connectivity for the attacker host once filtering rules, such as those of a firewall policy, are applied in determining connectivity. However, these addresses may expose configuration errors, such as, for example, improper or missing egress filtering, by revealing connectivity which should not exist. These addresses may also be used in connection with generating attack trees as described elsewhere herein, such as in connection with FIG. 11, to associate alternative connectivity maps to hosts as within the current host of an attacker state. A connectivity map associated with a current host of an attacker state may be a connectivity map associated with an attacker host based on the addresses selected for an attacker host and the connectivity processing described elsewhere herein, such as in connection with FIGS. 22–29C. An alternative connectivity map may replace a connectivity map assigned to the current host based on addresses assigned to the current host where said addresses may be obtained through means described elsewhere herein, such as in connection with FIG. 9A. Prior to attack tree generation, an alternative connectivity map may be associated to all hosts which may become a current host of an attacker state, or, an alternative connectivity map may be associated with a host as a host becomes a current host of an attacker state. Use of alternative connectivity maps for compromised hosts may reflect a worst-case condition in which an attacker with sufficient privileges and access changes the network address of a compromised host to obtain such connectivity as may be made available through the use of one or more other network addresses.

Figure 8:
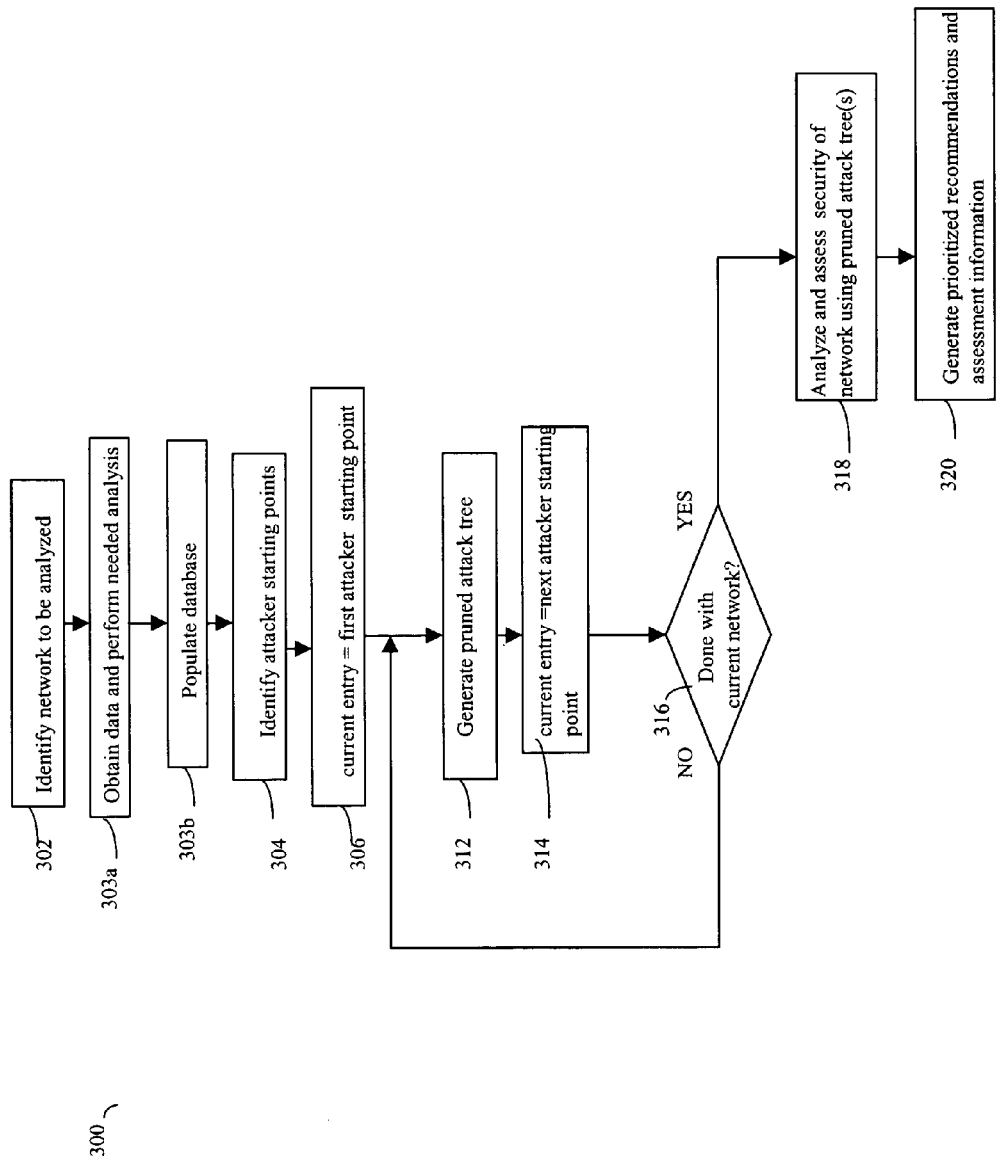
FIG. 8 is a flowchart of steps of one embodiment for assessing the security of a network using the system of FIG. 6.

Referring now to FIG. 8, shown is a flowchart 300 of steps of one embodiment for assessing the security of a network using the model or architecture 200 of FIG. 6. At step 302, the network to be analyzed is identified. It should be noted that a single network being analyzed may be made up of multiple connected networks. The entire single network may be analyzed as one network. Alternatively, each of the multiple networks may also be assessed or analyzed separately and then combined. This is described elsewhere herein in more detail. At step 303a, data needed to perform the current analysis of the current attack tree is obtained. Additionally, any analysis of the obtained data as well as any conversion may also be performed in order to put the data in a format for use with the database. At step 303b, the database is populated with the data. It should be noted that the particulars of the data that are obtained and analyzed as well as an example of one embodiment of a data model for a database populated at step 303b are described in more detail elsewhere herein. It should be noted that steps 302, 303a and 303b may be characterized as part of a data collection process rather than as part of the process for generating attack trees.

Control proceeds to step 304 where the one or more attacker starting points to the particular network are identified. Referring back to FIG. 5, it was noted that an attack may occur from within a network, such as element 154, as well as outside of the network, such as element 152. At step 304 for the configuration of FIG. 5, two attacker starting points are identified. At step 306, current entry is assigned the first attacker starting point. The processing steps that will now be described generate a pruned attack tree for each of the different attacker starting points. Subsequently, as will be described, assessments of each of the attack trees corresponding to each attacker starting point may be combined to provide an assessment with respect to the current network.

At step 312, a pruned attack tree is generated for the current entry. The particular details of how to generate a pruned attack tree are described in more detail elsewhere herein. At step 314, the current entry is assigned the next attacker starting point so that an attack tree may be generated for each different attacker starting point. At step 316, a determination is made as to whether processing is complete for the current network. In other words, at step 316 a determination is made as to whether all of the attack trees in accordance with the particular possible attacker starting points have been generated. If not, control proceeds back up to step 312. If at step 316 it is determined that processing for the current network is complete, control proceeds to step 318 where an analysis and assessment of the security of the network is performed using the pruned attack tree or trees generated. Step 318 may include generating one or more metrics. At step 320, assessment information, such as the one or more metrics from step 318, may be used to produce prioritized recommendation. It should be noted that the processing of steps 318 and 320 are described in more detail elsewhere herein. In one embodiment, steps 318 and 320 produce and utilize metrics in order to assess the current state of the network security as well as provide alternative evaluated scenarios when one or more changes are made within the network identified and currently being analyzed at step 302.

Figure 9A:
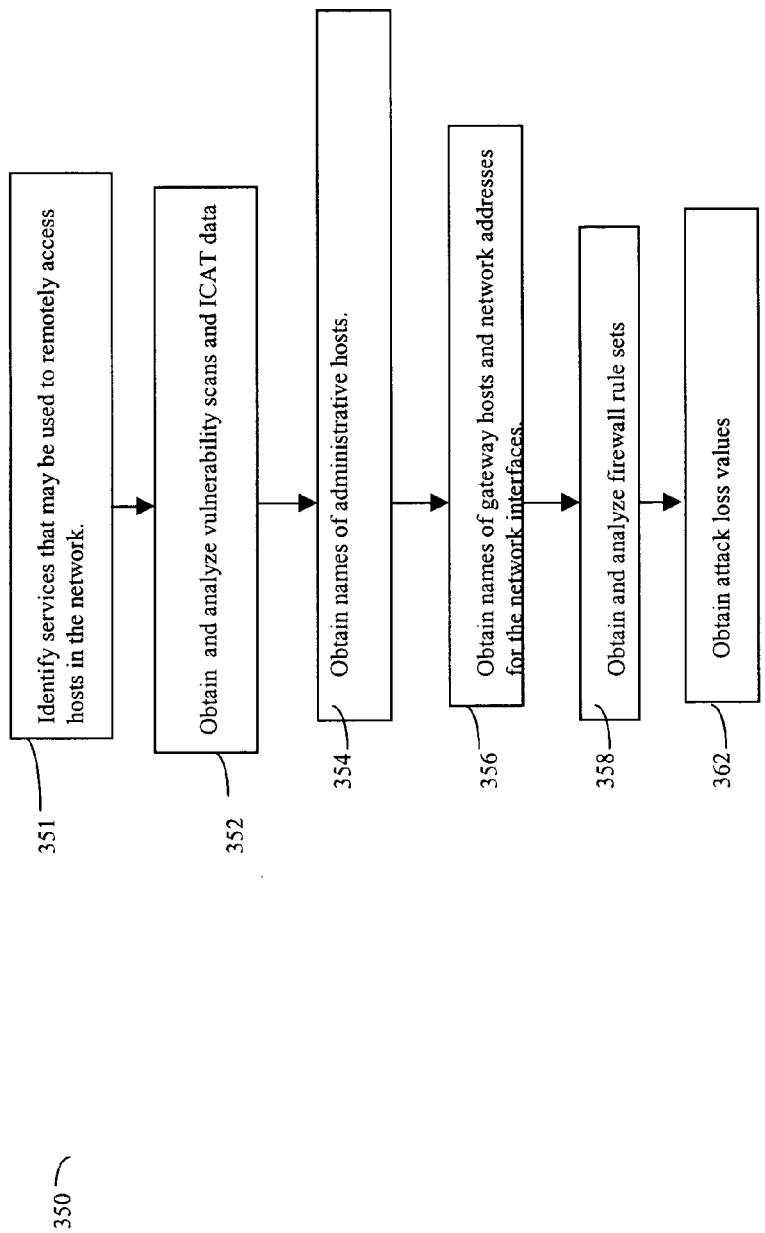
FIG. 9A is a flowchart of more detailed steps of one embodiment for obtaining data and performing any associated data analysis to populate the database of FIG. 6.

Referring now to FIG. 9A, shown is a flowchart 350 of more detailed steps of one embodiment for obtaining data and performing the needed analysis previously described in connection with flowchart 300. It should be noted that the particular data and its forms described herein should not be construed as a limitation. Other embodiments may use other data than as described herein and the data may be in one or more different forms. The embodiment described herein may use the data produced as an output of one or more tools, and further convert and/or analyze this output data in order to facilitate population of the database described elsewhere herein. At step 351, each service that may be used to remotely access hosts in the network are identified. The foregoing information may be used to determine which hosts are vulnerable to sniffing attacks (e.g., obtaining passwords through monitoring network messages), as well as which hosts may be compromised as a result of an administrative host being compromised. In one embodiment, a default set of remote access services may be included in a spreadsheet used as an input data source for the system 200. The particular service(s) and particulars of each service may vary with each embodiment.

At step 352, vulnerability scan data and ICAT data are obtained and analyzed. The ICAT Metabase is a public database available at http://icat.nist.gov which includes information concerning whether a particular vulnerability is local or remote, and the outcome of exploiting a vulnerability. In one embodiment, vulnerability scanners, such as the Nessus scanner, may be used to automatically generate vulnerability information about one or more hosts within the network being analyzed. The output of such tools, optionally in conjunction with ICAT data, can be used in populating the database. In particular, this information about the vulnerabilities and ways in which these vulnerabilities may be exploited provide information related to the different attacker states and actions to obtain these particular states. Network data as may be provided as an output of the vulnerability scanner may include, for example, host names and (Internet Protocol) IP addresses, open ports on the hosts, services and software versions running on the different ports, known vulnerabilities in the various versions and the like. The vulnerabilities reported by the vulnerability scanner may be correlated with information available from one or more databases, such as the ICAT Metabase available from NIST, as well as other sources, in order to automatically determine which attacker actions should be attached to each vulnerability. An embodiment may also acquire additional information from other sources or alternatively may use information from other sources than as described herein. It should be noted that additional detail about how the vulnerability scan data and ICAT data may be analyzed and used in an embodiment are described elsewhere herein.

At step 354, the names of administrative hosts are obtained. As used herein, an administrative host may be characterized as a host used in management of other hosts and/or resources. The administrative host may, for example, provide access to other hosts, firewalls, routers, and administrative services such as those performed with system privileges. Once an attacker compromises an administrative host, generally the attacker may have access to a large number of other hosts. The information from steps 354 and 351 may be used to determine which hosts may be compromised as a result of an administrative host being compromised. In one embodiment, the data for step 354 may be included within a spreadsheet or other input format used as a data source for the database. This, as well as other data sources described herein may be generated manually, automatically, or a combination thereof. At step 356, the names of the gateway hosts and the addresses for the network interfaces are obtained. The gateway hosts may be identified using any one or more different techniques. In one embodiment, the gateway hosts may be gathered in an electronic spreadsheet. A gateway host may be characterized as a host that serves as a gateway or a link to another network. It should be noted that there may be more than one gateway host in a network. At step 358, the particular firewall rules are obtained, analyzed, and placed in a form to populate the database model described elsewhere herein. More detailed steps are described elsewhere herein in connection with analyzing the firewall rule sets. As described in following paragraphs, the firewall rule sets may be applied in connection with determining connectivity of the network. At step 362, attack loss values are obtained for each of the hosts. The attack loss values obtained and used at step 362 represent a value associated with each of the hosts. These values may be generated using an automated technique, a manual technique, or a combination thereof. The values generated depend on the particular value associated with a host in a particular network being analyzed. This may vary in accordance with each particular embodiment. One technique may utilize a manual technique in which someone who is familiar with the network, such as an administrator, assigns a value to each of the hosts. Attack loss values and considerations that an embodiment may consider in determining these values are described elsewhere herein in more detail.

It should be noted that an embodiment may use other data, for example, in obtaining the network configuration and connectivity information needed and used as described elsewhere herein.

It should be noted that the data from the ICAT Metabase may be available in one or more different forms. One embodiment may use the ICAT data which is in a format for use with Microsoft Access. The ICAT data in this embodiment is also then exported in XML format.

What will now be described in more detail are the attack loss values. Attack loss values are a metric assigned in this embodiment on a per host basis. In one embodiment, the attack loss values may be manually assigned to each host. For example, a particular user, such as a system administrator or other individual familiar with determining a value representing a cost of a compromise associated with a particular host, may determine each of the attack loss values. Each of the attack loss values may be characterized as representing a relative value of a particular host as compared to other hosts. Generally, more important hosts have higher attack loss values than less important hosts.

An embodiment may consider any one or more different factors in evaluating a cost of a compromise associated with a particular host. The role that a host plays in a network may be considered as well as the criticality of the data stored on, or accessible through, the host. The role or particular services provided by a host as well as accessible through that host may also be considered. For example, if a host provides access either directly or indirectly to mission critical or sensitive data, or mission critical or sensitive services, then the attack loss value associated with a particular host may be high. A particular host may access data, for example, stored locally at that host. A first host may also provide an attacker access to critical data stored on a second host, a service available on a second host, and the like. Other considerations in assigning host values include, for example, a confidentiality level of data and other types of categorizations that may already exist for use in an embodiment.

It should also be noted that an embodiment may use an automated technique, a manual technique, or combination thereof in obtaining any information in an appropriate form for use by an embodiment in performing the techniques described herein.

Referring now to FIG. 9B, shown is an example 370 of a table including attack loss values that may be associated with one or more hosts. The table 370 in this example includes three columns of information. The first column 372 includes an identifier of the particular host. The second column 374 includes a description of a particular host. The third column 376 includes an attack loss value associated with the particular host designated in the first column 372 on the same row. Table 370 may be stored in any one of a variety of different formats and may be produced using any one of a variety of different automated and/or manual techniques. In one embodiment, the attack loss values may be established by consulting a system administrator to identify the most important hosts on a network. The system administrator or other person may assign these values and store them, for example, in a spreadsheet format as may be partially represented by the table 370. The attack loss values may be imported in an automated fashion using a programming tool or other technique in order to populate a database described elsewhere herein.

Figure 10:
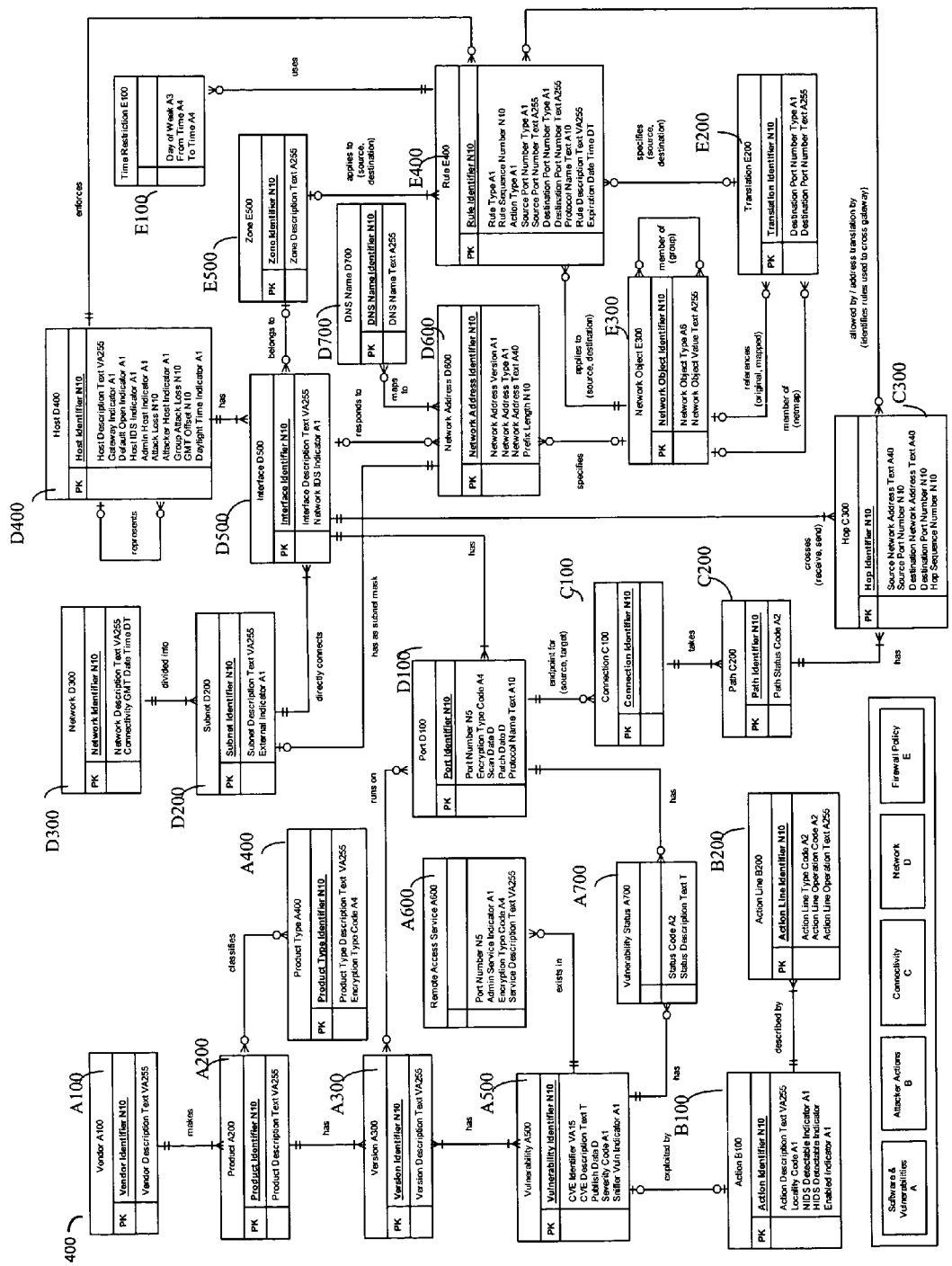
FIG. 10 is a representation of one embodiment of a data model used in designing the database of FIG. 6.

Referring now to FIG. 10, shown is a representation of one embodiment of a data model 400 that may be used in designing a database, such as the database 206 previously described in the system 200 of the FIG. 6. In this embodiment, the data model is represented in the form of an E-R data model or entity-relationship model. As known to those of ordinary skill in the art, each of the rectangular boxes represents an entity with associated relationships as noted by the connecting lines between each of the different entities. It should be noted that other embodiments may use other representations as well as other models in connection with representing and storing data as may be used in an embodiment.

Representation 400 includes 5 categories of entities. Category A may be referred to as the software and vulnerability category, category B is the attacker actions category, category C is the connectivity category, category D is the network category, and category E is the firewall policy category. Entities in each of the categories A through E have associated element labels with a prefix identifying the category to which each entity belongs. For example, the software and vulnerability category A entities are denoted such as A100, A200, A300, A400 and the like. Similarly, each of the other categories have their associated entities prefixed with the category letter. Category A entities describe information about particular software and associated vulnerabilities, for example, that may be used on one of the hosts. Category B entities describe information about actions that an attacker may take and the resulting attacker state, such as system or user access on a particular host defining a privilege level of the attacker. Category C entities describe under what conditions each host is allowed to connect to another host. In other words, connectivity category C describes what end-to-end connectivity is permissible between hosts in a network in accordance with the firewall policy rules. Category D entities describe information about network entities, such as the hosts, and characteristics of different types of hosts. Category E entities describe the actual firewall policy rules which, when analyzed, produce the results used in populating category C entities.

With reference to FIG. 10 element 400, the data model entities that may be populated using the vulnerability and ICAT data, as described in connection with step 352, include software and vulnerabilities A, and attacker actions B, and network configuration D. Step 352 in one embodiment populates all entities of category A except for that data regarding remote access services. The information obtained at step 354 may be used in populating information about the particular administrative hosts as indicated in entity D400 Admin Host Indicator. The information obtained at step 356 may be used in populating information about the particular gateway hosts as indicated in entity D400, Gateway Indicator. The particular firewall rules from step 358 are obtained, analyzed, and placed in a form to populate the firewall policy category E of the database model 400 of FIG. 10. Additionally, the analysis information obtained from analyzing the firewall rule sets may be used to populate entities in category C Connectivity of data model 400 of FIG. 10. Data from step 351 in this embodiment may be used to populate the portion of category A entities relating to remote access service entity A600. Remote access information includes, for example, such as whether there is encryption, and the like, when accessing a remote host with a password.

Included in category A for the software and vulnerabilities category are entities A100–A700. Entities A100, A200, A300 and A400 may represent information about a particular software product, vendor, and version. A vulnerability associated with a software product and version thereof may be represented using A500. A500 may include, for example, vulnerability identifier information, publication data regarding the vulnerability, an associated severity code, and an indicator as to whether an attacker must "sniff" a password to exploit the vulnerability. Other information for category A entities may be obtained from other data sources described elsewhere herein. A600 may be used to represent a remotely accessible service. A600 may include, for example, a port number through which a remotely accessible service is available, an indicator as to whether the service is an administration service, and an indicator as to whether encryption is used. The vulnerability status entity A700 may be used to relate each particular port with one or more associated vulnerabilities used in processing steps described herein when building a pruned attack tree.

Associated with each vulnerability in this embodiment is an attacker action described by B100 that an attacker may perform to exploit the vulnerability associated with the action. Entity B200 includes information about the resulting attacker and/or network state once the vulnerability is exploited. For example, entity B200 may be used to indicate that an attacker's state may increase from user to system level on a host when the associated vulnerability is exploited. B100 NIDS Detectable Indicator indicates if an associated action is detectable by a network Intrusion Detection System (IDS). The HIDS Detectable Indicator indicates if the action is detectable by a host IDS. Both of the foregoing (NIDS and HIDS) may be included in an embodiment for modeling a network. IDS modeling may be used to show which paths of an attack tree may be seen by an IDS and may be used to produce recommendations for IDS placements.

A physical network structure or configuration is represented by entities D100–D700 in the network category D.

D100 is created for each port which in this embodiment is used as a connectivity endpoint. D300 includes data describing the particular network under assessment. Each network as represented by D300 may include one or more subnets. Each subnet may be represented by an entity D200 associated with an instance of D300. Each host in the network is represented by an instance of D400 and may have associated with it one or more network interfaces each represented by an instance of entity D500. Each port is represented by an instance of D100. Information about how a particular network interface may be referenced or is otherwise identified in the network may be described in an instance of D600 and/or D700. In D400, the Default Open Indicator indicates the default forwarding policy of a gateway when no rules are matched. The Host IDS indicator indicates if this host has a host-based IDS. Group Attack Loss is the sum of the values of hosts in a particular group if the host is a representative host of others in a group. Different indicators or fields may be used in an embodiment to indicate a time condition as related to a rule. For example, D400 includes a GMT Offset field representing the departure from GMT of the time zone where the host is located, in standard time. A Daylight Time Indicator may also be used to indicate if the time zone where the host is located observes daylight savings time.

Information regarding end to end connectivity between two points in the network under analysis is represented by entities C100–C300 in category C connectivity. C100 represents a pairing of two endpoints, such as a source or a target or destination endpoint. C200 is an identifier of the particular path. C300 includes information about a particular hop in the path. Associated with each C100 instance, for example, may be two instances of D100 in which a first instance of D100 represents a first endpoint in the connectivity and a second instance of D100 represents a second endpoint in the connectivity.

Entities E100–E500 describe the firewall rules in a particular network. Entity E100 indicates the days of the week and the times of the days when a particular firewall rule is active. Entity E300 describes a network object to which a firewall rule described by E400 applies. E200 indicates any address translation for a connection endpoint since, for example, a host may be referred to using one address on one side of a firewall and a different address on another side of a firewall. E200 is used in one embodiment for both source and destination translation rules. It should be noted that an embodiment may also have different locations for storing source and destination translation rules. The information in category E entities may be determined as part of processing and analyzing of firewall rule sets prior to generating the pruned attack trees.

Entity E500 represents a collection of interfaces where all interfaces in a zone are on a same gateway. If a gateway has multiple interfaces to the outside, and the same rule(s) apply on the outside independent of the outside interface, the interfaces may be grouped into a zone and the rules associated with the zone. This may be used as an alternative in an embodiment to, for example, associate a separate set of rules with each interface.

It should be noted that the category D entities may be used in indicating how to take the vulnerability scan information and populate the category A and B entities.

A variety of different relationships between the different entities included in each of the categories are possible as indicated in the data model representation of FIG. 10 for one particular embodiment. Other embodiments may use other representations and other entities than as described herein in accordance with the particulars of each embodiment.

Figure 11:
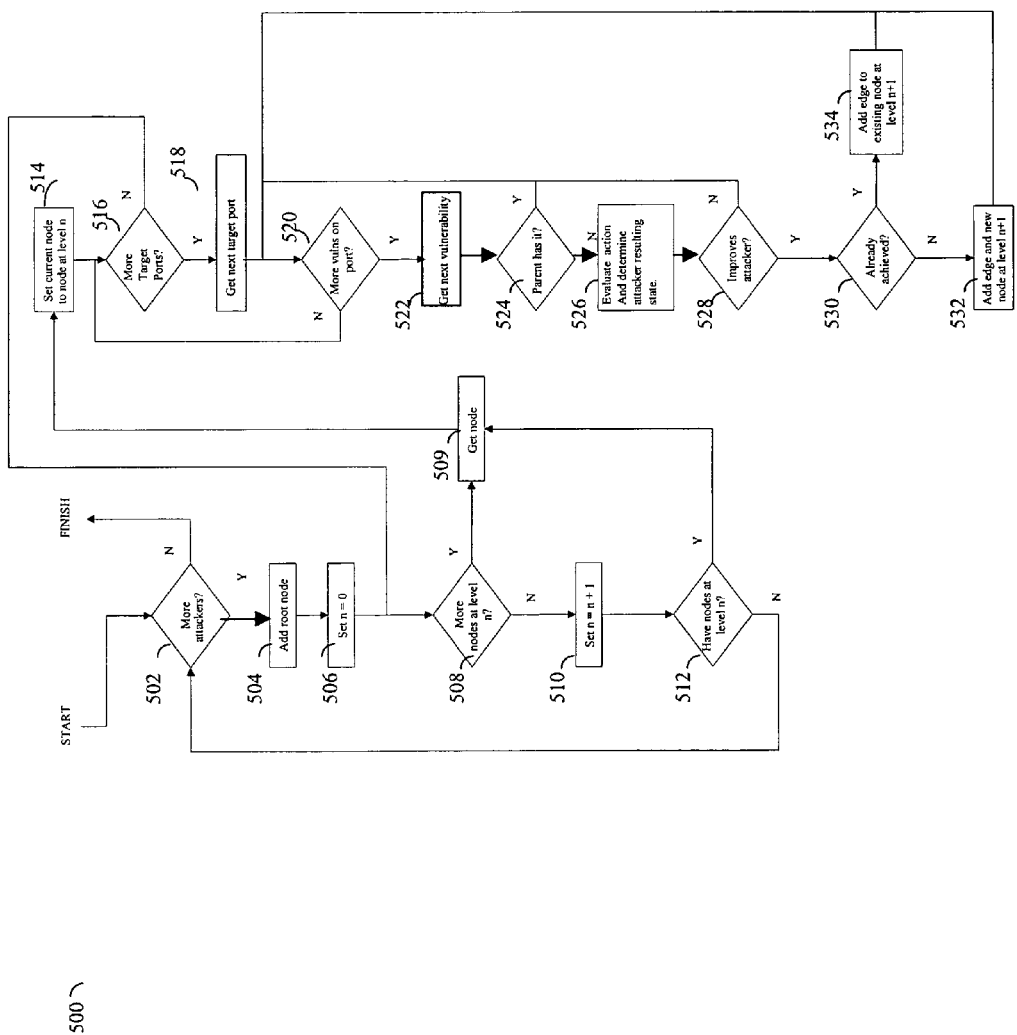
FIG. 11 is a flowchart of steps of one embodiment for forming a pruned attack tree.

Referring now to FIG. 11, shown is a flowchart 500 of steps of one embodiment that may be performed in connection with forming a pruned attack tree. The method of pruned attack tree generation as described herein represents a pruned version of what may be characterized as a full or complete attack tree. A full or complete attack tree shows all paths including indirect ones by which an attacker may start from a root node and traverse to an end point or terminal node. In other words, the full or complete attack tree shows all combinations of accesses between different nodes and different actions available to an attacker from a particular starting point. Data included in the database in this embodiment includes information for producing a full attack tree. However, using the techniques described herein, one or more pruned attack trees may be generated using the information from the database. The pruned attack trees may be used in further processing steps such as in analyzing a network represented in accordance with the generated pruned attack trees.

As described elsewhere herein, the attack trees may be used to represent how a malicious user may exploit vulnerabilities in a computer network to compromise a host on the network. The nodes of the tree represent various attacker states such as a particular host with a particular access or privilege level, such as system or user level access. The edges between the nodes represent state transitions from one state to another. An attacker transitions from a source node to a destination node by exploiting a vulnerability on the destination host provided that the exploit is possible from the source host. The techniques described in the following paragraphs use a forward chaining technique to discover all possible attack paths from a particular attacker starting state. In other words, the attack tree answers the question "What are all the hosts that may be compromised on a network from a particular attacker starting point?". The attack tree may also be used in answering other questions, for example, regarding which vulnerabilities and which attack paths may be associated with a compromise of a network.

The attack tree described in the following paragraphs may be characterized as comprehensive showing everything that may be compromised by an attacker positioned at a starting point. The attack tree described herein may be characterized as scaleable providing an efficient tree generation technique for worse case attack trees for small and or large networks. The embodiment described herein may be based on worst case assumptions, for example, that the attacker knows or can discover all connectivity for all services available, all unencrypted passwords may sniffed or obtained on the network, and all encrypted passwords may be key captured on local hosts. The tree generation technique described in the following paragraphs uses an efficient, forward chaining, breadth first search (BFS) technique providing for judicious pruning of redundant states and paths to reduce the size and storage requirements associated with each attack tree. The BFS technique generates a pruned attack tree such that all nodes at a current level are considered for addition to the pruned attack tree prior to considering nodes at a next level. The BFS technique is well-known and described, for example, in "Data Structures and Algorithms" by Aho et al. from Addison-Wesley. Generally, BFS is a way of traversing the nodes of a tree by visiting all nodes at a same level before visiting a node at a next level within the tree. Edges and resulting states achievable from a current node by exploiting vulnerabilities are evaluated and either pruned or added to the attack tree under construction using the pruning technique described in connection with flowchart 500.

The attack tree generation technique described in the following starts by generating a root node using information from the database and represents an attacker with system level access in a hypothetical host at a specified location within the network. At each level of the tree, for each node at that level, each possible vulnerability is considered which may change the attacker's state. A vulnerability may be exploited by an action causing a transition from one node to another if there is physical connectivity between a first point and a second point, such as between two hosts, if the required network traffic between the source and destination is not filtered by firewall policy, and if all requirements of the particular vulnerability are met. In other words, if it is required for a particular vulnerability that an attacker must be coming from an administrative host, this requirement is tested in order to determine if, for example, the current state represents an administrative host. An attacker's state changes or transitions if the attacker moves to a new host, increases access level within the same host, or otherwise gains something. This is described elsewhere herein in more detail.

A new node may be added to the next level of the tree to represent the resulting attacker's state unless this particular state has already been reached using the same vulnerability at a previous level in the tree as described elsewhere herein in more detail. This "unless" clause effectively prunes redundant nodes and paths to avoid generating a full tree with the generated pruned tree representing all needed information for a network security assessment. Each level of the tree is iterated through until a point is reached where no new nodes are added to the tree during the processing of a level.

Recall that as described elsewhere herein, in this embodiment, one attack tree is generated for each attacker starting point within the network. The steps of flowchart 500 may use information from the database to produce one pruned attack tree rather than a full attack tree for each attacker starting point. As described elsewhere herein, the one or more pruned attack trees may be used in evaluating and assessing the current network being analyzed.

A node in the attack tree described herein may be defined using four pieces of information: the network state, the attacker state, a list of parent nodes, and a list of child nodes. The network state describes the overall network configuration. As used herein, the term "network configuration" may be characterized as all information in the database about a network including, for example, all entity categories A–E. The attacker state describes the attacker's configuration. The attacker's state may be defined using four pieces of information: the current host that an attacker is on, an attacker's access level on the current host, a list of accesses obtained by the attacker, and a list of accesses used by the attacker. An edge in the attack tree described herein may be defined using two pieces of information: an action that drives a transition from one node to another, and the target port the action is performed against. Other embodiments may represent states differently than as described herein.

At step 502, a determination is made as to whether there are any remaining attacker starting points for which an attack tree may be generated. If there are no more attacker starting points, processing stops. Otherwise, control proceeds to step 504 to begin processing steps to generate a new attack tree for the current attacker starting point by adding a root node to the new attack tree. At step 506, a tree level counter, n, is set to 0 corresponding to the level of the root node of the tree. Note that each level of the tree results in the level counter n being incremented by one (1).

At step 508, a determination is made as to whether there are more nodes at the current level n which have not yet been evaluated. If so, control proceeds to step 509 to obtain the next node to be evaluated at level n. Processing continues with step 514 where the current node is set to the next node to be evaluated. At step 516, a determination is made as to whether there are any remaining target ports associated with the current node. In this embodiment, the current node has an attacker state with a current host. The current host has interfaces, each of which has a connectivity map listing target ports. It should be noted that as described elsewhere herein, a node in the attack tree in this embodiment may be represented by several pieces of state information including an attacker state. An attacker state may be defined using multiple pieces of state information including a current host of an attacker. The target ports examined for a current node in 500, such as at steps 516, 518, and the like, are those ports associated with each interface of the current host for the current node being evaluated.

If, at step 516, a determination is made that there are no remaining target ports, control proceeds to step 508 to the next node to be processed at the current level. If there are remaining target ports, control proceeds to step 518 to get the next target port. For the current target port, a determination is made at step 520 as to whether there are any remaining vulnerabilities to be examined. If not, control proceeds to step 516. If so, the next vulnerability is obtained at step 522.

A determination is made at step 524 as to whether any ancestor of the current node has the same vulnerability and corresponding target port. In other words, the determination at step 524 asks the question "Are the proposed vulnerability and target port already included in the current attack tree as being achievable directly from any ancestor of the current node?" The ancestors of the current node as referenced in step 524 processing are the nodes along the path between the parent of the current node and the root node. If step 524 determination evaluates to true, control proceeds to step 520. It should be noted that step 524 evaluating to true results in pruning the resulting attack tree by not adding the proposed edge and resulting node from the current node. As a further consequence, any subtree which may have otherwise emanated from the resulting node is also pruned from the tree.

If, at step 524, it is determined that no ancestor of the current node has the same vulnerability and corresponding target port, control proceeds to step 526 where the action corresponding to the current vulnerability is evaluated to determine the resulting attacker state. A determination is made at step 528 as to whether the attacker improves as a result of performing the current action to exploit the current vulnerability. If not, control proceeds to step 520. Otherwise, control proceeds to step 530 where a determination is made as to whether the resulting attack state is already achievable from the current node by another vulnerability and/or target port. If so, this means that the current attack tree already has a node at level n+1 corresponding to the current resulting attack state. Accordingly, to represent the new current vulnerability and target port in the attack tree, control proceeds to step 534 where an edge is added from the current node at level n to the already existing resulting node at level n+1. Control then proceeds to step 520.

The techniques described herein create a tree known to those skilled in the art as a rooted tree, augmented by steps 530 and 534 to produce one or more edges between nodes. Steps 530 and 534 are performed as an optimization which may reduce the number of nodes in the tree. Omission of steps 530 and 534 produces a tree which is equivalent to the augmented tree produced with the inclusion of steps 530 and 534. Unless otherwise specified, all references herein to a tree refer to an augmented tree. The edges are shown as directed edges, and the presence of directed edges should be considered a further augmentation of the definition of a tree. The representation achieved by the augmented tree may be achieved through other means, such as non augmented rooted trees, free trees, directed acyclic graphs, undirected graphs, and other forms of graphs, and these representations should be considered as equivalent to the augmented tree described herein.

A variety of data structures may be used to represent trees and their equivalents as described herein. These data structures may include without limitation pointer-based, address-based, location-based, and linked data structures, and include without limitation arrays, linked lists, hash tables, adjacency lists, and adjacency matrices. The data structure used to represent a tree or an equivalent as described herein not should be considered as limiting the definition of a tree or an equivalent. The data structures described herein and other are well known as described, for example, in Algorithms and Data Structures: Design, Correctness, Analysis. Jeffrey H Kingston. Addison-Wesley, 2nd Edition, 1998, and Introduction to Algorithms. Thomas H. Cormen, Charles E. Leiserson, Ronald L. Rivest. The MIT Press, 1990.

If, at step 530, it is determined that the current attack tree does not already have the resulting node corresponding to the resulting attack state, control proceeds to step 532 where both a new node is added at level n+1 and an edge is added connecting the current node at level n to the new node at level n+1. Control then proceeds to step 520.

The foregoing processing continues to evaluate each target port and each vulnerability for the nodes at the current level. If, at step 508, it is determined that there are no more nodes to be evaluated in the current tree at level n, control proceeds to step 510 where the level counter n is incremented by one (1). Control proceeds to step 512 to determine if there are any nodes at level n to be evaluated. If so, control proceeds to step 509 to process all the nodes at the current level. Otherwise control proceeds to step 502 to begin generating any remaining attack trees.

With reference to FIG. 10, what will now be described is one example of how the information in the database may be used in evaluating nodes with the pruned attack tree generation technique described herein. A host that is a starting point or entry point for an attacker may be identified by an instance of D400 with the field attacker host indicator set to indicate an attacker starting point. Associated with D400 in this example may be one or more network interfaces each represented by an instance of D500. For each instance of D500, there may be one or more associated ports each represented by an instance of D100. An instance of D100 may correspond to a source directly or a target port indirectly of a connection. All connectivity possible from a network interface may be evaluated by determining each destination port associated with a network interface. Each of the port entities D100 corresponding to a target port is determined and used, for example, at step 518 of flowchart 500 of FIG. 11. Each vulnerability, for example, as used at steps 520 and 522 of flowchart 500, may be obtained by using related entities A700 and A500. The associated action may be evaluated, as in step 526 of flowchart 500, using related entities B100 and B200 associated with a vulnerability instance of A500. Whether a particular vulnerability results in an increase in attacker privileges, for example, may be represented in an instance of B200. In one embodiment, attacker privileges or access levels may be one of system access, user access, denial of service, or some other level.

What will now be described are examples illustrating the use of the pruning technique of flowchart 500 of FIG. 11.

Figure 12A:
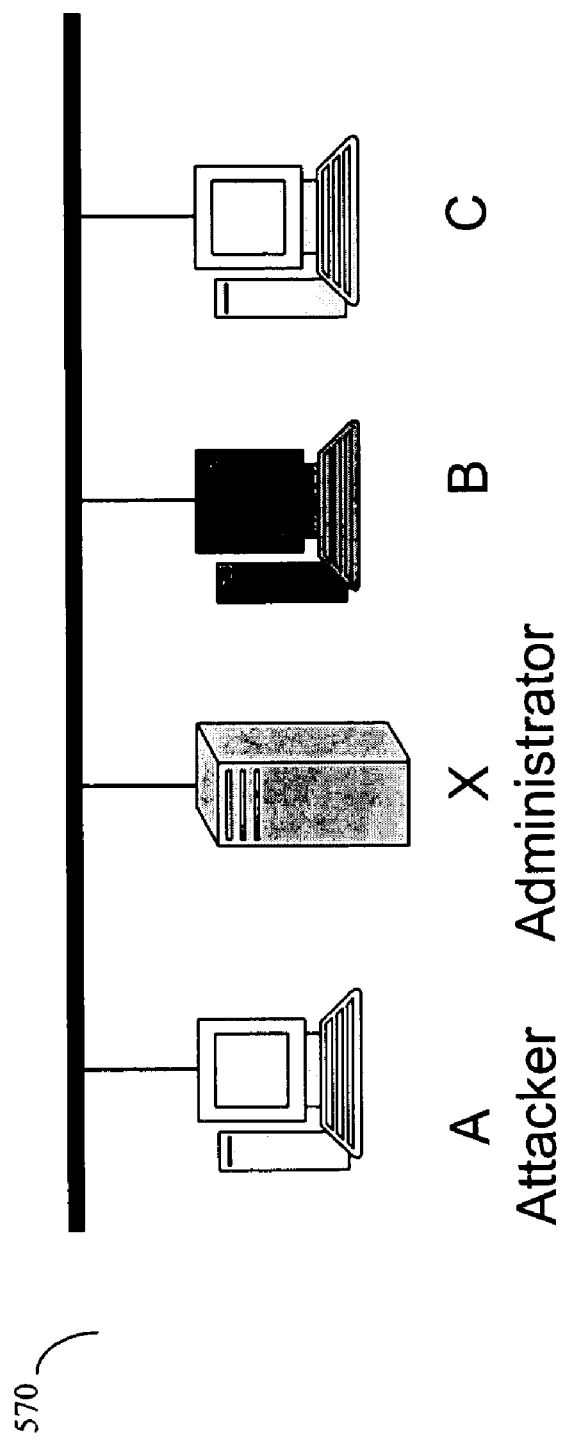
FIG. 12A is an example of a network and components connected thereto.

Referring now to FIG. 12A, shown is a first example of a network which may be represented using a full attack tree, and additionally using a pruned version of the full attack tree as may be generated using techniques described herein. Representation 570 includes an inside attacker denoted as attacker A with hosts X, B, and C accessible by the attacker from system A. Each of the hosts X, B, and C are also accessible from one another. In subsequent attack trees describing the network configuration 570, a first vulnerability (denoted as "1") having an associated action represented by the host X, B and C corresponds to a remote to local vulnerability. A second different remote to local vulnerability which may also occur once the attacker reaches administrative host X has its corresponding transition indicated by the transition value of two ("2").

Figure 12B:
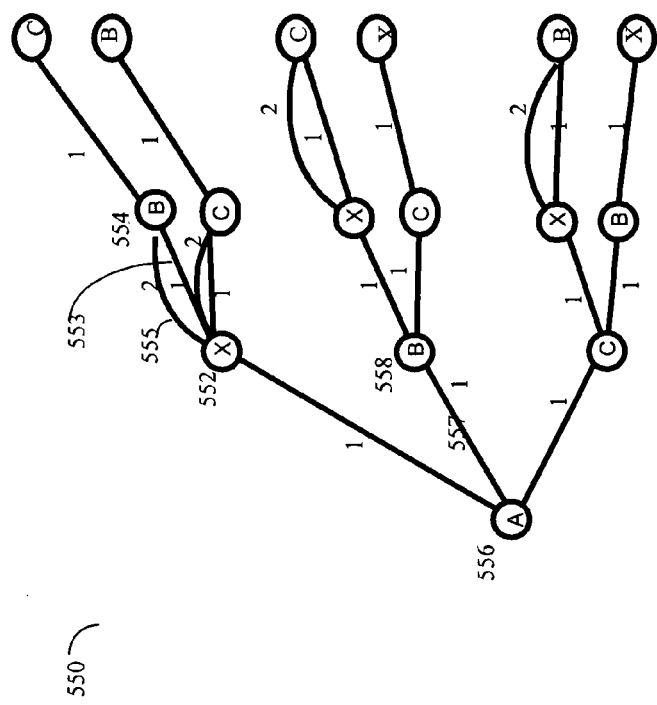
FIG. 12B is an example of a full attack tree generated in accordance with the network of FIG. 12A.

Referring now to FIG. 12B, shown is an example of a full attack tree generated for the example of FIG. 12A. As described elsewhere herein, node A represents a starting node corresponding to a start state of an attacker. Each of the other nodes correspond to states achievable from a prior node in which the attacker moves to a new host or otherwise improves the attacker's state from the same host. Each of the arcs represents a vulnerability on a host leading to the next state or node. In this example, each of the edges between any two nodes having a first vulnerability is represented by "1". Additionally, the second type of vulnerability in FIG. 12B is denoted by edges with a reference of "2" as also described above. Information included in the populated database corresponds to that data needed to generate all of the nodes and corresponding edges for a full attack tree 550. Using the techniques described herein, rather than generate a full attack tree, a pruned version of the full attack tree may be built using the processing steps of flowchart 500 of FIG. 11 with information from the database.

Figure 13:
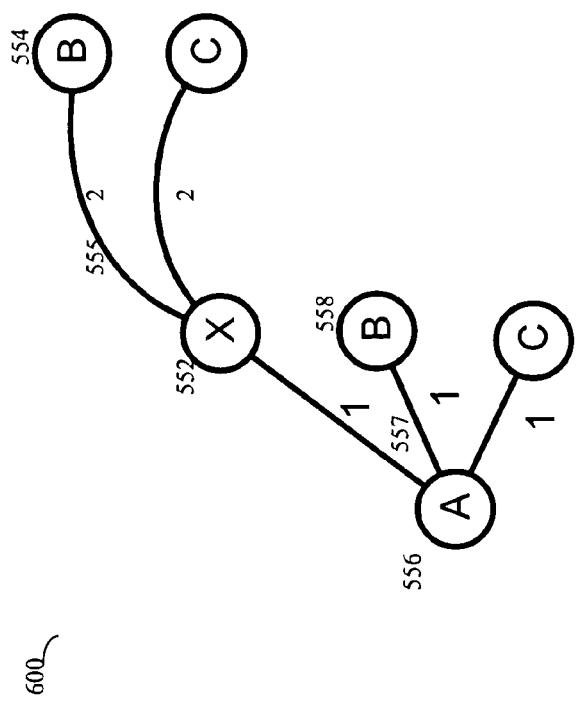
FIG. 13 is an example of a pruned attack tree generated in accordance with the network of FIG. 12A.

Referring now to FIG. 13, shown is the resulting pruned attack tree 600 that may be produced using data stored within the database. By using the data from the database and applying the pruning technique represented in the flowchart 500, rather than generate a full attack tree as shown in FIG. 122B in performing a network security assessment, the pruned attack tree 600 of FIG. 13 may be generated and used in assessment processing. The representation 600 may be characterized as representing the same information from the full attack tree with redundant states or nodes and paths pruned in order to avoid a larger number of nodes and paths as shown in the representation 550 of FIG. 12B.

It should be noted that the pruned attack tree of FIG. 13 may be characterized as a pruned tree, with respect to the full attack tree, that correctly predicts the effect of eliminating vulnerabilities. For example, even if the vulnerability is patched on hosts B and C, all of the hosts may still be compromised from the administrative host X using a second different vulnerability.

What will now be described is how the processing steps of FIG. 11, flowchart 500 may be applied to the information in the database in order to produce the particular pruned representation 600 of FIG. 13. Beginning with the start node A at level 0, the processing steps of flowchart 500 determine that each of the level 1 nodes X, B and C with the transition "1" represented as an edge from node A should be added to the pruned attack tree. Subsequently, the current state advances to the state as represented by node X 552 in the representation 550 of FIG. 12B. The transition of "1" from 552 and the resulting state for node B 554 are, respectively, the proposed edge and node currently being considered for addition to the current attack tree. First, the parent of node X 552, which is denoted as node A 556, is evaluated. Considering the parent A, it is determined that edge 557 corresponds to a transition value of "1" and results in a same node B as indicated by node 558. Accordingly, it is determined that the proposed edge 553 and proposed node 554 should not be added to the attack tree because 558 is achievable via 557 from the parent 556 of the current node 552. With the current node still being X 552, the next vulnerability considered is "2" as represented by edge 555 resulting in transitioning to node B 554. A determination is made that the proposed action of "2" and the resulting node B are currently not achievable from the parent 556 of the current node of 552. A determination is also made that the proposed action of "2" and the resulting node B are also currently not achievable from node 552. Accordingly, the node 554 is added to the current attack tree and is connected to 552 by edge 555. Subsequent processing results in the addition of the remaining edges and states as indicated in the representation 600 of FIG. 13.

A second example illustrating the application of the attack tree generation techniques will now be described with reference to FIGS. 14, 15 and 16.

Figure 14:
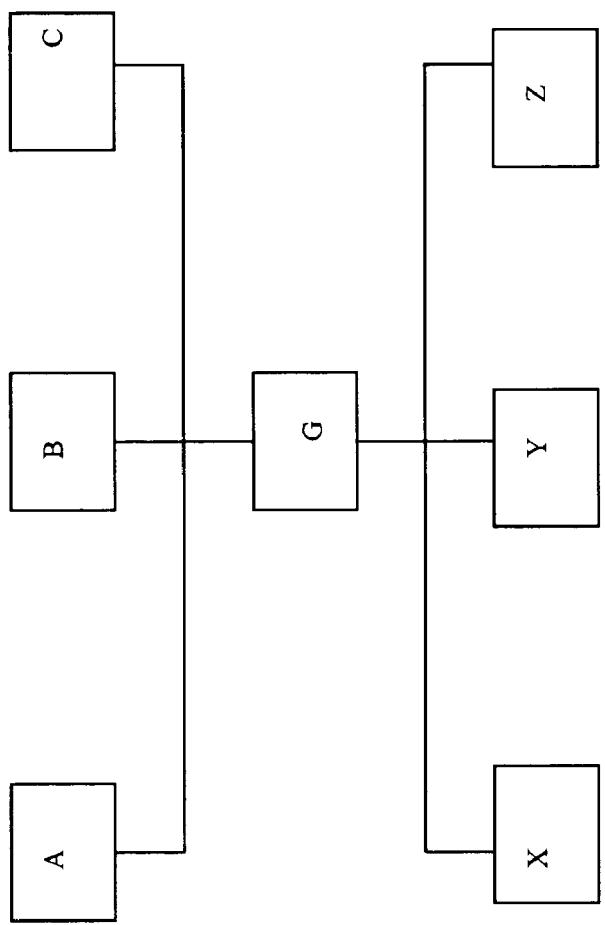
FIG. 14 is another example of a network and associated hosts.

Referring now to FIG. 14, shown is a representation 650 of hosts that may be included within a network for which a security assessment is being performed. Each of the hosts A, B, C, X, Y and Z contain one vulnerability. It should be noted that host G allows access only from B to X. Host A corresponds to the start location of an attacker.

Figure 15:
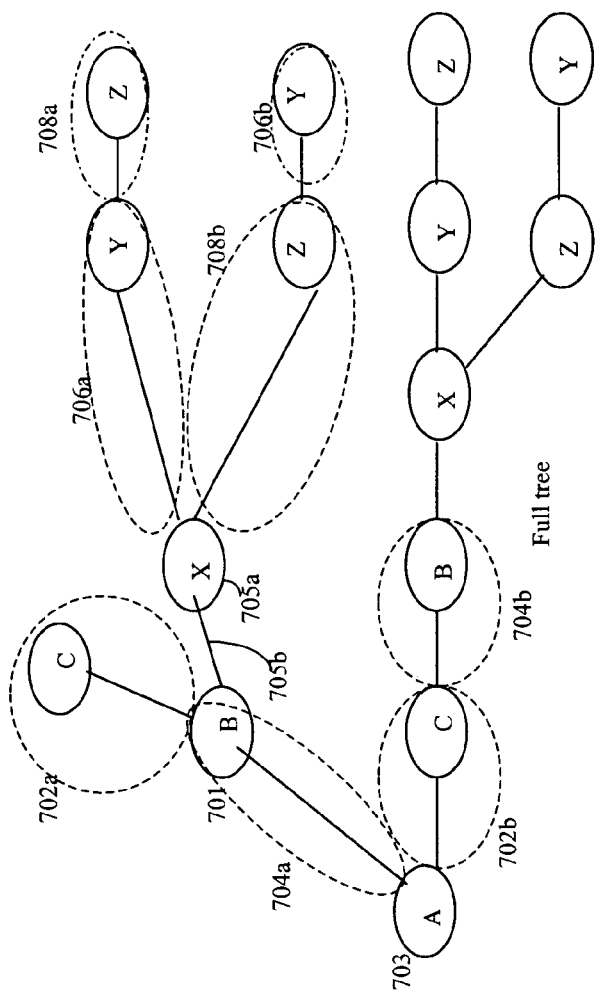
FIG. 15 is an example of a full attack tree in accordance with the network of FIG. 14.
Figure 16:
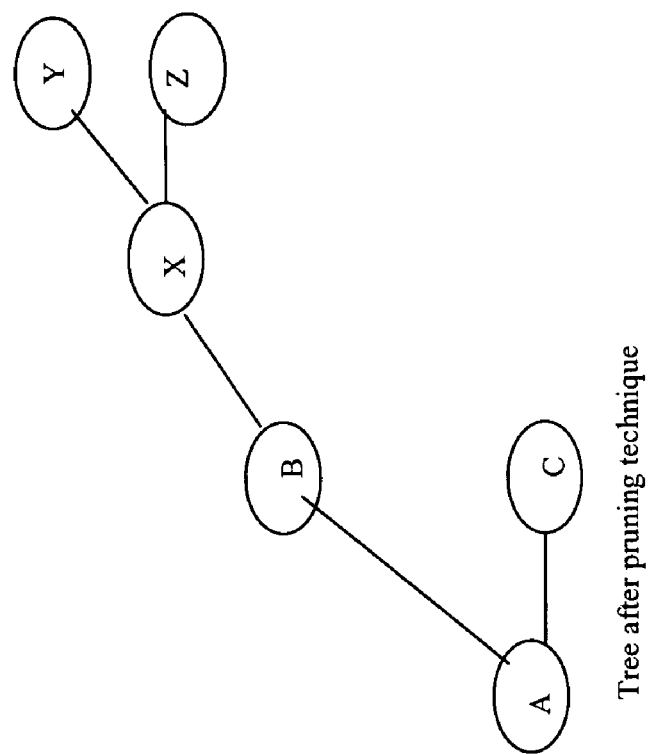
FIG. 16 is an example of a pruned attack tree in accordance with the network of FIG. 14.

Referring now to FIG. 15, shown is the full attack tree 700 representing all accesses possible from the attacker beginning at node A in the representation 650 of FIG. 14. The resulting attack tree using the pruning techniques described herein is shown as 750 in FIG. 16. What will now be described are processing steps using the pruning technique that results in processing data in the database for the representation 700 resulting in the pruned attack tree 750. From the starting node A, nodes B and C are reachable by the same vulnerability. The foregoing processing steps of FIG. 11 result in adding nodes for B and C originating from A with a transition of "1". It should be noted for the sake of simplicity only a single transition is used in this example. Processing continues with the nodes at level 1 being considered as candidates with the current node corresponding to B 701. A determination is made as to whether the edge and resulting node represented by circle 702a should be added to the pruned resulting attack tree. The parent of node B 701, as represented by node A 703, is evaluated. A determination is made that from node A 703, the same edge and resulting state as represented by 702a are already included in the pruned attack tree as indicated by portion 702b. Accordingly, 702a is pruned from the resulting attack tree. The next vulnerability 705b and resulting node X 705a for the current node B 701 are considered and not found to be achievable from the current node or any ancestors of the current node. Accordingly, an edge 705b is added linking 701 to 705a in the pruned attack tree.

Next, the action and resulting state as indicated by 704b are considered as to whether they should be added to the pruned attack tree. The parent of the current node C, which is indicated by node A 703, is evaluated. It is determined that the proposed edge and state as indicated by 704b are already included in the attack tree for the parent 703 of the current node. In particular, the edge and state 704a are determined as being duplicative of the information included in 704b. Subsequently, the technique and processing steps described herein determine that the edge and corresponding resulting node indicated by 704b are not added to the attack tree using the pruning technique described herein. It should be noted that this also cuts off or prunes any subsequent edges and resulting nodes that emanate from B of 704b. Subsequent processing of each of the remaining nodes results in a determination that the edge and node represented by 706a, and the node and edge represented by 708b are added to the pruned attack tree. However, it is determined that the edge and node represented by 708a are not added because the pruning technique detects duplicative information already included in the resulting attack tree by 708b. Similarly, the pruning technique described herein does not add 706b since it is determined that the information in 706b is duplicative of the information as indicated by 706a.

Figures 17A, 17B:
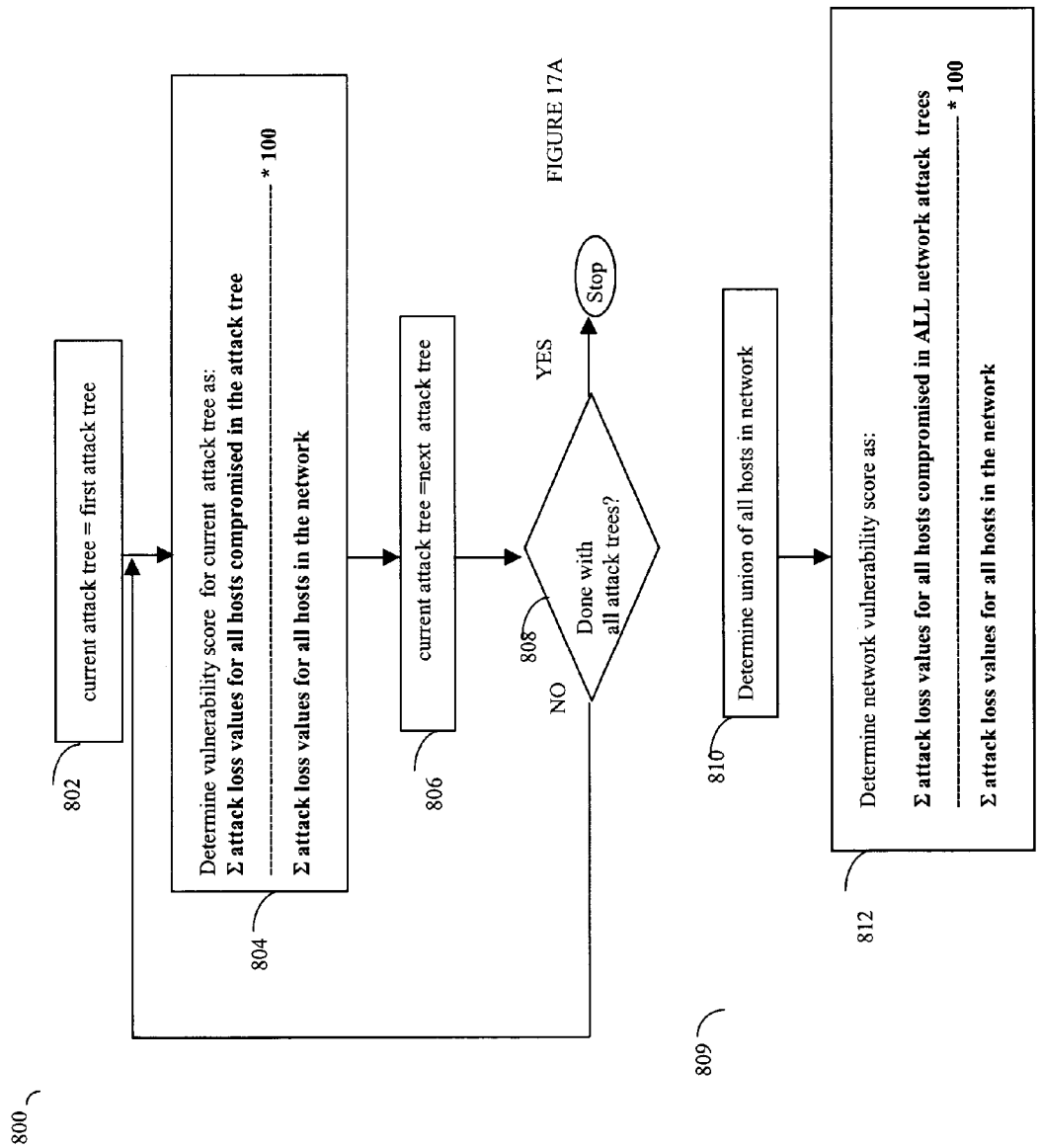
FIG. 17A is a flowchart of steps of one embodiment for determining the vulnerability score of each attack tree.
FIG. 17B is a flowchart of steps of one embodiment for determining a network vulnerability score.

What will now be described in connection with FIGS. 17A and 17B are more detailed processing steps of step 318 previously described in connection with flowchart 300 of FIG. 8. In step 318, recall that an analysis and assessment of the security of the network is performed using pruned attack trees generated using the techniques described herein. Analysis and assessment as described herein in the following paragraphs may be used in connection with assigning a vulnerability score to the network based on the one or more attack trees and associated attack loss values previously assigned to each of the hosts. Based on the network's overall vulnerability score, different changes may be evaluated to determine an impact of a particular change on the overall network vulnerability score. The impact of each change as reflected by the network vulnerability score may be used to rank and prioritize the changes in accordance with which changes produce the greatest improvement in decreasing the vulnerability of a network being assessed.

Referring now to FIG. 17A, at step 802, the current attack tree is assigned the first attack tree. Processing steps of flowchart 800 will consider each of the attack trees forming the network. At step 804, a vulnerability score is determined for the current attack tree. In one embodiment, the vulnerability score for the current attack tree may be determined as:

$$\frac{\sum \text{attack loss values for all hosts compromised in the attack tree}}{\sum \text{attack loss values for all hosts in the network}} * 100$$

The formula represented at step 804 is a ratio of all of the attack loss values for all of the hosts compromised in the attack tree as compared to the attack loss values for all of the hosts in the network.

It should be noted that the foregoing formula used in determining the vulnerability score for a single attack tree may be characterized as a ratio of the attack loss values of that particular attack tree as compared to the attack lost values for all hosts for the entire network. At step 806, the current attack tree is assigned the next attack tree for the current network. At step 808, a determination is made as to whether processing is done for all attack trees in the current network. If not, control proceeds back to step 804 where the vulnerability score for each subsequent attack tree is determined. At step 808, processing stops when a determination is made that all attack trees in the network currently being analyzed are complete.

Referring now to FIG. 17B, shown is a flowchart 809 of steps of one embodiment for determining a network vulnerability score. At step 810, a union of all of the hosts compromised across all attack trees for the network is determined. At step 812, a network vulnerability score is determined as:

$$\frac{\sum \text{attack loss values for all hosts compromised in ALL network attack trees}}{\sum \text{attack loss values for all hosts in the network}} * 100$$

The formula represented at step 812 is a ratio of all of the attack loss values for all of the hosts compromised in the network as compared to the attack loss values for all of the hosts in the network.

What will now be described is a more general representation of how the foregoing metric and/or other security metrics may be used in determining a vulnerability score for a network.

Given one or more security metrics for each computer or network device, such as a host, in which each metric represents an arbitrary security dimension such as the attack loss value, and a set of one or more attack trees, the following may represent the network vulnerability score for a particular security dimension based on a single attack tree for an attacker starting location:

$$\frac{\sum_{i=1}^{n} f(H_i) \mid H_i \in C}{\sum_{i=1}^{n} f(H_i) \mid H_i \in N} * 100 \quad \text{EQUATION 1}$$

where:

$f(H_i)$ represents the value of the security dimension for host i;

C represents the set of hosts compromised in the attack tree; and

N represents the set of all hosts in the network.

It should be noted that a vulnerability score may also be determined for a portion of a network represented as:

$$\frac{\sum_{i=1}^{n} f(H_i) \mid H_i \in C\_\text{and}\_H_i \in S}{\sum_{i=1}^{n} f(H_i) \mid H_i \in N\_\text{and}\_H_i \in S} * 100 \quad \text{EQUATION 2}$$

where S is the set of hosts in the portion of the network. It should be noted that the when S=N, the score applies to the entire network. When S is a subset of N, the score applies to S.

The foregoing EQUATION 1 represents a score for a single attack tree. Multiple scores may be combined to represent a combined score across multiple attack trees in which C in the foregoing EQUATION 1 is computed to contain all hosts compromised across all attack trees represented as a union of hosts:

$$C = \bigcup_{i=j}^{n} C_j,$$

where $C_j$ represents the set of hosts compromised in attack graph j.

Figure 18:
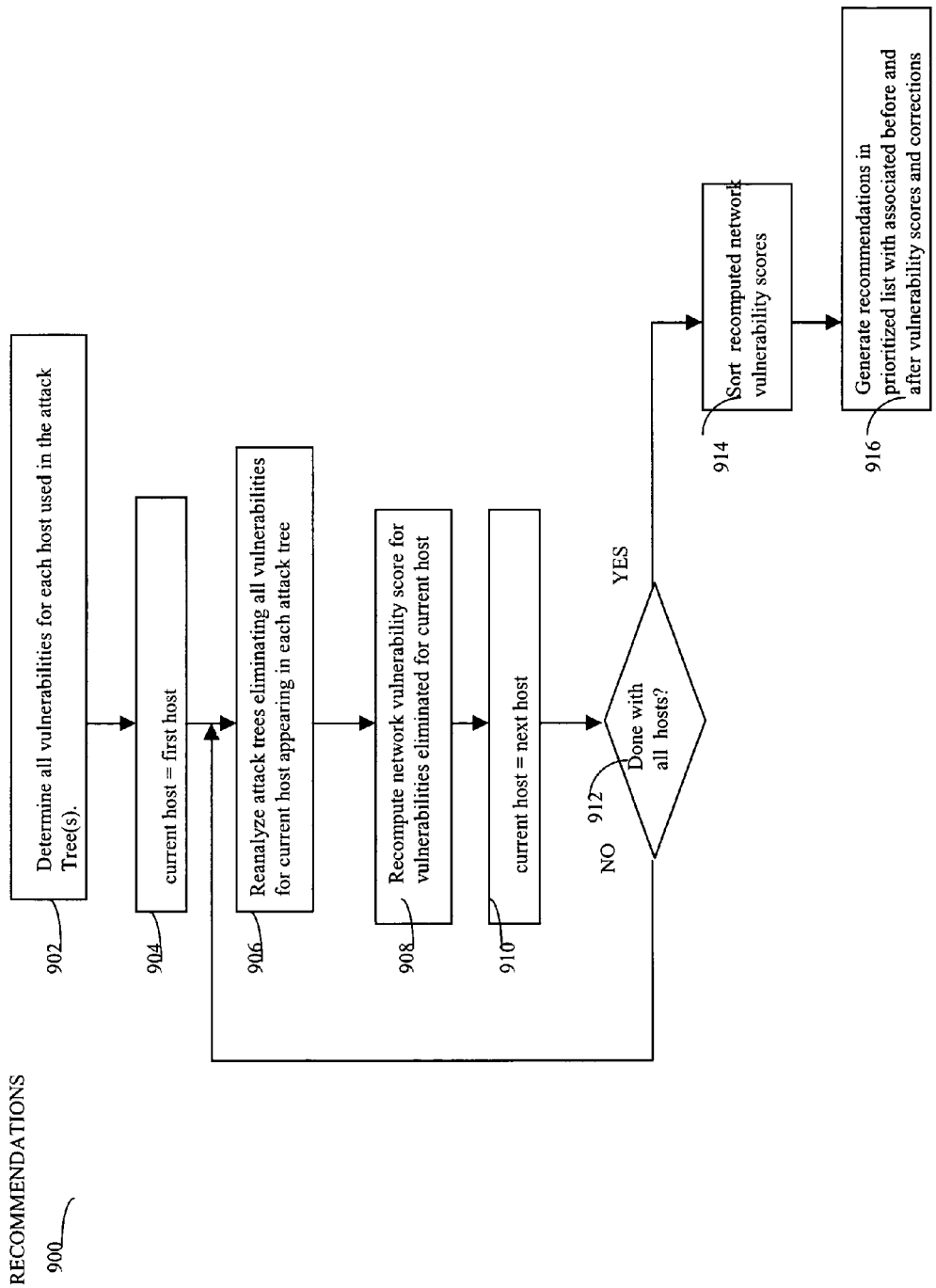
FIG. 18 is a flowchart of steps of one embodiment for providing prioritized recommended changes for improved network security for a network under assessment.

Referring now to FIG. 18, shown is a flowchart 900 of processing steps that may be performed in connection with providing a list of prioritized recommended changes for improving the security within the network just analyzed using the metrics described in flowchart 800 of FIG. 17. The processing flowchart 900 proceeds by determining "what-if" scenarios and recalculating the network vulnerability score based on particular vulnerabilities being eliminated. In this particular example, all of the vulnerabilities for each particular host that appear in each attack tree are eliminated, and then the network is reevaluated. At step 902, processing begins by determining all of the vulnerabilities associated with each particular host as used in the one or more attack trees. The processing of flowchart 900 now proceeds to walk through the pruned attack trees eliminating each set of vulnerabilities from each host as appearing in each attack tree. The network vulnerability score associated with eliminating a particular set of vulnerabilities as associated with a host is re-calculated. At step 904, the current host is assigned the first host within the network being assessed. At step 906, reanalysis of the one or more attack trees is performed eliminating all vulnerabilities associated with the current host as appearing in each attack tree. Step 906 processing may cause nodes and any subtrees extending from a node to also be removed to reflect the elimination of the one or more vulnerabilities. Step 908 results in re-executing the steps of FIG. 17B to produce a new and revised network vulnerability score given that vulnerabilities of a current host that have been eliminated. Control proceeds to step 910 where the current host is assigned the next host. At step 912, a determination is made as to whether processing is done with all of the hosts. In other words, at step 912, a determination is made as to whether evaluation of the "what if" or hypothetical scenarios is complete. If processing is not done for all of the hosts and vulnerabilities, control proceeds to step 906 where the reanalysis and recomputation of the network vulnerability score are determined given the elimination of the vulnerabilities of the current host. At step 912, when a determination is made that all hosts have been processed, control proceeds to step 914 where a ranking, such as by numeric sorting, may be performed of the recomputed network vulnerability scores. At step 916, a list of recommendations may be generated in accordance with the prioritized list generated at step 914 for the associated before and after vulnerability scores for the network and associated corrections. The list of recommendations may be specific corrections to make for the cited vulnerabilities on each host.

It should be noted that an embodiment may choose to combine more than one of the tested hypothetical conditions. For example, an embodiment may choose to eliminate all vulnerabilities on two particular hosts based on the decreased vulnerability scores.

Figure 19:
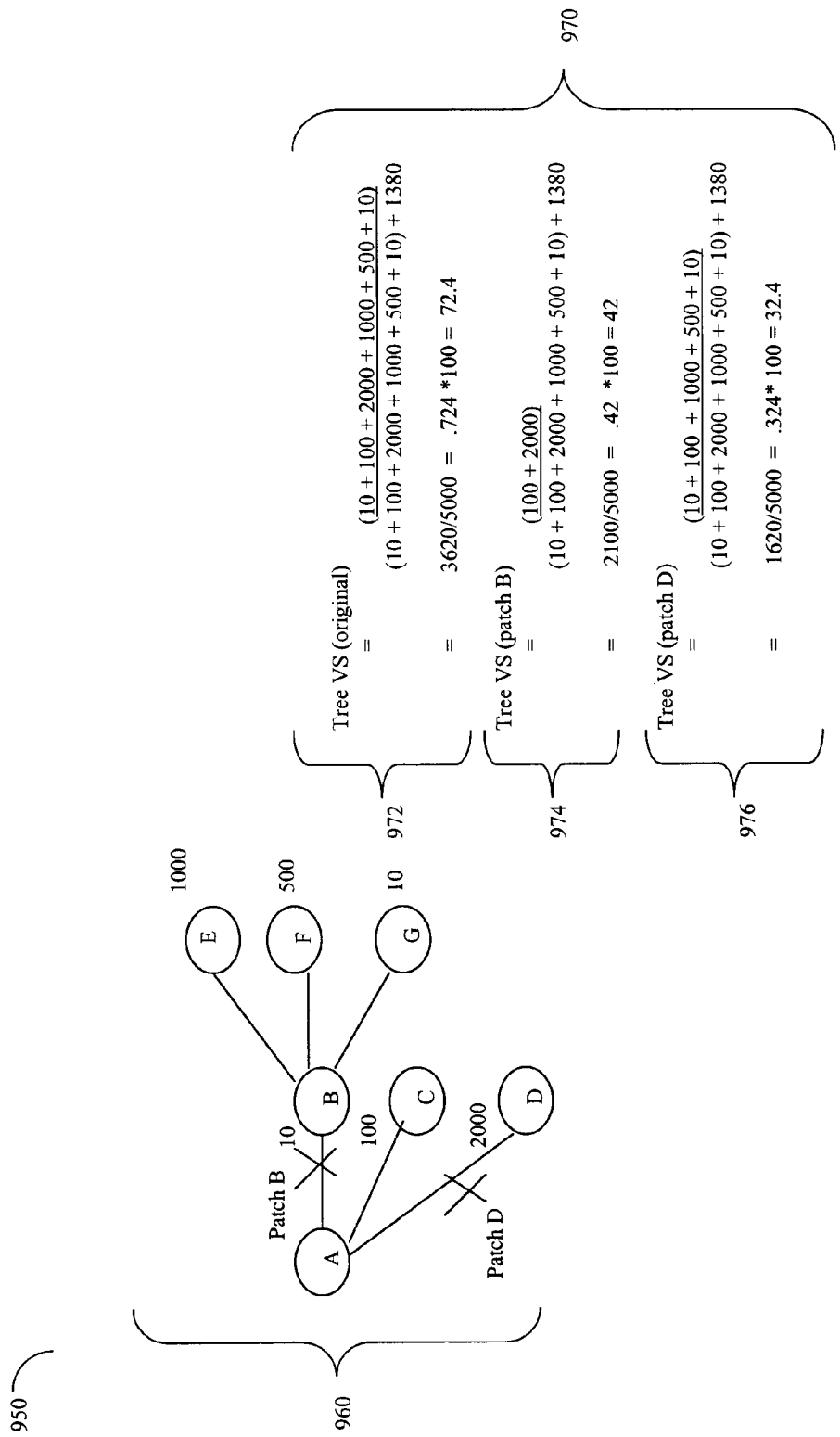
FIG. 19 is an example of a resulting pruned attack tree and associated security metrics.

Referring now to FIG. 19, shown is an example 950 of a resulting pruned attack tree and associated metrics that may be determined using the processing steps of FIGS. 17 and 18. The tree 960 may represent a single pruned attack tree produced using the techniques described herein. Each of the numeric values associated with each of the states represent an attack loss value associated with each of the different hosts corresponding to each of the different states. In this particular example, a transition from one node to another represents transitioning from one host to another. However, this may not always be the case.

Element 972 represents the calculation of a network vulnerability score associated with the original pruned attack tree. The value of 72.4 is produced using the techniques described with flowchart 800 of FIG. 17A. For the sake of simplicity, it is assumed that the network being assessed consists of the attack tree represented by 960. The quantity 1380 in the denominator of 972 represents the sum of hosts not compromised in the network for purposes of this example illustrating the techniques described herein. Collectively, the sum of the attack loss values for all hosts in the network as included in the denominator of 972, 974 and 976 is equal to 5000.

In evaluating the different changes that may be made in order to improve the security of the network, a first consideration or hypothetical may assume all the vulnerabilities of a host represented by Node B as shown in the tree 960 are eliminated. In evaluating this particular hypothetical, it may be assumed, for example, that the software corrections necessary may be applied to the host B. The resulting configuration may be reassessed as represented by the revised network vulnerability score as indicated by 974. In this particular instance, by patching the host vulnerabilities for node B, the network vulnerability score decreases to 42. Another scenario evaluated includes applying the necessary software patches to the host D having an associated attack loss value of 2000. Re-evaluation of the network for this second scenario using the foregoing metrics of vulnerability scores and attack loss values is represented by 976. The revised network vulnerability score is 32.4 in this particular instance. Other options may be evaluated. However, the two scenarios just described and re-evaluated as represented by 974 and 976 are the top two alternatives in accordance with the metrics used herein since these two alternatives produced the largest decrease in network vulnerability score. As a result of sorting the recomputed network vulnerability scores as indicated by, for example, 974 and 976, and evaluating the different alternatives, a list of recommendations may be generated. Eliminating vulnerabilities on node D showed the greatest benefit in accordance with the metrics described herein. The generated list of recommendations may cite, for example, the software patches that should be applied to node D in order to obtain the improvement as indicated by 976 with respect to the original network vulnerability score, as indicated by 972. Similarly, applying the patches to the host designated by node B results in an improvement in a network vulnerability score as indicated by elements 974 (with improvements) and 972 (original network).

The recommendations evaluated and considered in this particular embodiment may include, for example, patching and upgrading software on a host to eliminate known vulnerabilities. Other embodiments may include eliminating other vulnerabilities of different types. The foregoing modifications may be evaluated by modifying a generated pruned attack tree. It should be noted that an embodiment may also optionally allow evaluation of changes including, for example, a change in the firewall rules or network topology. In order to evaluate certain changes, an embodiment may choose to regenerate a portion of information for the database in accordance with these changes, and then generate a new attack tree rather than update an existing attack tree.

The recommendations as may be made and included in the output of processing step 916 of flowchart 900 include patching software at the host level. It may not be necessary to patch every piece of software running on a host in order to eliminate an attack path to or through the host. The particular software products to be patched may be identified in an embodiment. In preparing this list, the attack trees under consideration may be inspected in order to compile a list of compromised hosts along with the particular vulnerabilities that enable the compromises. This may be performed using information and data included in the populated database as also described herein. Using the techniques described herein, if the vulnerability score decreases, then the change considered improves the security of the network evaluated. The magnitude of the decrease from the original network vulnerability score provides an indication of how a given change may be ranked.

An embodiment may also include a user interface in order to allow a user to test specific hypothetical changes to an existing network. The network may then be evaluated with respect to the specific changes input in accordance with one or more user selections.

Figure 20:
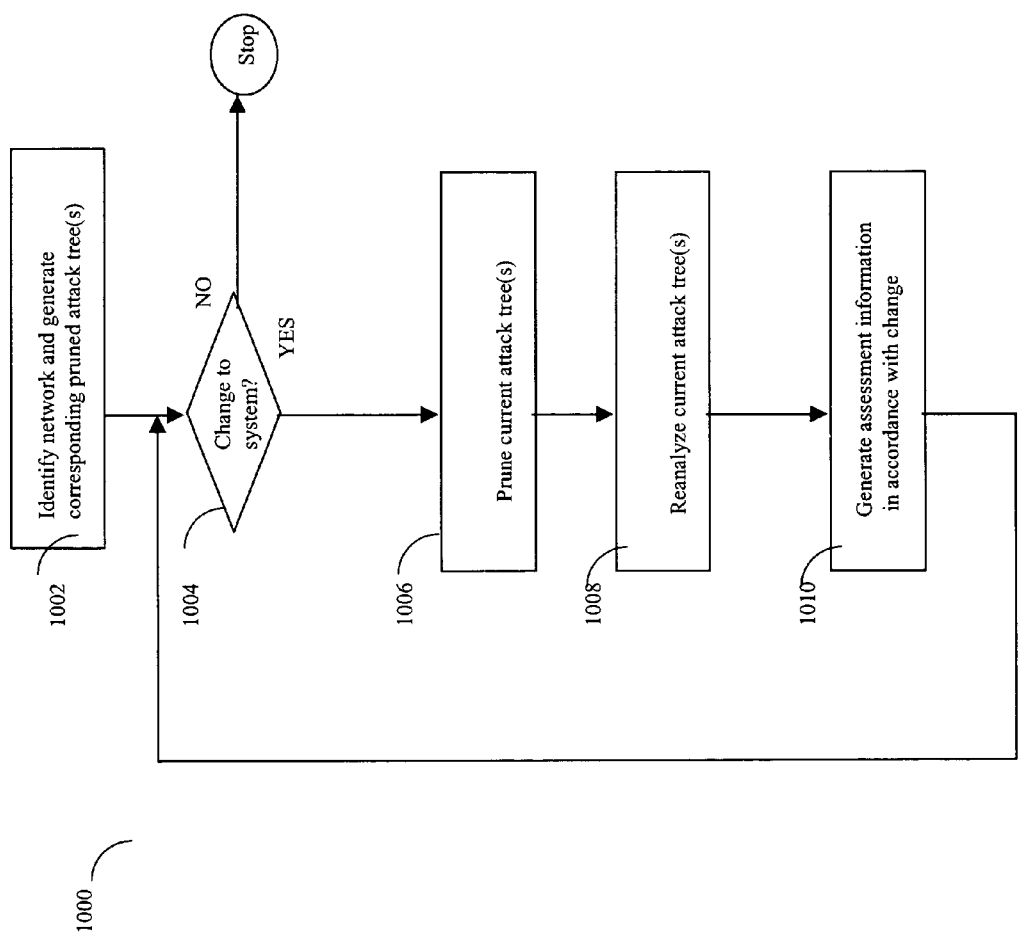
FIG. 20 is a flowchart of steps of one embodiment for assessing network security in accordance with user input selections.

Referring now to FIG. 20, shown is a flowchart of processing steps 1000 that may be used in an embodiment in connection with gathering certain input for testing and evaluating a particular change to an existing network. At step 1002, the network and its associated one or more attack trees are generated. At step 1004, input may be obtained, for example, from a user indicating a change to the network. A proposed change may also be generated automatically by an embodiment of the system 200 using, for example, trees and the knowledge of the network. If the data indicates a change is to be made or evaluated, control proceeds to step 1006 where the current attack trees are updated or generated in accordance with the modifications to be evaluated. At step 1008, the current attack trees associated with the network being evaluated are re-analyzed and output is produced at step 1010 which includes revised assessment information in accordance with the change. As described herein, the assessment information generated in accordance with the change may include, for example, a revised network vulnerability score testing the hypothetical change in accordance with the user input. Control then proceeds to step 1004 where a determination is made as to whether additional changes to the existing network are to be made and re-evaluated. If not, processing stops. Otherwise, additional scenarios may be evaluated.

Figure 21A:
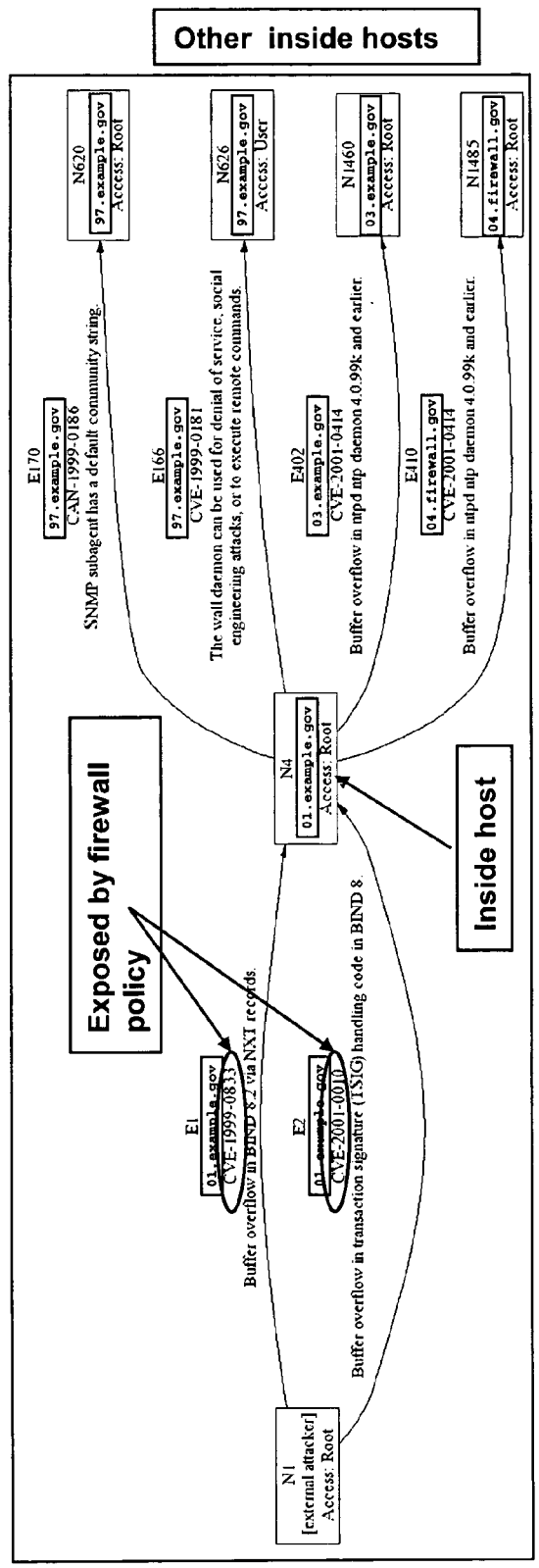
FIG. 21A is an example of a portion of an attack tree.

Referring now to FIG. 21A, shown is an example of a portion of an attack tree 1200 as maybe generated using the pruning techniques described herein. The foregoing portion of an attack tree shows node N1 as corresponding to the start state of an attacker. The external attacker may gain access to the inside host at node N4 through a firewall policy. The external attacker state as indicated by N1 is on the first host. Using services provided by a DNS (Domain Name System), the external attacker may gain access by exploiting two vulnerabilities on the DNS server through the firewall. Once the external attacker exploits one of these two vulnerabilities, the external attacker transitions from N1 to the N4 inside host. Once at the node N4, the attacker may further compromise additional hosts available on the inside network as indicated by the "other inside hosts" in the rightmost portion of the representation 1200. External attacks may be eliminated in this example by patching the two vulnerabilities in DNS. By patching DNS, the network may be completely protected from outside attacks and have a corresponding reduced network vulnerability score of zero. It should be noted that this may be determined, for example, if these are the only vulnerabilities that exist and they are patched. The foregoing techniques described herein evaluate an existing network in accordance with those vulnerabilities which are known within the network.

What will now be described are processing steps that may be performed in connection with determining connectivity, vulnerability, and action information. The foregoing information may be produced by additional processing prior to building an attack tree in one embodiment in order to obtain information that may be used to populate data entities of the database of FIG. 10 in an embodiment. In one embodiment, firewall rules and network information as may be represented, respectively, with entity categories E and D, may be further analyzed to determine end-to-end connectivity and populate entities of category C of the database. Additionally, information regarding software and related vulnerabilities, as may be represented with category A entities, and associated actions and outcomes, as may be represented in category B entities, may be obtained by analyzing input data files, such as ICAT data and vulnerability scan output files. As will be described in following paragraphs, the connectivity information represents end-to-end connectivity for a particular network being assessed. It should be noted that the connectivity information and process for obtaining this information may be used in connection with performing other applications than for security assessment of a network. The connectivity information may also be used, for example, in modeling the network for any one or more other purposes such as, without limitation, evaluating end-to-end network policies, validating firewall configurations and finding errors therein, forensic analysis, and situational awareness regarding conditions in a network.

In this embodiment, the connectivity information may be obtained prior to generating a pruned attack tree using the techniques described herein. This is described in connection with step 264 of FIG. 7A. One embodiment for determining the end-to-end connectivity of a network in accordance with a firewall rule set is described with reference to FIGS. 22–28. Examples and illustrations of connectivity processing will be described with reference to FIGS. 29A–29D. It should be noted that more detail about determining vulnerability and action information is also described in the following paragraphs.

Figure 21B:
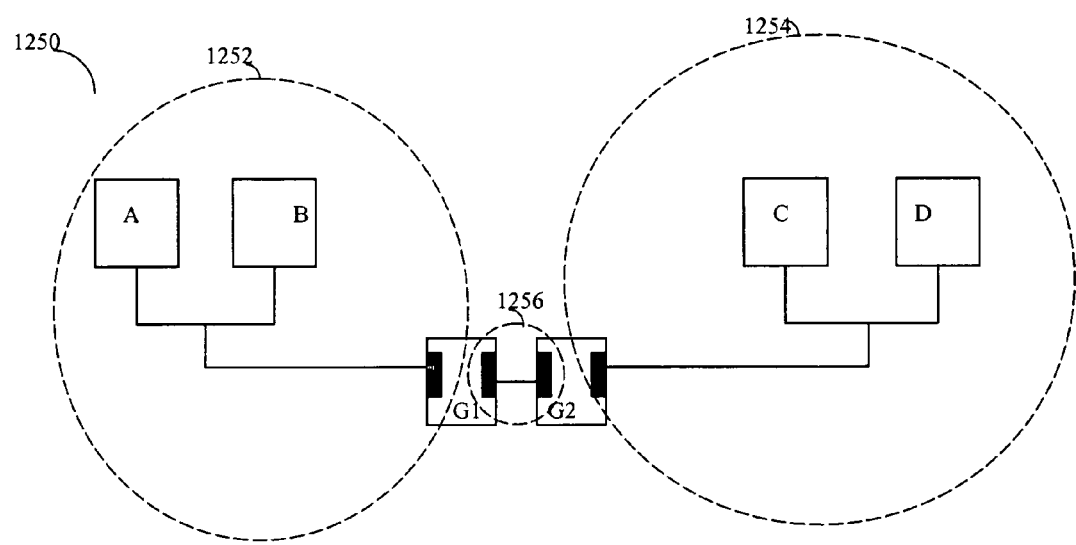
FIG. 21B is an example of an embodiment of a network to be assessed.

Referring now to FIG. 21B, shown is an example of an embodiment of a network that may be assessed using the techniques described herein. The network representation 1250 includes three subnets 1252, 1254, and 1256. Subnet 1252 includes two hosts A and B. Each host in this example includes, for the sake of simplicity of explanation, a single interface with a single port. The subnet 1252 also includes a single gateway with an interface connecting to subnet 1256. Subnet 1254 includes two hosts C and D. For the sake of simplicity, each host C and D also includes a single interface with a single port. Also included in subnet 1254 is a single gateway with an interface connecting to subnet 1256. Subnet 1256 includes two gateway interfaces, respectively, from gateways G1 and G2. Each host A and B can connect directly to one another and also to the single interface of G1 within subnet 1252. Each host C and D can connect directly to one another and also to the single interface of G2 within subnet 1254. As used herein, an inbound interface with respect to a gateway refers to that first interface traversed when determining connectivity crossing over a gateway. An outbound interface is an outgoing interface of the gateway traversed when determining connectivity from an inbound interface. For example, when traversing G1 from 1252 to 1256, the leftmost interface of G1 is the inbound interface and the rightmost interface of G1 is the outbound interface.

FIGS. 22–28 will now be described illustrating an embodiment for determining connectivity of a network. For purposes of illustration, reference may be made to the example embodiment of FIG. 21B. The processing steps of FIGS. 22–28 determine connectivity for a given source using a technique in which all connectivity between the source and all possible target endpoints are explored prior to advancing to the next possible source endpoint.

Figure 22:
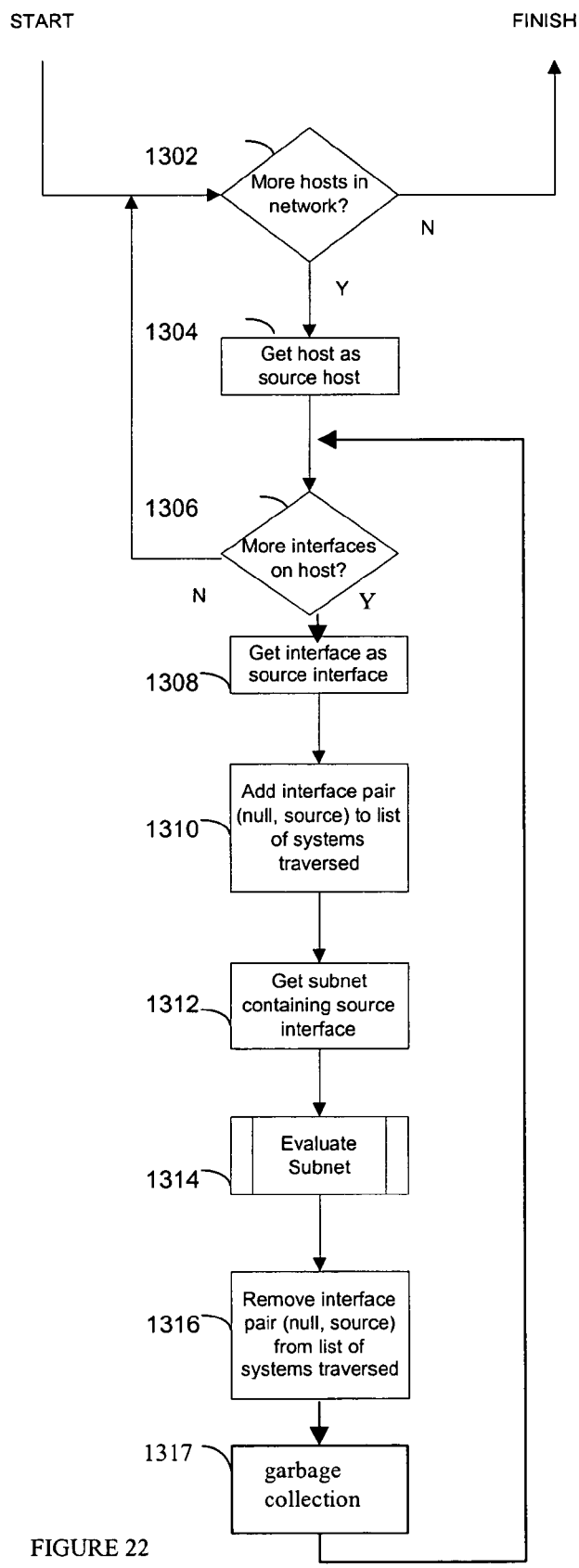
FIGS. 22–28 are flowcharts of processing steps of one embodiment in performing an end-to-end connectivity evaluation for a network.

Referring now to FIG. 22, shown is a flowchart 1300 of processing steps that may be performed in one embodiment for determining end-to-end connectivity of a network. The steps of flowchart 1300 may be characterized as a main processing loop which uses information from the database as described in connection with FIG. 10. The start and finish of flowchart 1300 indicate, respectively, the beginning and end of determining connectivity information. Flowchart 1300 processing traverses each host in the network, and for each interface on each host, the connectivity is determined. It should be noted that a host may have one or more interfaces and within each interface, one or more ports. As used herein, each interface may be a source interface or a target interface with respect to each endpoint. Referring to the database of FIG. 10, the host entity D400 and the associated one or more interface entities D500 describe this relationship and may be used in processing steps of 1300. At step 1302, a determination is made as to whether all hosts in the network have been evaluated. If so, processing stops. Otherwise, control proceeds to step 1304 to obtain a next host as a source host. It should be noted that each instance of an end-to-end connectivity is from a source to a target endpoint. Each source and target endpoint may be associated with a host. A source host represents the source endpoint. The target host represents the ending host of the target endpoint of the pair for which connectivity is being evaluated. As described in following paragraphs, an endpoint in this embodiment is a port.

Control proceeds to step 1306 where a determination is made as to whether all interfaces for the source host have been evaluated. If so, control proceeds to step 1302. Otherwise, control proceeds to step 1308 to get the next interface as the source interface for which connectivity is to be determined with respect to what other interfaces may be reached from the current source interface. At step 1310, an interface pair representing the current source interface is added to a list of hosts traversed. The list at step 1310 is maintained in this embodiment to represent the hosts traversed or crossed between a source and target endpoint. This list is used in subsequent processing steps as will become apparent in following paragraphs. It should be noted that other embodiments may use other data structures and other techniques in connection with representing this information. The particular examples described herein for purposes of illustration should not be construed as a limitation. At a particular point in time, the list represents which hosts have been traversed or crossed over at a particular point in processing. When a host is traversed or visited, the host is added to this list. Although this particular embodiment uses the list to represent which hosts have been traversed, an embodiment may also use the list to represent entities other than, or in addition to, hosts. For example, elements in the list may represent communications hardware, such as switches.

At step 1312, the subnet containing the source interface is determined. This may be determined using information from the database. As described herein, a subnet may be characterized as one or more hosts which are directly connected to one another rather than, for example, having to cross over a gateway host to communicate with another host. At step 1314, Evaluate Subnet processing is performed to determine connectivity between the current source interface and all endpoints within the current subnet to which the source interface belongs. At step 1316, when processing of the current source interface is complete, garbage collection may be performed at step 1317. Control then proceeds to step 1306 to continue evaluating any remaining host interfaces.

Figure 23:
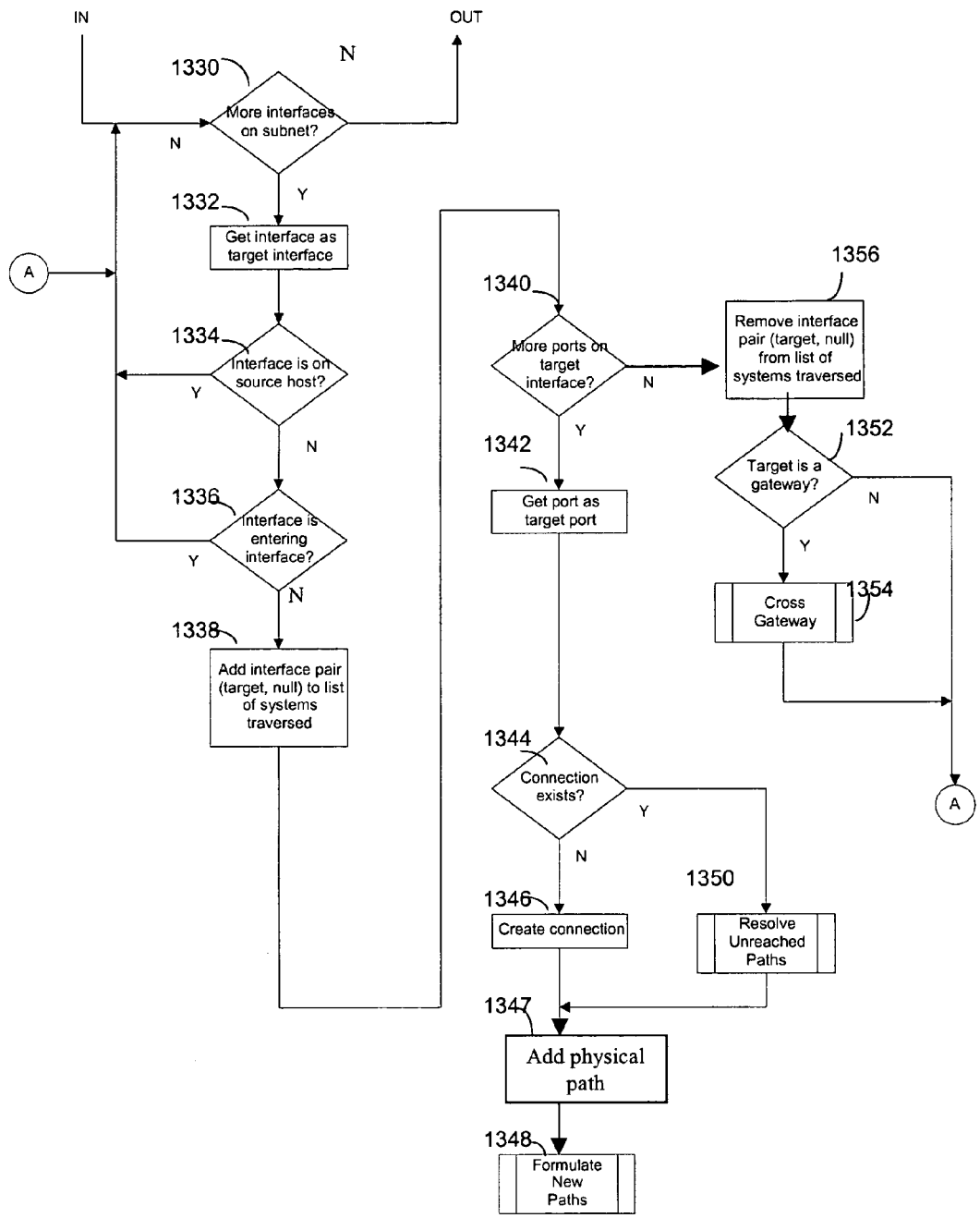

Referring now to FIG. 23, shown is a flowchart of processing steps of one embodiment for evaluating a subnet. Flowchart 1314 sets forth more detailed steps of subnet evaluation with respect to a current source interface. At step 1330, a determination is made as to whether there are any remaining interfaces on the subnet to be evaluated as a target interface. If not, processing stops. Otherwise, control proceeds to step 1332 to get the next interface in the subnet as the target interface. It should be noted that for a connection, a source endpoint in this embodiment is always from a generic port, one of which is assumed to be attached to every interface. Accordingly, each port associated with a target interface may be an endpoint with respect to the generic port of the source interface. This is why, in this embodiment, there is no processing loop through ports on the source interface. An embodiment may also not use a generic port as a single source port and may alternatively allow multiple source ports for each interface. At step 1334, a determination is made as to whether the target interface is on the source host. If so, the current target interface is skipped and processing proceeds to step 1330 to obtain a next target interface. It should be noted that the foregoing only considers target interfaces on hosts different from the source host. If step 1334 determines that the target interface is not on the source host, control proceeds to step 1336. At step 1336, a determination is made as to whether the current target interface is used to enter a subnet in which the current target interface belongs to a gateway. If so, control proceeds to step 1330. Recall that the processing steps in this embodiment perform a technique in which all connectivity for one subnet is evaluated prior to evaluating connectivity with another subnet. As described in following paragraphs, connectivity with other subnets may be determined using Cross Gateway processing described elsewhere herein.

If, at step 1336, it is determined that the interface is not an entering interface, control proceeds to step 1338 where an interface pair is added to the list of hosts traversed for the current target. It should be noted that this interface pair as step 1338 is added to the list having a first entry from step 1310. In other words, at this point in processing, processing has traversed from the source interface to the target interface as indicated by the traversal list with two entries, one for each of the source and target host interfaces.

Control proceeds to step 1340 to evaluate each port of the current target interface as an endpoint. Each port's relationship to an interface may be represented using the corresponding entities in an embodiment using the database model of FIG. 10. At step 1340, a determination is made as to whether there are any remaining ports of the current target interface to be evaluated. If so, control proceeds to step 1342 to get the next port as the current target port. At step 1344, a determination is made as to whether a connection entity already exists in the database for the current source and target ports. A connection entity may exist in the database for the current source and target ports in accordance with the particular host interfaces of each port, associated protocol, and the like. A connection between the current source and target ports may be included in the database already, for example, because there is another path between the two endpoints. If a connection does not exist, control proceeds to step 1346 to create the connection entity and associated relationships with the source and target port entities in the database. Control proceeds to step 1347 to add the physical path. Step 1347 adds the path to the connection in which the hops thereof correspond to the hosts traversed. The path added as a result of step 1347 may be characterized as representing the physical path between the source interface and the target port. A path status field or indicator may be set to "physical" to indicate the foregoing. Control proceeds to step 1348 to perform Formulate New Paths processing, which is described elsewhere herein in more detail. This processing of step 1348 determines the paths, for example, to populate the path entities, associated hop entities, and relationships to other entities as will become apparent from the description in following paragraphs.

If, at step 1344, it is determined that a connection already exists as represented in the database, control proceeds to step 1350 where Resolve Unreached Paths processing is performed, which is described elsewhere herein in more detail. It should be noted that processing of step 1350 includes processing for address translation that may be used in an embodiment. Resolve Unreached Paths performs processing to determine if an existing redirected path that has not yet been verified as a valid connectivity path may represent a valid path for the current connection. Resolve Unreached Paths performs processing of paths associated with a target endpoint that has been redirected as a result of address or port number translation. This is also described elsewhere herein in more detail. Control then proceeds to step 1347.

After step 1348 processing is complete for the current target port, control proceeds to step 1340 to process any remaining ports for the current target interface.

After all ports have been processed for the current target interface as determined by step 1340, control proceeds to step 1356 where the target interface is removed from the list because processing is complete for this current target interface. It should be noted that the processing of step 1356 may be characterized as a complementary processing step for step 1338 processing. Following step 1356, control proceeds to step 1352 where a determination is made as to whether the target interface is connected to, or on, a gateway. If, at step 1352, it is determined that the target port is connected to a gateway, control proceeds to step 1354 to perform Cross Gateway processing which is described in more detail in following processing steps. If, at step 1352, it is determined that the current target interface is not connected to, or on, a gateway, processing control proceeds to step 1330 via A to evaluate the next target interface on the current subnet.

As an example of step 1354 Cross Gateway processing, let the following describe a current processing point with reference to FIG. 21B. Connectivity is currently being evaluated for host A's single source interface. Connectivity from A to B has been evaluated and stored in the database. A to G1 connectivity has been determined within 1252 of FIG. 21B and all ports of the current target interface of G1 within 1252 have been evaluated such that control proceeds to step 1352 where a determination is made as to whether the current target interface is connected to a gateway. In this instance, the determination is yes and control proceeds to step 1354 processing so that the gateway is crossed and connectivity for A as the source with all possible targets in the subnet 1256 are now determined.

Figure 24:
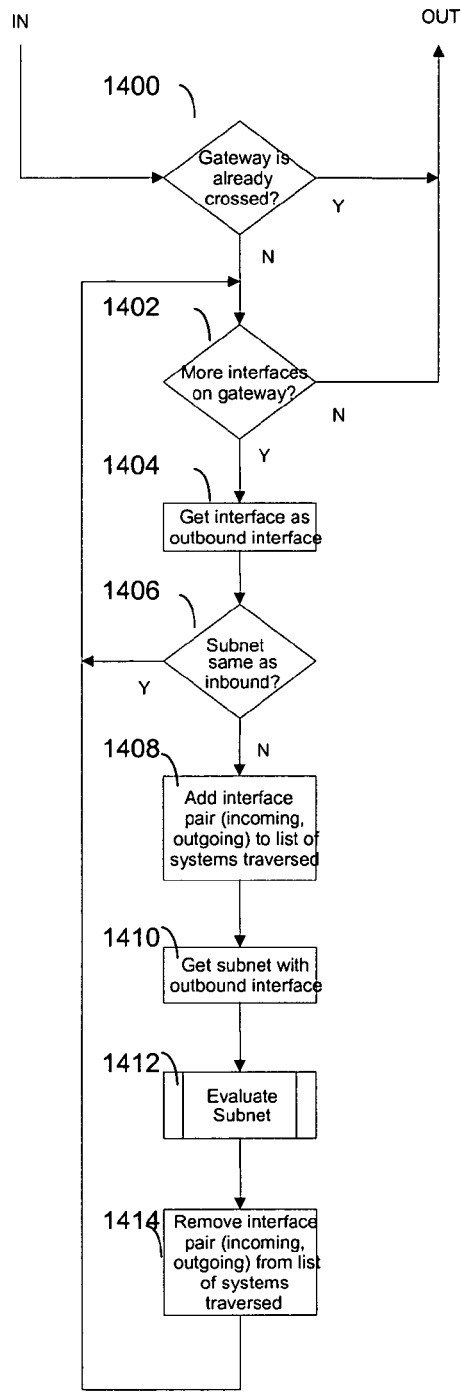

Referring now to flowchart 1354 of FIG. 24, shown is a flowchart of processing steps of one embodiment for Cross Gateway processing. A determination is made at step 1400 as to whether the current gateway, G1, has already been crossed. This may be determined by examining hosts on the list of hosts traversed, for example, to prevent processing loops. If the current gateway is already on the list, processing of 1354 completes for the current gateway. Otherwise, control proceeds to step 1402 where each interface of the current gateway, G1, is evaluated as an outbound interface. If, at step 1402, it is determined that all interfaces of the current gateway being crossed have been evaluated, processing of 1354 stops. Otherwise, control proceeds to step 1404 to get the first gateway interface of the current gateway and evaluate the next gateway interface as an outbound interface. At step 1406, a determination is made as to whether the subnet of the current outbound interface of the current gateway is the same as the subnet of the inbound interface. If so, control proceeds to step 1402 to process remaining interfaces of the current gateway. Otherwise, control proceeds to step 1408 to add an entry to the list of hosts traversed for the current incoming and outbound interfaces of the current gateway. It should be noted that this entry is added to the end of the list. The list of hosts traversed represents a snapshot of points between the source and target processed thus far. As described in following paragraphs in connection with the data model, each entry on the list will later represent a hop in a path.

Control proceeds to step 1410 wherein the subnet of the outbound interface is obtained. With reference to the example of FIG. 21B, the current subnet obtained at step 1410 is subnet 1256. Control proceeds to step 1412 where Evaluate Subnet processing is performed for the current subnet 1256. Connectivity between A and subnet 1256 is now evaluated in this example by a recursive call to Evaluate Subnet processing. Evaluate Subnet processing is described elsewhere herein in more detail. The interface to G2 is evaluated and crossed over such that the subnet 1254 is now recursively evaluated. At this point, the list of hosts traversed has a first entry of A, a second entry of G1 and a third entry of G2. The runtime stack at this point in processing in an embodiment may include three invocations of Evaluate Subnet as follows:

| time ID | routine invocation |
|---------|-------------------|
| 0 | main loop |
| . | . |
| . | . |
| n | Evaluate Subnet 1252, Cross Gateway G1 |
| n + 1 | Evaluate Subnet 1256, Cross Gateway G2 |
| n + 2 | Evaluate Subnet 1254. |

The time ID above represents an ordering of an invocation of a routine as compared to another routine. At this point, each connectivity endpoint in 1254 will be evaluated as a target endpoint from A as the source.

In evaluating subnet 1254, a first host C and its associated single port endpoint is evaluated. During this processing, the list of hosts traversed is: A-G1-G2-C. Once connectivity to C has been evaluated, the next current target port is the single port of D such that the list of hosts traversed at this point in time is: A-G1-G2-D, and so on. The list of hosts traversed at any point in time may be characterized as representing a state or snapshot of the current path being evaluated for connectivity. As each subnet is evaluated such that processing of one instance of step 1412 completes, control proceeds to step 1414 to remove from the list the interface pair for the incoming and outgoing gateway interfaces. Step 1414 removes from the list that entry previously placed on the list at step 1408.

Figure 25:
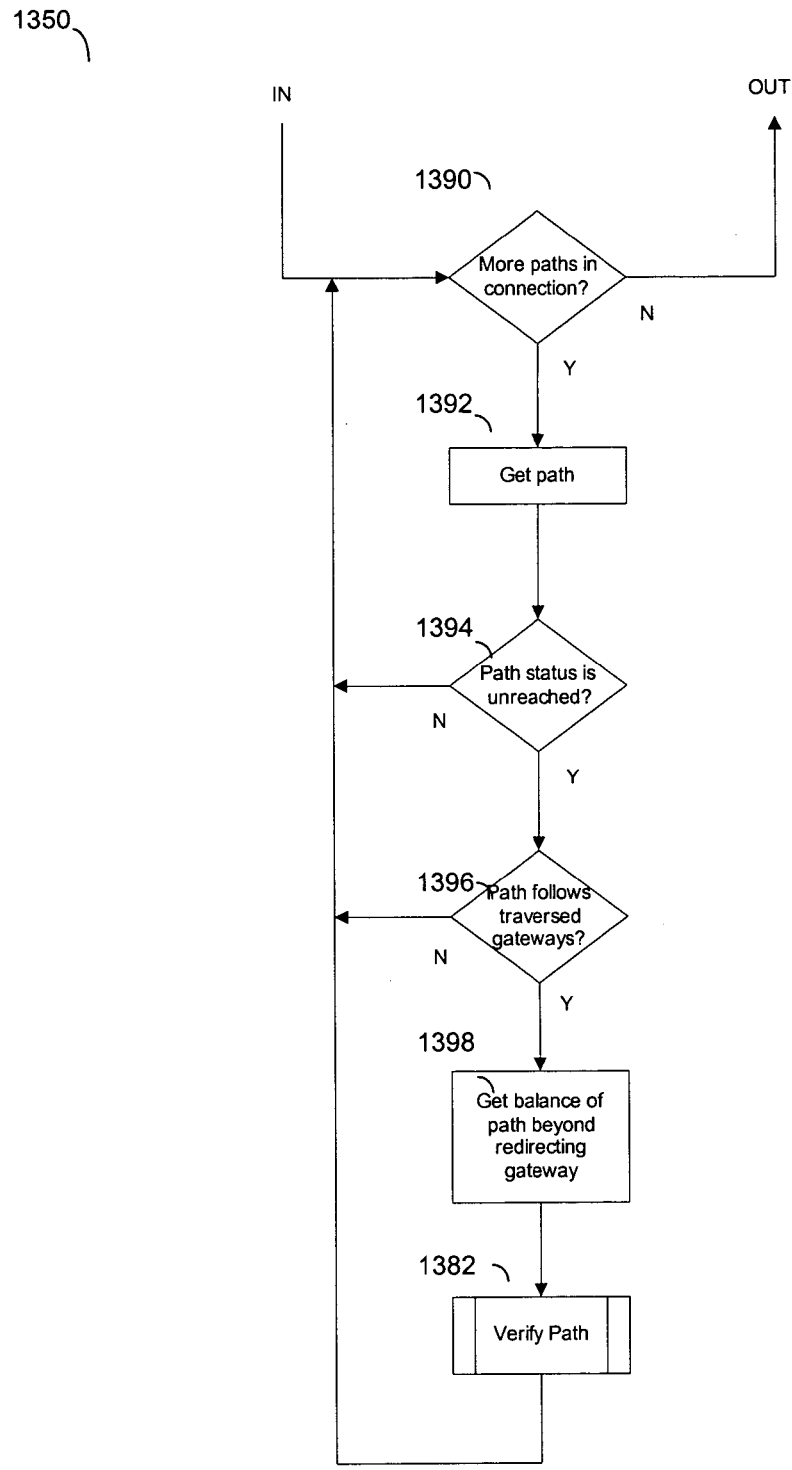

Referring now to FIG. 25, shown is a flowchart 1350 of processing steps of one embodiment for Resolve Unreached Paths processing for those paths corresponding to endpoints that have been redirected as a result of applying a destination translation rule. As described elsewhere herein, Resolve Unreached Paths determines whether the hosts included in the list of hosts traversed correspond partially or completely to an existing path connected to a connection entity. If one of the paths corresponds partially to the list of hosts traversed, steps are performed to create and evaluate additional hops in accordance with the list of hosts traversed. Part of the evaluation, as described elsewhere herein, includes applying all translation and/or filtering rules for the particular path. It should be noted that the processing steps of 1350 are illustrated elsewhere herein in connection with examples.

At step 1390, a determination is made as to whether there are any remaining paths to be evaluated for the current connection entity. If not, processing of 1350 stops. Otherwise, control proceeds to step 1392 to obtain the next path entity. At step 1394, the current path entity's status is examined. If the path status is not unreached, control proceeds to step 1390 to evaluate any remaining paths. If the path status is unreached, control proceeds to step 1396 where a determination is made as to whether the current path corresponds to a portion of the traversed gateways as indicated by the list of hosts traversed. If not, control proceeds to step 1390 to examine any remaining paths. Otherwise, control proceeds to step 1398 to determine which of the hosts in the list of hosts traversed are beyond the current path. At step 1382, Verify Path processing is performed for those hosts specified in the list of hosts traversed which are not currently reflected in the current path. Verify Path processing is described elsewhere herein and creates additional hops and performs associated evaluation of any filtering and/or translation rules. After step 1382, control proceeds to step 1390 to process any remaining paths for the current connection.

Figure 26:
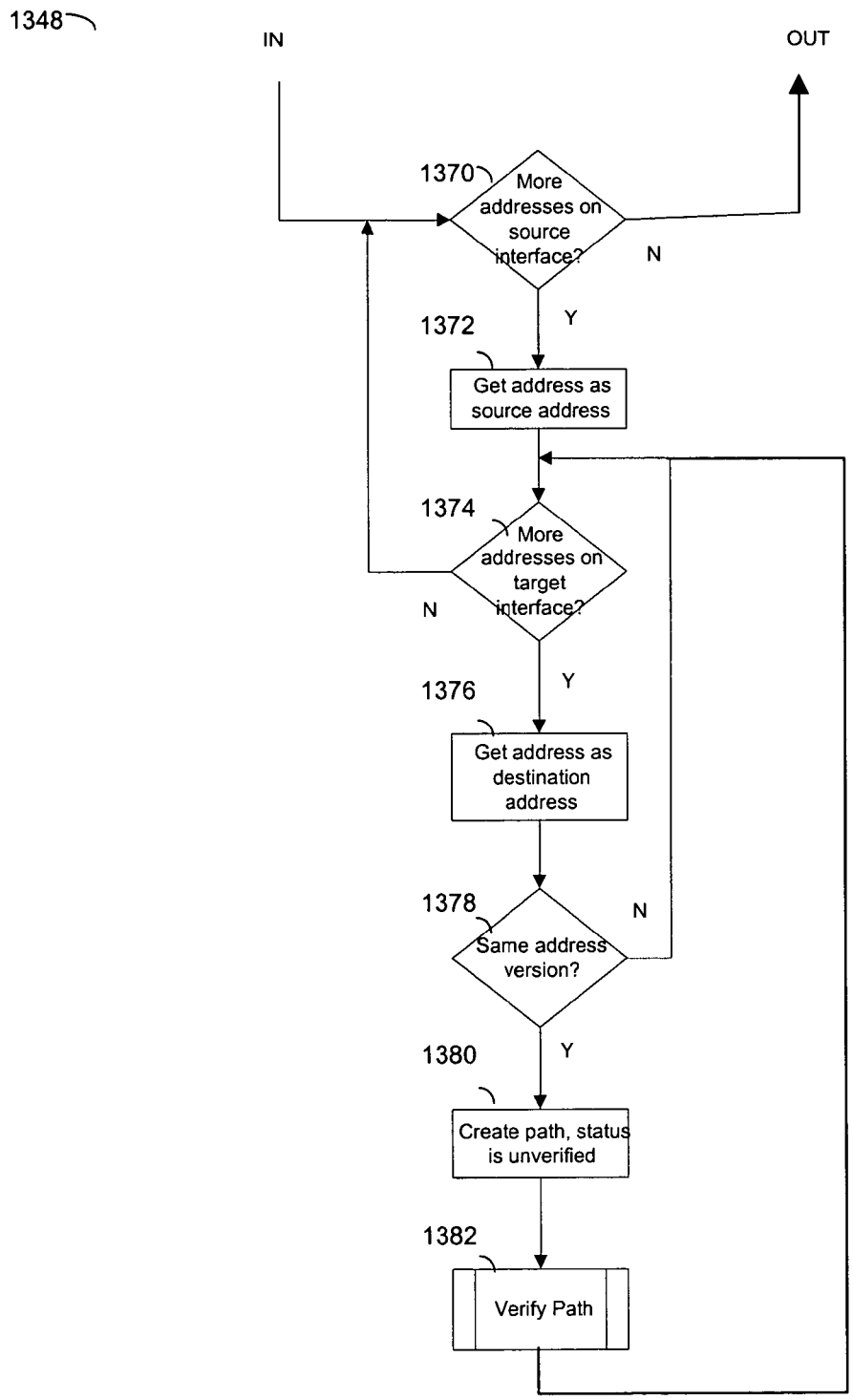

Referring now to FIG. 26, shown is a flowchart 1348 of processing steps in one embodiment for formulating new paths. Recall that 1348 processing determines the paths for the current source and target endpoints. As described in following paragraphs, 1348 includes checking or verifying the rules, such as the firewall policy rules, that may apply to determine if a particular path is possible. At step 1370, assume that at a current point in processing, the hosts traversed as indicated in the list of hosts traversed are: A-G1-G2-D such that paths from A as a source to D as a destination are being formulated in this particular instance of 1348 processing. As part of 1348 processing, each combination of possible source and target addresses are evaluated for A and D. It should be noted that an embodiment may have a source interface and/or target interface with multiple addresses, such as multiple IP addresses to designate the same interface. Accordingly, an embodiment may evaluate all possible pairings of addresses for each interface since the rules, such as the firewall rules, are evaluated in accordance with the source and target interface addresses.

At step 1370, a determination is made as to whether there are additional addresses for the source interface to be evaluated. If not, processing of 1348 stops. Otherwise, control proceeds to step 1372 where the next address of the source interface is obtained as the current source address. Control proceeds to step 1374 where a determination is made as to whether all target interface addresses have been processed. If so, control proceeds to step 1370. Otherwise, control proceeds to step 1376 where a next address of the destination or target interface is obtained as the current destination address. At step 1378, a pairing of source and destination addresses are obtained and a determination is made as to whether both addresses are in accordance with the same address versions. In this embodiment, different versions of addresses, such as IP addresses, are possible. In one embodiment, for example, a first address format and size of an address may be associated with a first version of an address format. A second address format and size may be associated with a second different version of an address format. For example, a first version may have a smaller address size than a later version. The later version may have had enhancements, for example, expansion of the address size to accommodate a larger range of addresses. The foregoing processing at step 1378 takes into account the possibility of different address versions, such as may be the case with IP Versions 4 and 6. This embodiment does not perform any conversion for this address version difference once detected. An embodiment may detect other differences and provide for different handling for these detected conditions than as described herein. For example, an embodiment may provide for address conversion as appropriate. An embodiment may, for example, pair IPV4 with IPV6 addresses and determine whether logical connectivity exists.

If step 1378 determines that the address versions of the current target address and current source address for the interfaces are not the same, the pairing is skipped and control proceeds to step 1374. Otherwise, control proceeds to step 1380. With reference to the database model of FIG. 10 and the entities affected at step 1380, it should be noted that one embodiment creates a path entity at this point and connects the path entity to the existing connection entity. It should be noted that the path's status as may be indicated, for example, with a field in the path entity, is initially set to unverified at this point in processing. Control proceeds to step 1382 where the current path created at step 1380 is now verified with Verify Path processing steps described in more detail herein. Once the current path has been verified, control proceeds to step 1374 to evaluate remaining source and/or target addresses for the current source interface and target interface.

Verify Path processing at step 1382 determines, for a pair of source and destination addresses, whether a particular path is valid in accordance with particulars of an embodiment. The particulars may include, for example, application of filtering rules, such as firewall rules, and address translation rules.

Figure 27:
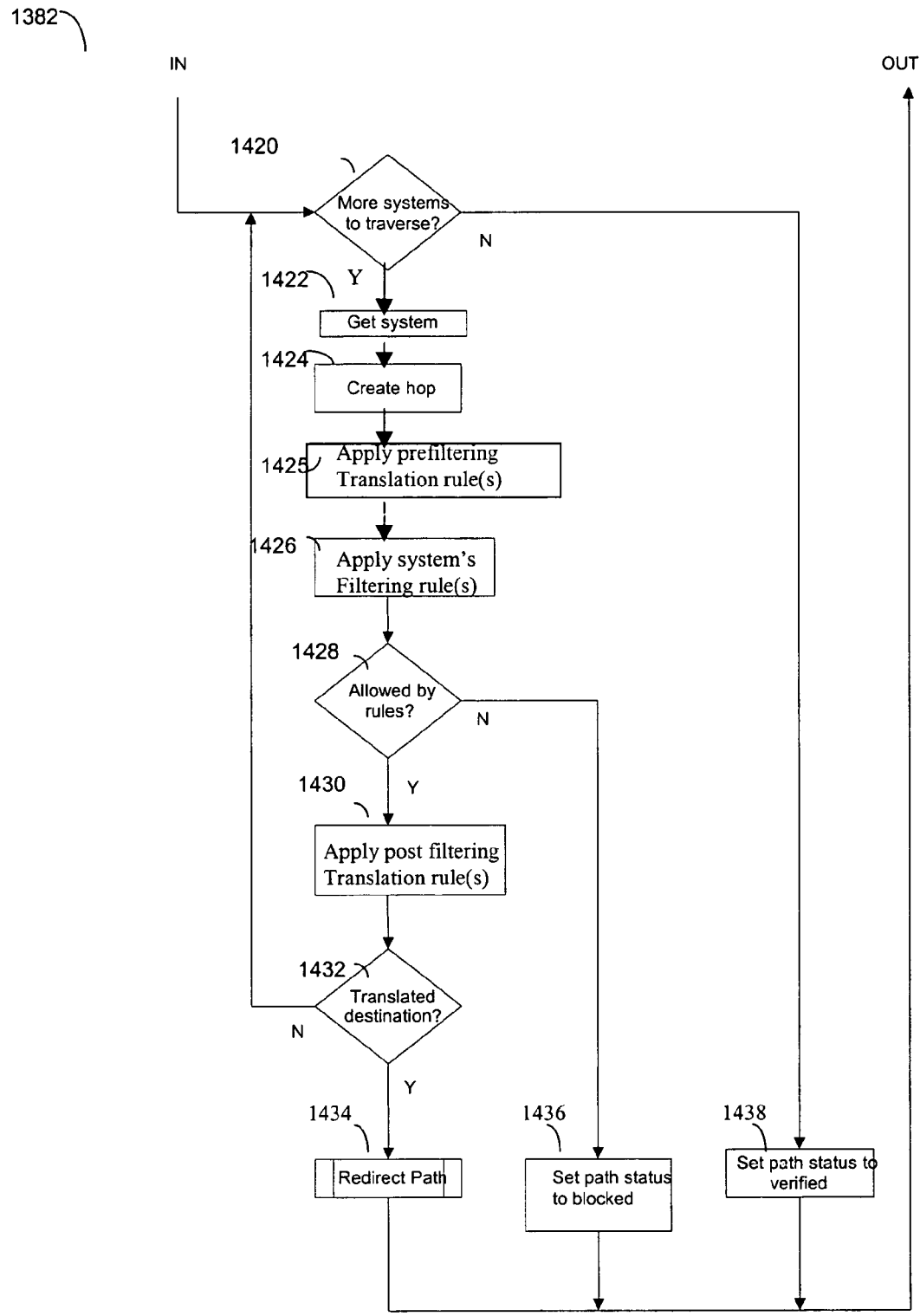

Referring now to FIG. 27, shown is a flowchart 1382 of processing steps of one embodiment for verifying a path for a current source and target address pair. For purposes of illustration, assume a current source and target address are being evaluated from A as source to D as a target. The list of hosts traversed is: A-G1-G2-D representing a list of all hops. At step 1420, a determination is made as to whether there are more hosts to traverse. Step 1420 forms a loop where each host on the list of hosts traversed is examined. At step 1422, the next host on the list, which is A, is obtained. At step 1424, a hop entity is created in the database representation. The current host on the list, host A, has its pre-filtering translation rules applied at step 1425. At step 1426, the host A's filtering rules are applied to determine if communication between a source and a target is possible. Application of filtering rules includes, for example, applying any firewall rule sets. At step 1428, a determination is made as to whether a source and destination address can pass through or include as a hop the current host using a particular port number and protocol. An embodiment may also use other criteria which may be applied by firewalls such as, for example, inbound and outbound interfaces, time of day and day of week, and the like. If not, control proceeds to step 1436 where the current path from source to destination, such as A to D in this example, is set to blocked. This value may be stored, for example, in the path entity currently being evaluated. A status of blocked may indicate that the particular path has been evaluated and determined to be blocked, such as not allowed by a filtering rule. Otherwise, if the path is currently allowed by the filtering rules, such as the firewall rules, control proceeds to step 1430 where any post filtering translation rules of the current host from the list, such as A in this instance, are applied.

At step 1432, a determination is made as to whether the destination address and/or port number is translated. If not, control proceeds to step 1420 to obtain the next host on the list of hosts traversed. Once step 1420 determines that all entries in the list of hosts traversed have been examined, hops have been created in the database for all entries in the list of hosts traversed. Control then proceeds to step 1438 where all hops in the current path have been verified and the path status is accordingly set.

If, at step 1432, a determination is made that the destination address and/or port number is translated, control proceeds to step 1434 for Redirect Path processing which is described elsewhere herein in more detail. After performing Redirect Path processing at step 1434, processing of 1382 stops.

It should be noted that an embodiment may include translation rules such as for translation of a source address and/or a target address and/or port numbers. Translation rules may be applied when at a gateway. For example with reference to FIG. 21B, gateway G1 may apply a first set of translation rules and gateway G2 may apply a second different set of translation rules. Generally, an address translation rule as used herein may be represented as an address mapping from a first address and port number to a second translated address and port number. Application of a rule of the general form:

first_address and port number→second address and port number provides for using the second address and port number rather than the first address and port number for subsequent connectivity determinations for the current source and target being evaluated. A source translation rule provides for using the second address and/or port number as a source address when evaluating subsequent connectivity using a source endpoint. A destination translation rule provides for using the second address and/or port number when evaluating subsequent connectivity of a destination. As used herein, a path may include one or more hops. A path is from a source to a target. Application of a source translation rule changes the source address and/or port number to the second address and/or port number specified for a rule. Application of a destination translation rule changes the target address and port number to the second address and port number specified for a rule. With reference to the database of FIG. 10, application of a source translation rule modifies the source network address and/or port number of the last hop entity associated with a path entity at step 1430. Application of a destination or target translation rule modifies the destination network address and/or port number of the last hop entity at step 1430. Examples illustrating the use of source and destination or target translation rules as may be applied at step 1430 are described elsewhere herein.

If there has been a target address and/or port number translation, step 1432 evaluates to yes and performs Redirect Path processing.

Figure 28:
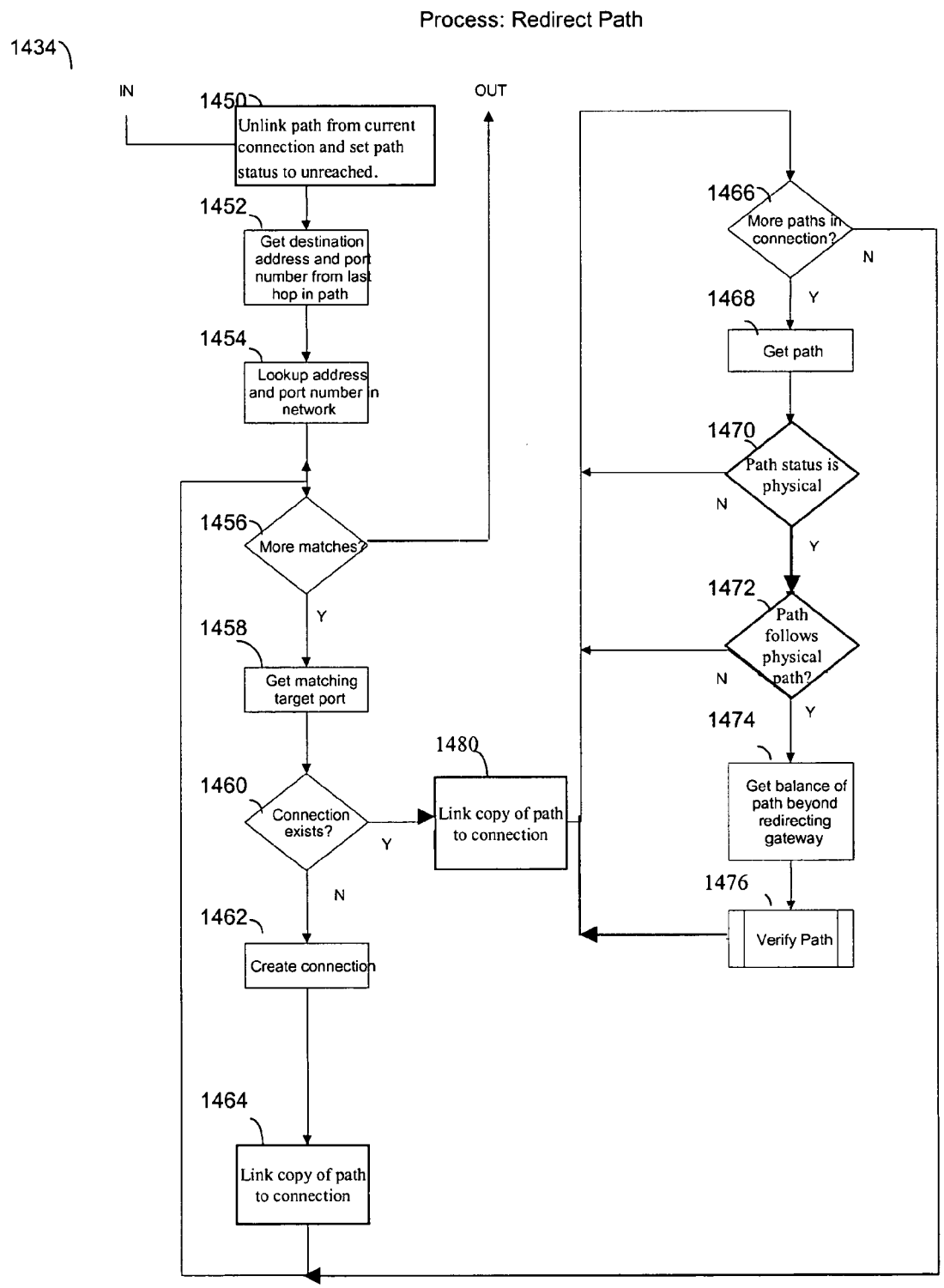

Referring now to FIG. 28, shown is a flowchart 1434 of steps of one embodiment for performing Redirect Path processing. As described elsewhere herein, 1434 includes processing steps to be performed when a target address and/or port number has been translated in accordance with a destination translation. In other words, since the target address and/or port number has been translated to a redirected target address and/or port number, the state of information as included in the database entities is further modified by the processing steps of 1434 to reflect this redirection with respect to the target. At step 1450, the connection between the current path entity and the current connection entity is unlinked and the path status is set to unreached. At step 1452, the last hop entity in the current path entity is examined to obtain the destination address and port number. At this point, a path entity has been created that may include one or more hop entities. Each hop entity includes a source and destination address. Step 1425 or 1430 processing has already modified the target address and port number of the last hop to the redirected target address and port number. Step 1452 obtains this redirected target address and port number from this last hop previously modified at step 1425 or 1430. At step 1454, any ports corresponding to the redirected target address and port number are obtained as a list of matching candidates. It should be noted that an embodiment may have more than one matching candidate if more than one network interface has the same address as that of the redirected target address. This may be possible, for example, in a network that uses overlapping address spaces in two or more subnets. For each of these candidates obtained at step 1454, processing is performed.

At step 1456, a determination is made as to whether all candidates have been processed. If so, processing of 1434 stops. Otherwise, control proceeds to step 1458 where the next matching target port is obtained. At step 1460, a determination is made as to whether a connection entity already exists. It should be noted that a redirected target address and port number may be associated with a target port for which connectivity has already been determined with respect to this point in processing. Alternatively, a redirected target address and port number may be associated with a target port for which connectivity has not already been determined with respect to this point in processing. For example with reference to FIG. 21B, connectivity may be determined from A–C and then from A–D. When determining the connectivity from A–C, a destination translation rule from G1 and/or G2 may be applied which redirects communications from the single port of C to the single port of D. Accordingly, entities will be placed in the database relating to D because of this redirection when determining A–C connectivity prior to determining A–D connectivity using the approach described herein. In this instance as an example, the connection entity may not exist in the database for A–D when determining the connectivity for A–C causing step 1460 to evaluate to no. As an example illustrating when step 1460 evaluates to yes when later evaluating all connectivity from A–D, there may also be a redirection of communications via a destination translation rule redirecting communications from the single port of D to the single port of C. In this instance, there will be a connection entity already in the database for this connection since the connectivity for A–C has already been determined.

At step 1460, if the connection entity from the source to the current target candidate does not exist, control proceeds to step 1462 where a connection entity is created. At step 1464, the path previously unlinked at step 1450 is now copied and linked to the connection entity created at step 1462. The status of the path entity is set to unreached indicating the path has been redirected and the associated path beyond the point of redirection has not yet been evaluated in accordance with the current set of filtering rules, such as firewall rule sets. Control proceeds to step 1456 to process the next target candidate with the redirected target address as specified in a destination translation rule.

If step 1460 evaluates to yes, control proceeds to step 1480 where a copy of the path is linked to the connection. Control proceeds to step 1466 for processing using the existing connection entity from the source to the current target candidate. At step 1466, a determination is made as to whether there are existing paths associated with the current connection. If so, control proceeds to step 1468 to begin processing of the first path. Each existing path is evaluated to determine if there is an existing path corresponding to all or part of the current path. From step 1468, control proceeds to step 1470 where a determination is made as to whether the path status is physical. If not, control proceeds to step 1466. Otherwise, control proceeds to step 1472 to determine if the unreached path follows the physical path. If not, control proceeds to step 1466. Otherwise, control proceeds to step 1474 to get the balance of the path beyond the redirected gateway. Control then proceeds to step 1476. The processing performed in steps 1466, 1468, 1472, 1474 and 1476 are respectively similar to processing steps 1390, 1392, 1396, 1398 and 1382 described elsewhere herein in connection with flowchart 1350 for resolve unreached path processing steps. After Verify Path processing has been performed at step 1476 control proceeds to step 1466.

If at step 1466 it is determined that there are no more paths in the connection, control proceeds to step 1456.

Figure 29A:
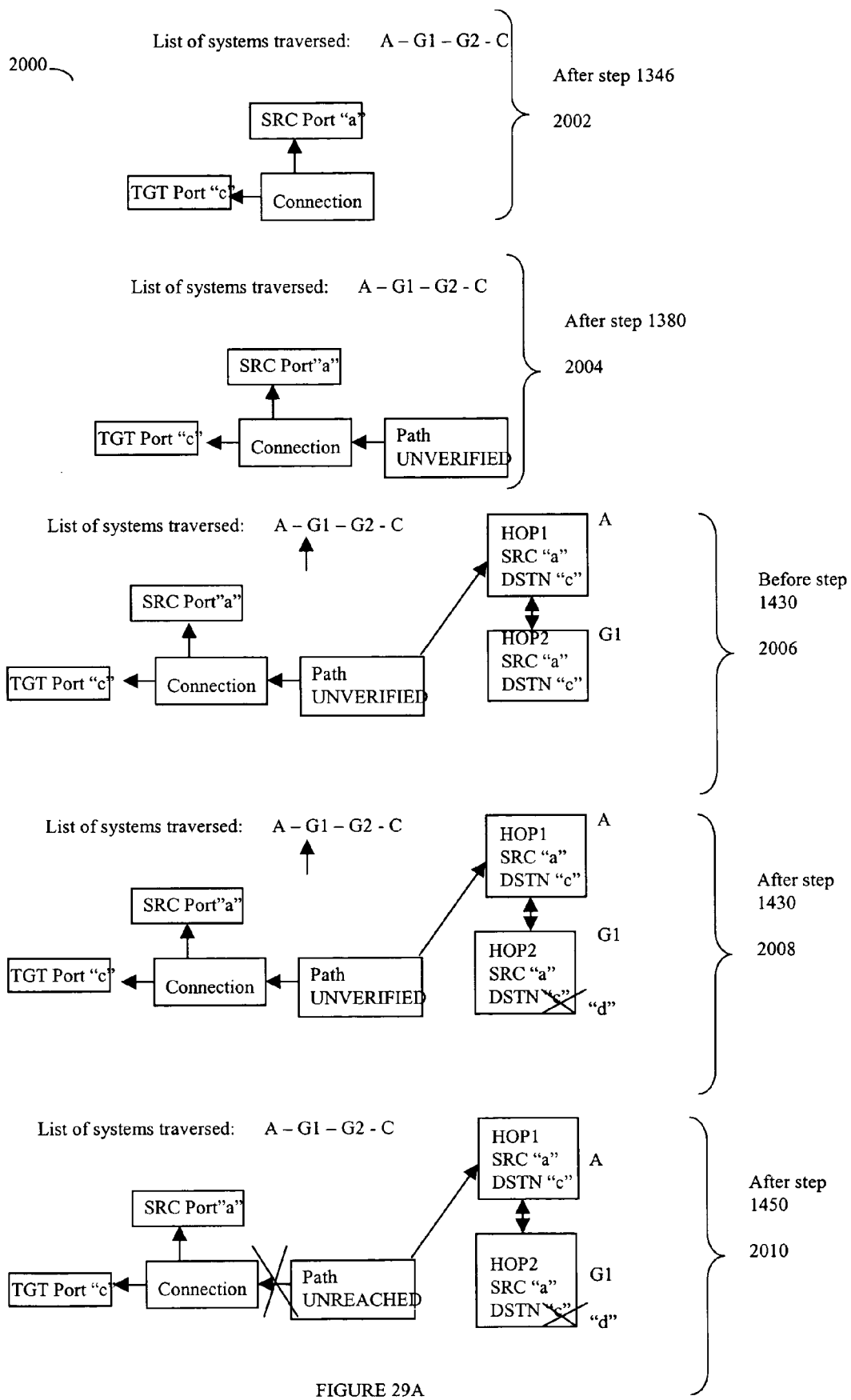
FIGS. 29A and 29B are illustrations of different entities at different points in time during processing for one example of end-to-end connectivity.
Figure 29B:
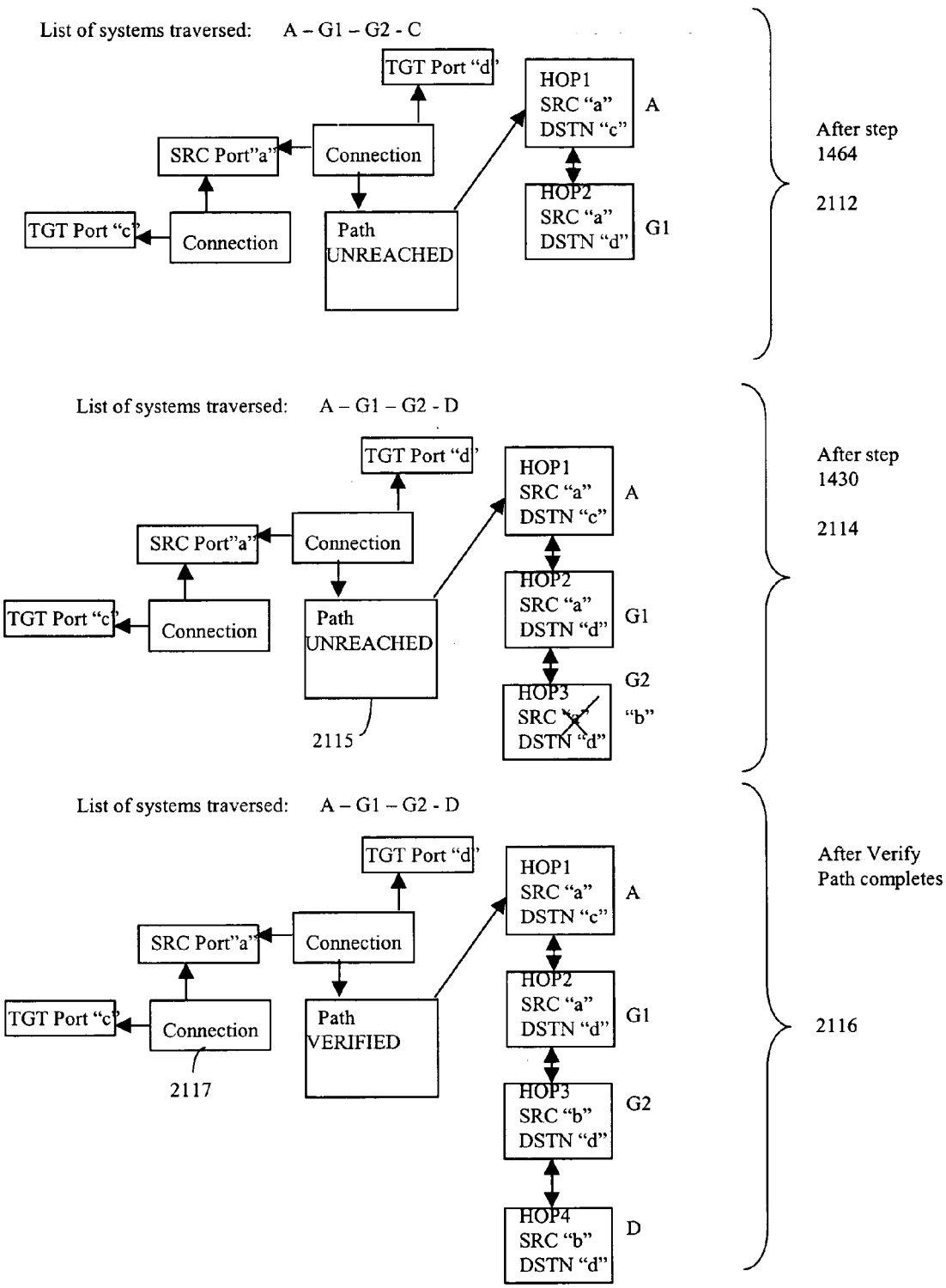

What will now be described is an example of the different entities and relationships between them to illustrate various processing steps of the connectivity processing described elsewhere herein. This example will be made with reference to FIG. 21B using entities and other information included in FIGS. 29A and 29B. Shown in FIGS. 29A and 29B are snapshots of a portion of the database entities and connections between them at different points in the processing for determining the end-to-end connectivity. It should be noted that an embodiment may store data structures in memory which may be committed to the database at different processing points. Referring to FIG. 21B, for this particular example, connectivity has already been determined using A as the source interface with respect to everything within the subnets 1252 and 1256. Currently, what is being determined is the connectivity between host interface A of subnet 1252 and the different endpoints that may be included in the subnet 1254. For purposes of this example with reference to FIG. 21B, let hosts A, B, C, and D have, respectively, addresses "a", "b", "c", and "d", and let G1 have a destination address translation rule as follows:

G1: "c"→"d"

and let G2 have a source address translation rule as follows:

G2: "a"→"b".

Each host in this example has one interface with a single port for purposes of simplicity in illustrating this example although a host may have multiple interfaces with multiple ports. With reference to this illustration, a reference to A includes a reference to the single interface and/or the single port in that host.

Referring now to FIG. 29A, Element 2002 shows a snapshot of a portion of the entities created and the associated list of hosts traversed. Element 2002 corresponds to a point in processing at which C is the target interface for which connections are currently being determined and evaluated. It should be noted that the entities included in this and other illustrations may be connected to other entities in the database. However, for the sake of illustration of connectivity information and other entities affected by the processing steps being illustrated, only a portion of the entities are included in the representations of FIGS. 29A and 29B. At step 1338 of flowchart 1314 of FIG. 23, the interface pair for C is added to the list of hosts traversed. In this instance there is only one port associated with each interface and control proceeds to step 1344. In this instance, it is assumed that there is no connection entity already existing that represents the connection from A to C as shown in the list of hosts traversed. Accordingly, control proceeds to step 1346 where the connection entity is created and the appropriate links are set up between the source and target ports for this connection. Subsequently, control proceeds to step 1347 where the physical path is added. The physical path represents the list of hosts traversed, with a path status of "physical". It should be noted that the examples of FIGS. 29A and 29B do not show the physical paths for the sake of simplicity. Control proceeds to step 1348 where Formulate New Paths is invoked. In this instance of Formulate New Paths, there is a single address associated with each of the source and target interfaces. Additionally, both source and target addresses have the same address version allowing control to proceed to step 1380 of flowchart 1348 of FIG. 26. At step 1380, the path entity is created and the status is marked in this entity as being unverified. A snapshot of the list of hosts traversed and the entities corresponding to the point in processing time for the current end-to-end connection being determined from A to C is represented by element 2004.

Verify Path processing at step 1382 of flowchart 1348 of FIG. 26 is invoked. Within Verify Path processing, element 2006 represents a snapshot of the data entities and list of hosts traversed after hop entities have been created for hosts A and G1 on the list of hosts traversed. The snapshot of 2006 is a snapshot of the entities before step 1430 is executed in which a translation rule of the host being evaluated for G1 is applied. In this instance, there is a destination translation rule mapping the address of "c" to "d". The translation rule of G1 is applied at step 1430. Accordingly, Element 2008 represents the state of the entities after applying the host G1's destination translation rule. Note that the destination address of the hop for G1 has been changed from "c" to "d". At step 1432, it is determined that a translation has occurred for a destination and control proceeds to step 1434 for Redirect Path processing. As described elsewhere herein, Redirect Path processing may be used in connection with redirecting a target in accordance with a translation rule. Element 2010 is a snapshot of the data entities and the relationships between them after performing step 1450 of Redirect Path processing. Step 1450 of Redirect Path as described elsewhere herein unlinks the path entity from the current connection entity. In summary, as a result of the destination translation rule for G1 being applied, the last hop within the list of hops for the path is modified to the new destination address "d" in accordance with the destination translation rule. Additionally, the link between the current connection entity and the path is broken.

In this example, steps will now be performed in Redirect Path processing with the loop beginning at step 1456 to set up a connection from the source, which is A in this instance, to the redirected target. Step 1454 may use the field of the network address text to determine the number of matches for a given redirect address which is "d" in this instance. In an embodiment, there may be more than one match in the database for a particular interface address. In other words, an embodiment may have one or more interfaces or candidates with the address of "d" in this example. In this embodiment, the look up at step 1454 is performed using the address of the network interface and the port number. Both the address and the port number are obtained from the last hop. Addresses are obtained from the network address entities. Port numbers are obtained from the port entities associated with the interfaces of the network address entities. With regard to this illustration, when step 1458 is reached, a matching port for destination "d" has been determined.

It should be noted that the processing of the loop formed by condition 1456 creates connection entities in the database for matching candidates determined at step 1454 having no connections yet established. In this example, there has been a connection to "d" but processing has not yet been performed to evaluate connectivity to "d".

At step 1460, a determination is made as to whether the connection already exists. Referring back to Element 2010, it may be determined that a connection entity does not connect the source interface A with the redirected target port D having address "d". Control then proceeds to step 1462 where a connection entity is created for a connection from A to D. Control proceeds to step 1464 where the path entity is copied and linked to the connection entity. A snapshot of the different entities that represent current end-to-end connectivity processing for the connectivity between A and D are shown in Element 2112. At this point, there are no additional candidates and processing of Redirect Path processing terminates. Control then returns to the last instance on the call stack for Verify Path processing, which also terminates.

At a later point in processing, connectivity is then determined from A as a source interface to host D where D is the remaining host within the subnet 1254 currently being evaluated. Within Evaluate Subnet processing, the target port is the current single port for host D and the source is the single interface on host A. This is represented by the list of hosts traversed within Element 2114. Processing within Evaluate Subnet leads to step 1344 where a determination is made as to whether a connection exists from the current source interface A to the target port for D. In this instance, the condition at step 1344 evaluates to yes and control proceeds to step 1350 to perform Resolve Unreached Paths processing. At this point, a path has been discovered as associated with a connection from A to D and connectivity for A to D has not yet been performed. In this example, the foregoing implies that there has been a redirection to D at some previous processing point. In other words, in order for the connection entity to exist for A–D with the associated path(s) prior to determining the end-to-end connectivity for A–D, there has to have been a redirection to that particular destination, D.

Processing steps of Resolve Unreached Paths, flowchart 1350, walks the list of paths from the existing connection entity for the A–D connection. In this example, there is only one existing path. The path status is indicated as unreached. At step 1396 it is determined whether the entities within the database for the current path correspond to a portion of the hosts represented in the list of host traversed. In this example, a determination is made as to whether the hops A and G1 of the path entity 2115 correspond to a portion of the list of hosts traversed. In this instance, the condition evaluates to true since the hops of 2115 include hop entities for A and G1. Control to proceeds to step 1398 where it is determined which one or more hosts included in the list of the hosts traversed are not included in the path associated with Element 2115. In other words, at step 1398, it is determined what portion of the list of the hosts traversed has not been represented within the hop entities associated with the path entity 2115. In this instance it is determined that the hosts G2 and D have not been represented. Control proceeds to step 1382 where Verify Path processing is invoked with hosts G2 and D in order to create appropriate hops for hosts G2 and D. Verify Path processing walks through or traverses each element within the list of hosts G2 and D passed as an input parameter in this instance. For host G2, it is assumed that the filtering rules allow a connection between A and D through G2. This results in the creation of a third hop entity (HOP3). In this example, there is a source translation rule which translates the address of "a" to "b". Accordingly, at step 1430 this source translation rule is applied. The snapshot of the database entities at step 2114 represents the database entities after step 1430 is executed where the hop has just been added corresponding to Gateway G2. Similarly, processing of Verify Path continues and adds a fourth hop corresponding to the destination D. After the completion of this instance of Verify Path, the database entities for this particular end-to-end connectivity instance from A to D may be represented by Element 2116.

The foregoing example illustrates the effect on the various entities of applying a destination translation rule and a source translation rule. The effect of the destination translation rule results in a redirection or a reattachment of the path entity to a different connection. In other words, initially, the foregoing processing steps build a path with an associated connection corresponding to the end-to-end connectivity for A to C. Later on, a destination translation rule results in the address of "c" being redirected or translated to "d". In this instance, the appropriate entities are unlinked, linked, and associated with a connection entity corresponding to the end-to-end connectivity from a source of A to a destination of D. As a result, referring to Element 2116, there is a first connection entity with a source interface of A and a target port of D having an associated path entity indicating that there has been a verified and reached path between A and D. In 2116, there is also a connection entity connecting source interface A to target port C. However, this connection entity 2117 has no associated path entity other than the physical path.

Building of the attack tree using techniques described herein may use the information in the connection entities to determine end-to-end connectivity between source interfaces and target ports.

It should be noted that the Verify Path invocation at step 1382 is passed the remainder or balance of the list of hosts traversed. In all other flowcharts regarding connectivity processing, the list of hosts traversed represents state information about what hosts have been traversed at a point in time with respect to determining connectivity information. In the foregoing, redirection with respect to a destination address translation may occur before or after connectivity has been determined for an endpoint.

The path entity used in the foregoing processing steps may have a status which is one of: unverified, verified, blocked, physical, and unreached. Other embodiments may use other status indicators for this and other entities as may be used in an embodiment to utilize the techniques described herein.

An embodiment may use the techniques described herein to generate attack trees using the end-to-end connectivity. An embodiment may decide not to use path and hop information after end-to-end connectivity is determined. Such an embodiment may discard the path and hop entities after end-to-end connectivity is determined. Recall that an embodiment may use the techniques described herein to produce an attack tree using the end-to-end connectivity and vulnerability information. An embodiment using the foregoing techniques for generating a pruned attack tree may not use the hop and path information.

An embodiment may also decide to retain the hop and path information for other uses and modeling other elements of a network that may vary in accordance with each embodiment. For example, an embodiment may use the hop and path information for use with modeling intrusion detection systems (IDS) in order to determine, for each connection, what hosts and subnets are crossed by each connection. Modeling an IDS as an improvement may involve processing similar to modifying a generated attack tree, for example, when applying software patches. An embodiment may also use the path and hop information to assess, for example, the impact on a network if the attacker compromises or takes a gateway offline. It should be noted that whether an embodiment chooses to maintain the path and hop information may vary in accordance with the functionality of each embodiment.

Figure 29C:
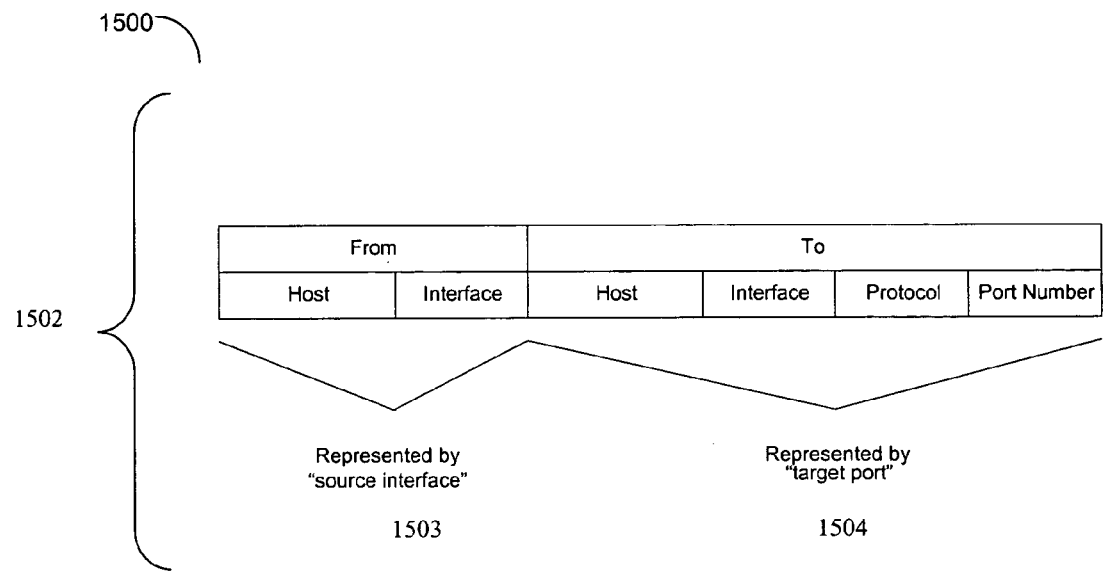
FIG. 29C is an example of one logical representation of entities used in end-to-end connectivity.
Figure 29C:
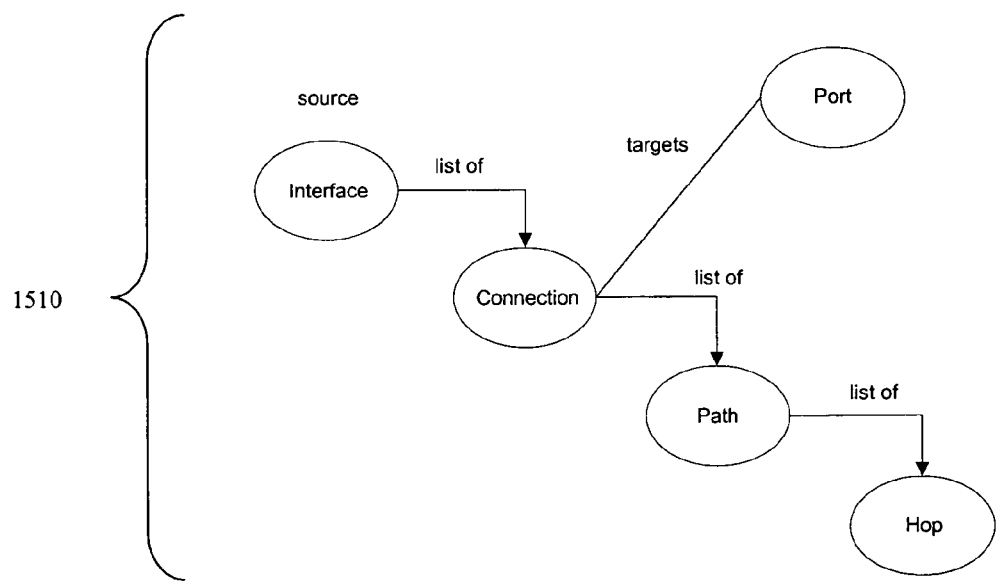

Referring now to FIG. 29C, shown are logical representations 1500 of data used in connection with representing the end-to-end connectivity information described herein for one embodiment. Element 1502 includes a logical representation of the information represented by an instance of a connection entity and two associated port entities in which a first port entity indicates a source end point and the second port entity indicates a target end point. A source interface 1503 as used in describing the end-to-end connectivity processing in this particular embodiment may be represented by a particular host and interface within that host. A target port 1504 may be represented by a particular host, interface within that host, protocol, and port number. If any one or more of these items included in the representation 1504 for the target port varies, the information identifies a different target port. It should be noted that the illustration 1502 may be used in an embodiment where, as described elsewhere herein, there is a generic port used as a source port assumed for each interface. Alternatively, an embodiment may also represent a source port using information similar to that of 1504 if a single generic port is not assumed for the source port.

Referring now to Element 1510, shown is a representation of the relationships between instances of the entities of the database model as described in connection with FIG. 10. In particular, a source interface is associated with a list of one or more connections. Each one or more connections may be associated with one or more targets. Each target is represented by a single port in this example. A particular connection entity represents a relationship between two endpoints, a source interface and a port. Associated with each connection are one or more paths. Each path is associated with a list of one or more hops. Element 1510 may be characterized as representing a logical relationship between the different entities that may be implemented as data structures in connection with determining the connectivity information as part of a preprocessing step. The connectivity information may be used in populating portions of the database as described elsewhere herein.

Referring now to FIG. 29D, shown is an example representation 2220 of one embodiment of a firewall rule set. Element 2220 represents information that may be stored in the database firewall policy entities of category E, such as E400, in an embodiment of the database. The firewall rules may be read from one or more input files, input manually, and the like. The firewall rule set, as well as other filtering policies and associated rules included in an embodiment, may be evaluated and applied in determining end-to-end connectivity. It should be noted that other embodiments may use information other than as shown in 2220. In this example, each firewall rule includes a rule number or identifier 2222, a source address or indicator 2224, a destination address or indicator 2226, a service 2228, an action 2230, and a time 2232. Each rule applies to a particular source and destination pair as may be indicated, for example, by an IP address of a source and an IP address of a destination. The service 2228 may indicate that a particular rule is applied in connection with a service, such as http, mail, and the like. In one embodiment, the element 2228 may include a protocol and associated port number indicating, respectively, which protocol (e.g., TCP, UDP, ICMP) the rule applies to, and which port number. The action 2230 indicates the particular action to be taken when applying the rule. The action may be, for example, one of blocking under certain specified conditions in accordance with the rule. The time 2232 may be used to indicate particular days of the week and times of the day as to when the rule applies. Rules may also specify source and destination port numbers.

The rule application processing described herein in connection with steps of FIG. 27 applies filtering rules, as at step 1426, and translation rules, as at steps 1425 and 1430. Filtering and translation rules are applied as part of determining the end-to-end connectivity within a network. Rules may be applied by any host traversed in the network path, including the endpoints.

Application of filtering and translation rules may be characterized as one technique for mirroring processing performed by traditional firewalls. Given an inbound and outbound network interface, source and destination network address, the protocol, the source and destination port number (e.g., if the protocol is TCP or UDP), and the date and time for which connectivity is being computed, the rule application techniques used herein determine whether a host allows or blocks the communication.

It should be noted that the rule application processing described herein does not implement full firewall functionality. The rule application processing does not need to maintain state, since it is only trying to answer the question of whether or not communication is allowed. The rule application does not need to perform inspection, or reassemble packets, since there are no packets or messages generated to flow between the endpoints.

It should be noted that the date and time for when connectivity is computed is important when applying rules, since firewalls may enforce different rules at different times of the day. Furthermore, some firewalls allow an expiration date and time to be set for a rule, so it is no longer enforced after it expires. As a result, end-to-end connectivity changes over time. All time-oriented comparisons are time-zone adjusted, since the hosts in a network may span multiple time zones.

In connection with determining the end-to-end connectivity using the techniques described in following paragraphs, the end-to-end connectivity map is computed using a forward-chaining search algorithm. Connectivity is computed for every host and every network interface, by pairing the host and interface with all other hosts and interfaces, and applying the filtering and translation rules along every network path. If all hosts in the path allow the communication, then the connection is added to the connection map. If a host in the path blocked the communication, the connection is not added to the connection map.

The techniques used in determining end-to-end connectivity consider the possibility that a host may have multiple network interfaces and the possibility an interface can respond to multiple network addresses. If a host has multiple network interfaces, the mapping process will compute connectivity for each interface separately. If an interface has multiple network addresses, connectivity along the network path is evaluated using all pairings of network addresses on the source and target.

The end-to-end connectivity techniques described herein consider the effect of network address and port number translation. The source and destination addresses and port numbers sent by one endpoint of a connection may not be the same as those received by the other endpoint of the connection; the source and destination information may be translated by any host along the network path, and multiple translations may occur. Also considered in determining the end-to-end connectivity is the possibility that a network may contain overlapping address spaces. For example, a network may contain multiple enclaves, each of which uses the same private address space (e.g., 172.16.240.0/20) within the enclave. Machines within an enclave that communicate outside the enclave have their network addresses translated to globally routable addresses at the enclave gateway. If an enclave gateway redirects a globally routable address to a private address, the techniques described herein determine the actual machine the traffic is being redirected to, even though there may be multiple machines in the network using that private address.

It should be noted that the end-to-end-connectivity techniques described herein do not produce connectivity entries for self-connections, (e.g., from host X to host X). The techniques for determining end-to-end-connectivity as described herein also do not target interfaces on the outbound side of a gateway, so if host X's local gateway is G, and G has an interface on X's subnet and an interface on another subnet R, X's connectivity does not include connectivity to G's interface on R. Additionally, the end-to-end-connectivity techniques described herein prevent looping, by ensuring that once a gateway is crossed it is not crossed again.

What will now be described are processing steps of one embodiment in connection with analyzing the output of the Nessus vulnerability scanner in order to populate the entities of the software and vulnerabilities category A and attacker actions category B in the database of FIG. 10 to perform step 352 processing of FIG. 9A. It should be noted that other embodiments may perform other processing steps and use other techniques than as set forth herein. For each vulnerability detected as may be associated with, for example, a particular software version, three pieces of information or state may be used: EFFECT, DOS (Denial of Service) and LOCALITY. As related to a vulnerability, the EFFECT state may be characterized as the privilege level of an attacker, or information gained or affected as a result of exploiting a vulnerability. For example, EFFECT may include a resulting attacker status or access on a host after a vulnerability is exploited. The EFFECT may also be used to indicate that, for example, after a vulnerability is exploited, an attacker has access to confidential information, or the attacker has elevated privileges as may be associated with a system administrator level user. As described herein, the EFFECT may have one of four values including system access, user access, other and none. The state of other implies that the attacker can access or modify specific host components such as a specific file or database entry, but does not have the overall access provided by user or system privileges. A state of none as associated with an EFFECT represents that, as a result of exploiting an associated vulnerability, the level of access is unknown or there is no additional access. The DOS state represents the denial of service status. DOS is a boolean value of yes when a particular exploitation of a vulnerability causes loss of a service or host. Otherwise, the DOS state is no. The third piece of information or state is a LOCALITY state reflecting whether a vulnerability may be exploited by a remote attacker. LOCALITY may have one of four values in the embodiment herein: local, remote, either, or unknown. Local indicates that the attack can only be performed after the attacker obtains system or user privileges on the local victim host. Remote specifies that the attack may occur from an attacker that is remotely connected, such as through a network, to a host. A value of either as the LOCALITY state indicates that the attack may occur either remotely or locally. A LOCALITY state of unknown indicates that a vulnerability may be exploited from a location that cannot be determined from the information analyzed.

LOCALITY, DOS and EFFECT information may be required in an embodiment for each vulnerability detected. If the Nesses scanner is used, this information may be provided in the textual descriptions and categorizations of vulnerabilities provided. A human security analyst may determine LOCALITY, DOS and EFFECT by examining this Nessus information. This analysis may be performed once for each vulnerability and may then be used by anyone who uses Nessus to analyze networks and generate attack trees. If this textual information is insufficient, cross references may be used as provided, for example, by Nessus and other vulnerability scanners to Common Vulnerability Exposures (CVE) numbers described at http://www.cve.mitre.org and to Bugtraq Identification (bid) numbers described at http://www.securityfocus.com/bid. These cross references and others may be used by a human security expert to determine further information about each vulnerability to determine LOCALITY, DOS and EFFECT. For example, the CVE number may be used to find the vulnerability in the ICAT Metabase available from http://icat.nist.gov/. This database has a categorical description for each vulnerability named "Related exploit range" that specifies the LOCALITY of each vulnerability. This database also has other categorical descriptions such as "Vulnerability Consequence" that may be used to determine DOS and EFFECT for vulnerabilities. In addition, the bid number may be used to access the Security Focus Bugtraq vulnerability database. This database includes binary valued descriptors for each vulnerability named "remote" and "local". These descriptors may also be used to determine LOCALITY of an attack. Automated machine learning or data mining approaches may be used to obtain EFFECT, LOCALITY, and DOS information for vulnerabilities. These approaches may be used to detect the occurrence of phrases such as, for example, "allows remote attackers to execute arbitrary code" or "denial of service", in vulnerability descriptions from Nessus, ICAT, Bugtraq, CVE as well as other sources. Categorical and binary descriptors may also be extracted from the foregoing sources, and then analyzed to determine EFFECT, LOCALITY, and DOS information for each vulnerability of interest using a neural network, decision tree, or other type of machine learning classifier. Such classifiers may be previously trained using vulnerabilities analyzed by a human security expert to determine EFFECT, LOCALITY and DOS. The trained classifiers may then be used to predict these characteristics of vulnerabilities that have not yet been analyzed.

It should be noted that an embodiment may also use other information in determining the states of the foregoing three variables to represent the vulnerability, possible actions, and the resulting state of an attacker if a particular vulnerability is exploited. In one embodiment, the EFFECT and DOS state information may be used to populate a B200 entity indicating the resultant attacker state, for example, on a host. The LOCALITY state information may be used to set the locality code of an entity B100.

It should also be noted that an embodiment may populate other fields of different entities described herein, for example, vulnerability text description as included in entity A500, using information from one or more the foregoing databases or files. Additional processing and analysis of the input files and databases may be performed as described herein to obtain a portion of the fields included in the A and B category entities. Other embodiments may use different techniques and data sources in population of a database included in each particular embodiment. An embodiment may also represent a state of a vulnerability using different parameters, in number and/or type, for a vulnerability than as described herein with the EFFECT, LOCALITY and DOS variables.

It should be noted that the techniques described here may be performed on a single network. However, embodiments may include multiple networks or subnets. The techniques described herein may be used to analyze a plurality of networks or subnets such as LANs (local area networks), and the like. The foregoing techniques may be used to analyze each of the subnets separately. Accordingly, any proposed solutions may be extended to each of the subnets.

Figure 30:
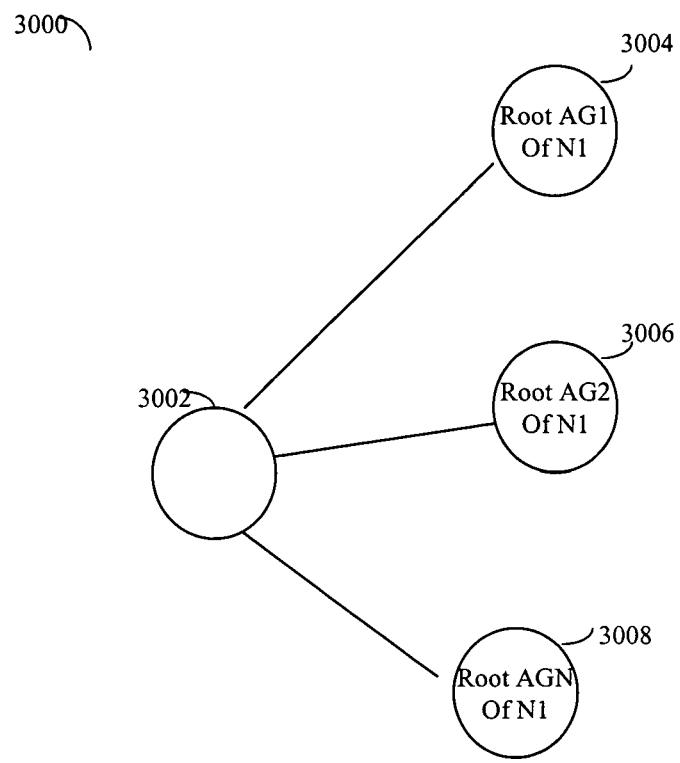
FIG. 30 is an example of representation of how attack trees may be combined in one embodiment.

Referring now to FIG. 30, shown is a representation 3000 of how attack trees for multiple attacker starting locations in a network may be combined. The representation 3000 may be characterized as a composite attack tree for a single network. An attack tree may be generated for each attacking starting location in which each attack tree shows how the network may be compromised from that starting location. The composite attack tree may be formed by introducing a new root node 3002 connected to the root of each existing attack tree. In other words, a new root is introduced at a new level 0. Each existing root of an attack tree becomes an intermediate node at a level 1 connected to the new root at level 0 as illustrated. The attack trees included in 3000 may be pruned attack trees produced using the techniques described herein.

The foregoing provides an automated and efficient attack tree generation technique making use of forward chaining and a breadth-first search technique. The techniques described herein judiciously prune redundant states and paths to avoid combinatorial explosions making the techniques described herein scaleable for use with small and large networks. The foregoing may use output from existing vulnerability scanners to automatically import relevant network data. The foregoing may be used in analyzing generated attack trees in order to develop a list of prioritized recommendations for improving network security. Hosts within a network are assigned attack loss values which may be summed to determine a total value of what may be compromised in a network. A network vulnerability score may be determined based on the host(s) compromised in the attack tree(s) and the total value of the network. Actions, such as patching vulnerabilities or changing a firewall policy, may be evaluated to determine their impact on a network's vulnerability score. Actions yielding the largest improvement in a network's vulnerability score may be rated highest in the prioritized recommendations. Additionally, the foregoing may be used in connection with experimenting with "what if" scenarios to allow a user to assess the impact of various changes on an overall network security in a hypothetical manner. The foregoing presents a comprehensive representation of all that may be compromised by attackers positioned at various starting points within a network. The foregoing tree generation takes into account for example network topology, firewall policy, and intrusion detection system placement as well as vulnerabilities therein. The foregoing may also be used in an embodiment to take into account threats related to "sniffing" (such as obtaining a password by monitoring data packets on a network), remote access, and administrative services.

It should be noted that the foregoing uses worst case assumptions. However other embodiments may use the techniques described herein based on other conditions. For example, an embodiment may use a probabilistic model and assign probabilities to each vulnerability in accordance with a likelihood of the vulnerability being exploited. The likelihood of a vulnerability may be evaluated in an embodiment, for example, as part of preprocessing when populating the database, or during runtime when building an attack tree, or a combination thereof. An embodiment may also use a combination of the foregoing, for example, and assume a portion or particular type of vulnerability is always exploited, and vulnerabilities of other types have an associated probability of being exploited. For example, an embodiment may assume that vulnerabilities for exploitation of authentication information, such as a password obtained by "sniffing" network data with no encryption is always exploited. If encryption is used, a probability may be assigned to the vulnerability.

The techniques described herein may also be used to test a scenario in which one or more vulnerabilities are added or supposed, for example, as may be discovered via assessing or re-evaluating the security of an existing network. Depending on the change, as described elsewhere herein, the re-evaluation techniques used in an embodiment may update an existing pruned attack tree, or alternatively generate a new attack tree in accordance with each embodiment and the particular type of change.

The foregoing describes assigning the attack loss values to each of the hosts. This may be done using manual and/or automated techniques. In one embodiment, for example, an automated tool may be used in connection with assigning an initial set of values to various hosts in accordance with network input and data that may already exist. A user, such as an administrator, may review and adjust the values as necessary, for example, in accordance with any modifications to the host. A set of critical data may be located on a first host when the initial set of values are generated. Later, the critical data is moved to a different host. Accordingly, the attack loss values may be adjusted either manually or using an automated technique. As also described herein, individual attack values may depend on one or more factors including, for example, host type, such as whether the host is a user or an administrative desktop, a server, or an infrastructure component. Additionally, the attack loss values may depend on the criticality of the data stored thereon, or otherwise available through an existing host, and the impact of downtime in the event of a data loss. It should be noted that other embodiments may use any one or more factors when determining a host loss value that may vary in accordance with each particular embodiment.

It should be noted that, as described herein, the foregoing system may use the output of a vulnerability scanner, such as Nessus, in order to automatically import relevant network data. Network data may include, for example, host names and IP addresses, open ports on the hosts, services and software versions running on the different ports, known vulnerabilities in the various versions and the like. The vulnerabilities reported by the vulnerabilities scanners may be correlated with information available from one or more databases such as the ICAT Metabase available from NIST in order to automatically determine which attacker actions should be attached to each vulnerability. An embodiment may also acquire additional information from other sources or alternatively may use information from other sources than as described herein.

In connection with the database described herein, the vulnerabilities are associated with particular software versions and ports in the database to allow direct access to vulnerabilities for each host. The connectivity information may be pre-computed and stored in a per host data structure. The foregoing techniques may be used to reduce the computation time required to determine when a link should not be used to extend the current tree. In the foregoing, vulnerabilities may be changed and services may be disabled in order to provide a reassessment. The foregoing representation describes an embodiment that may include four levels of compromise: user, system, other, and DOS. However, an embodiment may use a different number of levels that may vary in accordance with each particular embodiment. Similarly, other particulars set forth herein related to sizes, dimensions, levels, entities and associated relationships, and the like should not be construed as a limitation.

Using the techniques described here, execution time as obtained by the inventors using test data indicate that the run time scaled approximately quadratically with the number of hosts indicating that the foregoing describes efficient and practical techniques for use even with large networks. Additionally, the memory requirements as may be used in connection with storing the pruned attack tree scale quadratically with the number of hosts which is related to the size of the connectivity information as may be stored in the database described herein.

It should be noted that the attack loss values described herein may be assigned to a host as described herein. A host as defined and used herein refers to a network entity having a processor and may include, without limitation, a file server, a backup server, a DNS server, a domain controller, a switch, or a mail server.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method comprising:
   using a computer to generate a pruned attack tree, using the computer comprises:
   designating a root node of the pruned attack tree, the root node representing a starting point of an attack; and for a current node included in the pruned attack tree, connecting a resulting node having a first state, representing a first host and access to the first host, and an edge, having a first transition value corresponding to one of a plurality of vulnerability types, to the current node if determined that:

another edge, having a second transition value corresponding to one of the plurality of vulnerability types, does not connect an ancestor of the current node to another node having a second state equivalent to the first state; and the second transition value is equal to the first transition value.

2. The method of claim 1 wherein the pruned attack tree is a tree including n levels, the root node is at level 0, n being at least 0.

3. The method of claim 2 wherein the first state represents at least one of: an attacker state including the first host and an attacker access level on the first host, and a network state.

4. The method of claim 3 wherein the edge from the current node at a level x to the resulting node at a level x+1 represents an action while in the first state including a first attacker state corresponding to the current node resulting in the second state including a second attacker state.

5. The method of claim 4 wherein the first attacker state represents the first host and a first attacker access level on the first host, and the second attacker state represents at least one of: a second host and a second attacker access level on the second host, and the first host and a second attacker access level on the first host; and wherein the second attacker access level represents at least one of: an increase in attacker privilege, an increase in attacker access, and an increase in attacker knowledge.

6. The method of claim 5 wherein using the computer further comprises evaluating each action that exploits a vulnerability of a host in accordance with connectivity data.

7. The method of claim 6 wherein the connectivity data, the each action, and the vulnerability are stored in a database.

8. The method of claim 1 wherein the plurality of vulnerability types includes vulnerabilities being indicative of providing a same access level on a host.

9. The method of claim 1 wherein the current node is at a level n, and the ancestors of the current node are located at levels in the pruned attack tree at a level less than n.

10. The method of claim 9 wherein the pruned attack tree is generated using a breadth first search technique in which nodes are added at an nth level prior to adding any node from level n+1.

11. The method of claim 1 wherein computer attack paths for a network are represented using pruned attack trees, the pruned attack trees representing the computer attack pats originating from a unique starting point.

12. The method of claim 1 wherein the root node is one of: from within a network and external to a network.

13. The method of claim 1 wherein using the computer further comprises:

determining which hosts in the network are equivalent forming a group; and representing the group with a single host.

14. The method of claim 1 wherein using the computer further comprises using connectivity information to generate the pruned attack tree, the connectivity information including a connection between two endpoints representing elements of a configuration of the network.

15. The method of claim 14 wherein the connectivity information includes physical connectivity between network interfaces and logical connectivity through network communications protocols.

16. The method of claim 14 wherein the connection is associated with a path including one or more hops.

17. The method of claim 16 wherein the one or more hops is associated with at least one of: a filtering rule, a translation rule, and an interface of a host in the network.

18. The method of claim 16 wherein at least one of the endpoints is associated with a vulnerability on the at least one endpoint.

19. The method of claim 18 Wherein the vulnerability has an associated action resulting in exploitation of the vulnerability.

20. The method of claim 19 wherein the associated action is related to an entity representing at least one of: an attacker access level, attacker knowledge level, a change to a network state.

21. The method of claim 1 wherein using the computer further comprises:

using connectivity data representing connectivity between pairs of endpoints in the network; and automatically generating the connectivity data in accordance with at least one translation rule, at least one filtering rule, and network configuration information.

22. The method of claim 21 wherein the at least one translation rule includes at least one of: an address translation rule and a port translation rule.

23. The method of claim 21 wherein using the computer further comprises:

selecting at least one address of a starting point of a computer attack using at least one rule; and determining a portion of the connectivity data using the at least one address.

24. The method of claim 23 wherein the at least one rule includes at least one of a filtering rule and a translation rule.

25. The method of claim 23 wherein the at least one address is used in the generating to represent an alternate connectivity of a host.

26. The method of claim 23 wherein the at least one address is one of an address in accordance with a communications protocol and an address associated with the network.

27. An article comprising a machine-readable medium that stores executable instructions for generating a pruned attack tree, the instructions causing a machine to:

designate a root node of the pruned attack tree, the root node representing a starting point of an attack; and for a current node included in the pruned attack tree, connecting a resulting node having a first state, representing a first host and access to the first host, and an edge, having a first transition value corresponding to one of a plurality of vulnerability types, to the current node if determined that:

another edge, having a second transition value corresponding to one of the plurality of vulnerability types, does not connect an ancestor of the current node to another node having a second state equivalent to the first state; and the second transition value is equal to the first transition value.

28. The article of claim 27 wherein the pruned attack tree is a tree including n levels, the root node being at level 0, n being at least 0.

29. The article of claim 28 wherein the first state represents at least one of: an attacker state including the first host and an attacker access level on the first host, and a network state.

30. The article of claim 29 wherein the edge from the current node at a level x to the resulting node at a level x+1 represents an action while in a first state including a first attacker state corresponding to the current node resulting in the second state including a second attacker state.

31. The article of claim 30 wherein the first attacker state represents the first host and a first attacker access level on the first host, and the second attacker state represents at least one of: a second host and a second attacker access level on the second host and the first host and a second attacker access level on the first host wherein the second attacker access level represents at least one of: an increase in attacker privilege, an increase in attacker access, and an increase in attacker knowledge.

32. The article of claim 31, further comprising instructions causing a machine to evaluate each action that exploits a vulnerability of a host in accordance with connectivity data.

33. The article of claim 32, further comprising instructions causing the machine to store the connectivity data, the each action, and the vulnerability in a database prior to generating the pruned attack free.

34. The article of claim 27 wherein the plurality of vulnerability types includes vulnerabilities being indicative of providing a same access level on a host.

35. The article of claim 27 wherein the current node is at a level n, and the ancestors of the current node are located at levels in the pruned attack tree at a level less than n.

36. The article of claim 35, further comprising executable code that generates the pruned attack tree using a breadth first search technique in which nodes are added to the pruned attack tree at an nth level prior to adding any node from level n+1 to the pruned attack tree.

37. The article of claim 27 wherein computer attack paths for a network are represented using pruned attack trees, the pruned attack trees representing computer attack paths originating from a unique starting point.

38. The article of claim 27 wherein the starting point is one of: from within a network and external to a network.

39. The article of claim 27, further comprising instructions causing the machine to:
determine which hosts in the network are equivalent forming a group; and
represent the group with a single host.

40. The article of claim 32 further comprising instructions causing a machine to use connectivity information to generate the pruned attack tree, the connectivity information including a connection between two endpoints representing elements of a configuration of the network.

41. The article of claim 40 wherein the connectivity information includes physical connectivity between network interfaces and logical connectivity through network communications protocols.

42. The article of claim 40 wherein the connection is associated with a path including one or more hops.

43. The article of claim 42 wherein the one or more hops is associated with at least one of: a filtering rule, a translation rule, and an interface of a host in the network.

44. The article of claim 40 wherein at least one of the endpoints is associated with a vulnerability on the at least one endpoint.

45. The article of claim 44 wherein the vulnerability has an associated action resulting in exploitation of the vulnerability.

46. The article of claim 45 wherein the associated action is related to an entity representing at least one of: an attacker access level, attacker knowledge level, a change to a network state.

47. The article of claim 27 wherein connectivity data representing connectivity between pairs of endpoints in the network is used by the executable code that generates, and further comprising instructions causing a machine to: automatically generates the connectivity data in accordance with at least one translation rule, at least one filtering rule, and network configuration information.

48. The article of claim 47 wherein the at least one translation rule includes at least one of: an address translation rule and a port translation rule.

49. The article of claim 47, further comprising instructions causing the machine to select at least one address of a starting point of a computer attack using at least one rule; and determine a portion of the connectivity data using the at least one address.

50. The article of claim 49 wherein the at least one rule includes at least one of a filtering rule and a translation rule.

51. The article of claim 50 wherein the at least one address is used in the generating to represent an alternate connectivity of a host.

52. The article of claim 51 wherein the at least one address is one of an address in accordance with a communications protocol and an address associated with the network.

53. The article of claim 27, further comprising instructions causing the machine to use vulnerability data to determine at least one of: requirements for an action, an attacker state resulting from an action, and a network state resulting from an action,
wherein the requirements include a locality describing whether a vulnerability can be exploited remotely over a network or locally on a host, the resulting attacker state includes an effect describing an access level or privilege or knowledge after an exploit of a vulnerability, and the resulting network state includes a denial of service describing a loss of service on a host after an exploit of a vulnerability.

* * * * *

UNITED STATES PATENT AND TRADEMARK OFFICE
CERTIFICATE OF CORRECTION

PATENT NO. : 7,194,769 B2
APPLICATION NO. : 10/734083
DATED : March 20, 2007
INVENTOR(S) : Lippmann et al.

It is certified that error appears in the above-identified patent and that said Letters Patent is hereby corrected as shown below:

Column 11, line 43, delete ", a memory, 84," and replace with --, a memory 84,--.

Column 12, line 12, delete "devices" and replace with --device--.

Column 12, line 45, delete "in" and replace with --in the--.

Column 12, line 63, delete "in" and replace with --in the--.

Column 13, line 30, delete "and/or or remote." and replace with --and/or remote.--.

Column 15, lines 7-8, delete "Some the" and replace with --Some of the--.

Column 15, line 36, delete "in" and replace with --in the--.

Column 15, line 59, delete "in" and replace with --in the--.

Column 20, line 19, delete "in" and replace with --in the--.

Column 21, line 34, delete "of the FIG. 6." and replace with --of FIG. 6.--.

Column 24, line 49, delete "may sniffed" and replace with --may be sniffed--.

Column 27, line 19, delete "not should" and replace with --should not--.

Column 27, line 21, delete "other" and replace with --others--.

Column 28, lines 44-45, delete "FIG. 122B" and replace with --FIG. 12B--.

Column 31, line 59, delete "that the when" and replace with --that when--.

Column 32, line 35, delete "host that have" and replace with --host have--.

Column 34, line 49, delete "maybe" and replace with --may be--.

Column 35, line 22, delete "in" and replace with --in the--.

UNITED STATES PATENT AND TRADEMARK OFFICE
CERTIFICATE OF CORRECTION

PATENT NO. : 7,194,769 B2
APPLICATION NO. : 10/734083
DATED : March 20, 2007
INVENTOR(S) : Lippmann et al.

It is certified that error appears in the above-identified patent and that said Letters Patent is hereby corrected as shown below:

Column 36, line 37, delete "in" and replace with --in the--.

Column 36, line 52, delete "in" and replace with --in the--.

Column 37, line 43, delete "in" and replace with --in the--.

Column 37, line 49, delete "as" and replace with --at--.

Column 38, line 19, delete "in" and replace with --in the--.

Column 38, line 48, delete "in" and replace with --in the --.

Column 39, line 26, delete "in" and replace with --in the--.

Column 40, line 47, delete "in" and replace with --in the--.

Column 41, line 57, delete "A as source" and replace with --A as a source--.

Column 42, line 10, delete "to blocked." and replace with --to be blocked.--.

Column 47, line 2, delete "host" and replace with --hosts--.

Column 47, line 7, delete "Control to proceeds" and replace with --Control proceeds--.

Column 49, line 67, delete "in" and replace with --in the--.

Column 51, line 32, delete "Nesses" and replace with --Nessus--.

Column 52, line 22, delete "or more the" and replace with --or more of the--.

Column 53, line 17, delete "for example" and replace with --, for example,--.

Column 55, line 54, delete "pats" and replace with --paths--.

UNITED STATES PATENT AND TRADEMARK OFFICE
CERTIFICATE OF CORRECTION

PATENT NO. : 7,194,769 B2
APPLICATION NO. : 10/734083
DATED : March 20, 2007
INVENTOR(S) : Lippmann et al.

It is certified that error appears in the above-identified patent and that said Letters Patent is hereby corrected as shown below:

Column 56, line 13, delete "Wherein" and replace with --wherein--.

Signed and Sealed this

Twenty-fourth Day of June, 2008

JON W. DUDAS
*Director of the United States Patent and Trademark Office*